US012271126B2

(12) United States Patent

Furukawa et al.

(10) Patent No.: US 12,271,126 B2

(45) Date of Patent: Apr. 8, 2025

(54) IMAGE FORMING APPARATUS CONFIGURED TO PERFORM CLEANING OPERATION FOR CLEANING DRUM CLEANING ROLLER CONFIGURED TO COLLECT TONER ON PHOTOSENSITIVE DRUM

(71) Applicant: BROTHER KOGYO KABUSHIKI KAISHA, Nagoya (JP)

(72) Inventors: Toshio Furukawa, Nagoya (JP); Koji Ogawa, Owariasahi (JP); Fan Xu, Nagoya (JP); Kazuma Hinoue, Nagoya (JP); Hotaka Kakutani, Kiyosu (JP); Shintaro Fukuoka, Nagoya (JP); Soun Kanada, Iwakura (JP); Masahiko Hayakawa, Ama (JP); Marika Ozaki, Nagoya (JP); Masaki Ueji, Nagoya (JP); Ayaka Komori, Nagoya (JP); Enao Yamada, Nagoya (JP); Miho Ishida, Nagoya (JP); Keigo Nakajima, Nagoya (JP); Shota Iriyama, Toyokawa (JP); Kengo Yada, Nagoya (JP); Yuwen Wang, Toyohashi (JP); Junichi Hashimoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/461,599

(22) Filed: Sep. 6, 2023

(65) Prior Publication Data

US 2023/0408954 A1 Dec. 21, 2023

Related U.S. Application Data

(63) Continuation of application No. PCT/JP2022/009342, filed on Mar. 4, 2022.

(30) Foreign Application Priority Data

Mar. 9, 2021 (JP) ................................ 2021-037748
Mar. 9, 2021 (JP) ................................ 2021-037751
Apr. 1, 2021 (JP) ................................ 2021-062517

(51) Int. Cl.
*G03G 15/00* (2006.01)
*G03G 15/02* (2006.01)
(Continued)

(52) U.S. Cl.
CPC ....... *G03G 15/161* (2013.01); *G03G 15/0225* (2013.01); *G03G 15/0907* (2013.01);
(Continued)

(58) Field of Classification Search
CPC .... G03G 15/01; G03G 15/0225; G03G 15/09; G03G 15/0907; G03G 15/161;
(Continued)

(56) References Cited

U.S. PATENT DOCUMENTS

2011/0255889 A1 10/2011 Ogiso et al.
2014/0356006 A1 12/2014 Adachi
(Continued)

FOREIGN PATENT DOCUMENTS

JP 8-328395 A 12/1996
JP 2003-248357 A 9/2003
(Continued)

OTHER PUBLICATIONS

International Preliminary Report on Patentability issued in corresponding International Patent Application No. PCT/JP2022/009342, Sep. 12, 2023.

(Continued)

*Primary Examiner* — Sophia S Chen
(74) *Attorney, Agent, or Firm* — Merchant & Gould P.C.

(57) ABSTRACT

An image forming apparatus includes: a photosensitive drum; a magnetic roller; a transfer belt; a drum cleaning
(Continued)

roller for collecting toner on the photosensitive drum and discharging collected toner to the photosensitive drum; a belt cleaner; a waste toner accommodating unit; and a controller configured to perform a printing operation for forming an image on a sheet and a cleaning operation for cleaning the drum cleaning roller. The controller is configured to perform: when performing the printing operation, collecting toner on the photosensitive drum using the drum cleaning roller; and when performing the cleaning operation, discharging the toner on the drum cleaning roller collected in the collecting to the photosensitive drum; transferring the toner on the photosensitive drum onto the transfer belt; and collecting the toner on the transfer belt using the belt cleaner so that the collected toner is accommodated in the waste toner accommodating unit.

14 Claims, 32 Drawing Sheets

(51) Int. Cl.

| | |
|---|---|
| ***G03G 15/09*** | (2006.01) |
| ***G03G 15/16*** | (2006.01) |
| ***G03G 21/00*** | (2006.01) |
| ***G03G 21/12*** | (2006.01) |

(52) U.S. Cl.
CPC ......... *G03G 15/1615* (2013.01); *G03G 21/12* (2013.01); *G03G 2215/1661* (2013.01)

(58) Field of Classification Search
CPC ............... G03G 15/1615; G03G 21/00; G03G 21/0064; G03G 21/12; G03G 21/14; G03G 2215/1661
See application file for complete search history.

(56) References Cited

U.S. PATENT DOCUMENTS

| | | | | |
|---|---|---|---|---|
| 2015/0117888 | A1* | 4/2015 | Wakamatsu | G03G 15/168 399/71 |
| 2016/0054676 | A1 | 2/2016 | Usui et al. | |
| 2017/0068182 | A1* | 3/2017 | Sunahara | G03G 15/0921 |
| 2020/0301350 | A1 | 9/2020 | Sakaguchi | |

FOREIGN PATENT DOCUMENTS

| | | | |
|---|---|---|---|
| JP | 2004-252320 | A | 9/2004 |
| JP | 2005-266446 | A | 9/2005 |
| JP | 2011-227241 | A | 11/2011 |
| JP | 2014-235262 | A | 12/2014 |
| JP | 2016-45356 | A | 4/2016 |
| JP | 2017-9847 | A | 1/2017 |
| JP | 2020-154263 | A | 9/2020 |

OTHER PUBLICATIONS

International Search Report issued in related international search report in PCT/JP2022/009342, Apr. 5, 2022.

* cited by examiner

IMAGE FORMING APPARATUS CONFIGURED TO PERFORM CLEANING OPERATION FOR CLEANING DRUM CLEANING ROLLER CONFIGURED TO COLLECT TONER ON PHOTOSENSITIVE DRUM

REFERENCE TO RELATED APPLICATIONS

This is a by-pass continuation application of International Application No. PCT/JP2022/009342 filed Mar. 4, 2022 which claims priorities from Japanese Patent Application No. 2021-062517 filed Apr. 1, 2021, Japanese Patent Application No. 2021-037751 filed Mar. 9, 2021, and Japanese Patent Application No. 2021-037748 filed Mar. 9, 2021. The entire contents of the International Application and the priority applications are incorporated herein by reference.

BACKGROUND ART

There has been known a conventional image forming apparatus employing a single-component developing system and including a photosensitive drum, a developing roller configured to supply toner to the photosensitive drum, a transfer belt configured to transfer a toner image on the photosensitive drum onto a sheet, a drum cleaning roller configured to collect toner on the photosensitive drum, a belt cleaner configured to collect toner on the transfer belt, and a waste toner accommodating unit configured to accommodate therein toner collected by the belt cleaner.

In the above image forming apparatus, the drum cleaning roller collects toner on the photosensitive drum when an image is formed on a sheet. After image formation is completed, the toner on the drum cleaning roller is then discharged onto the photosensitive drum. The toner discharged onto the photosensitive drum is transferred onto the transfer belt. The toner transferred to the transfer belt is collected by the belt cleaner. The toner collected by the belt cleaner is accommodated in the waste toner accommodating unit. The developing roller is movable by a connecting/disconnecting mechanism between a position in which the developing roller is in contact with the photosensitive drum and a position in which the developing roller is in separation from the photosensitive drum.

DESCRIPTION

However, among image forming apparatuses employing a two-component developing system that includes a magnetic roller configured to supply toner to a photosensitive drum, image forming apparatuses that employ the cleaning mechanism described above have not yet been known.

In view of the foregoing, it is an object of the present disclosure to provide an image forming apparatus that employs a two-component developing system and includes a magnetic roller configured to supply toner to a photosensitive drum, in which toner collected by a drum cleaning roller can be collected by a belt cleaner through the photosensitive drum and a transfer belt and accommodated in a waste toner accommodating unit.

In order to attain the above and other object, the present disclosure provides an image forming apparatus including: a photosensitive drum; a magnetic roller; a transfer belt; a drum cleaning roller; a belt cleaner; a waste toner accommodating unit; and a controller. The magnetic roller is positioned to be spaced apart from the photosensitive drum. The magnetic roller is configured to supply toner to the photosensitive drum to form a toner image thereon. The transfer belt is configured to transfer the toner image on the photosensitive drum onto a sheet. The drum cleaning roller is configured to collect toner on the photosensitive drum and to discharge the collected toner to the photosensitive drum. The belt cleaner is configured to collect toner on the transfer belt. The waste toner accommodating unit is configured to accommodate therein the toner collected by the belt cleaner. The controller is configured to perform a printing operation for forming an image on the sheet and a cleaning operation for cleaning the drum cleaning roller. The controller is configured to perform: when performing the printing operation, collecting the toner on the photosensitive drum using the drum cleaning roller; and when performing the cleaning operation, discharging the toner on the drum cleaning roller collected in the collecting to the photosensitive drum; transferring the toner on the photosensitive drum onto the transfer belt; and collecting the toner on the transfer belt using the belt cleaner so that the collected toner is accommodated in the waste toner accommodating unit.

In the above structure, in the image forming apparatus employing a two-component developing system that includes the magnetic roller configured to supply toner to the photosensitive drum, toner on the photosensitive drum can be collected by the drum cleaning roller while the printing operation is performed. Also, in the image forming apparatus employing the two-component developing system, toner collected by the drum cleaning roller can be collected by the belt cleaner through the photosensitive drum and the transfer belt and accommodated in the waste toner accommodating unit by performing the cleaning operation.

FIRST EMBODIMENT

Hereinafter a first embodiment of the present disclosure will be described in detail while referencing the accompanying drawings as appropriate.

Figure 1:
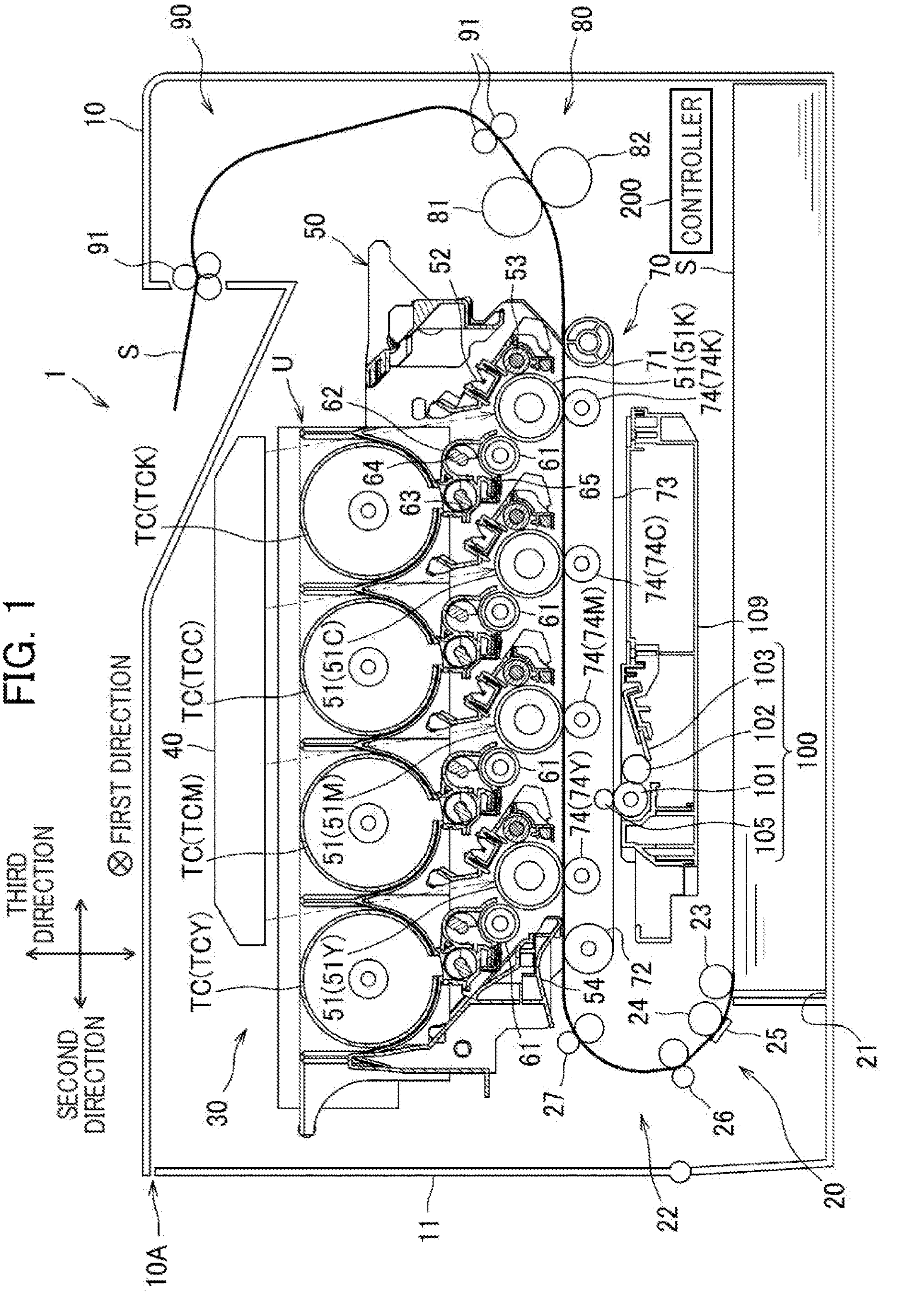
FIG. 1 is a cross-sectional view illustrating an image forming apparatus.

As illustrated in FIG. 1, a color printer 1 as an example of the image forming apparatus includes a main casing 10, a sheet feeding unit 20, an image forming unit 30, a discharging unit 90, a belt cleaner 100, a waste toner accommodating unit 109, and a controller 200.

The main casing 10 has an opening 10A, and includes a front cover 11. The front cover 11 is movable between an open position (see FIG. 2) in which the front cover 11 opens the opening 10A, and a closed position (see FIG. 1) in which the front cover 11 closes the opening 10A. Specifically, the front cover 11 is pivotally movable between the open position and closed position.

The sheet feeding unit 20 includes a feeding tray 21, and a sheet conveying mechanism 22. The feeding tray 21 accommodates therein sheet(s) S. The sheet conveying mechanism 22 is configured to convey the sheet S from the feeding tray 21 to the image forming unit 30. The sheet conveying mechanism 22 includes a pick-up roller 23, a separation roller 24, a separation pad 25, a pair of conveying rollers 26, and a pair of registration rollers 27.

The pick-up roller 23 is configured to feed the sheets S from the feeding tray 21. The separation roller 24 and the separation pad 25 are configured to separate the sheets S fed from the feeding tray 21 one by one. The conveying rollers 26 and the registration rollers 27 are configured to convey the sheets S. The registration rollers 27 are also configured to correct skew in the sheet S by straightening a leading edge of the sheet S.

The image forming unit 30 includes an exposure unit 40, a process unit U, a transfer unit 70, and a fixing device 80.

The exposure unit 40 is configured to expose surfaces of photosensitive drums 51 to light after the surfaces are charged. Although not illustrated in the drawings, the exposure unit 40 includes a laser emitting unit, a polygon mirror, lenses, reflecting mirrors, and the like. The exposure unit 40 is configured to emit laser beams onto the photosensitive drums 51, as depicted by virtual lines in FIG. 1.

The process unit U includes a drum unit 50, and four toner cartridges TC.

Each of the toner cartridges TC accommodates therein toner which is non-magnetic material. The toner is positively charged toner, in which the positive is an example of the first polarity. The four toner cartridges TC are arranged in a second direction (described later). Specifically, the four toner cartridges TC include a first toner cartridge TCY that accommodates therein toner of yellow, a second toner cartridge TCM that accommodates therein toner of magenta, a third toner cartridge TCC that accommodates therein toner of cyan, and a fourth toner cartridge TCK that accommodates therein toner of black. The first toner cartridge TCY, the second toner cartridge TCM, the third toner cartridge TCC, and the fourth toner cartridge TCK are arranged in this order from upstream to downstream in a conveying direction of sheets S.

Figure 2:
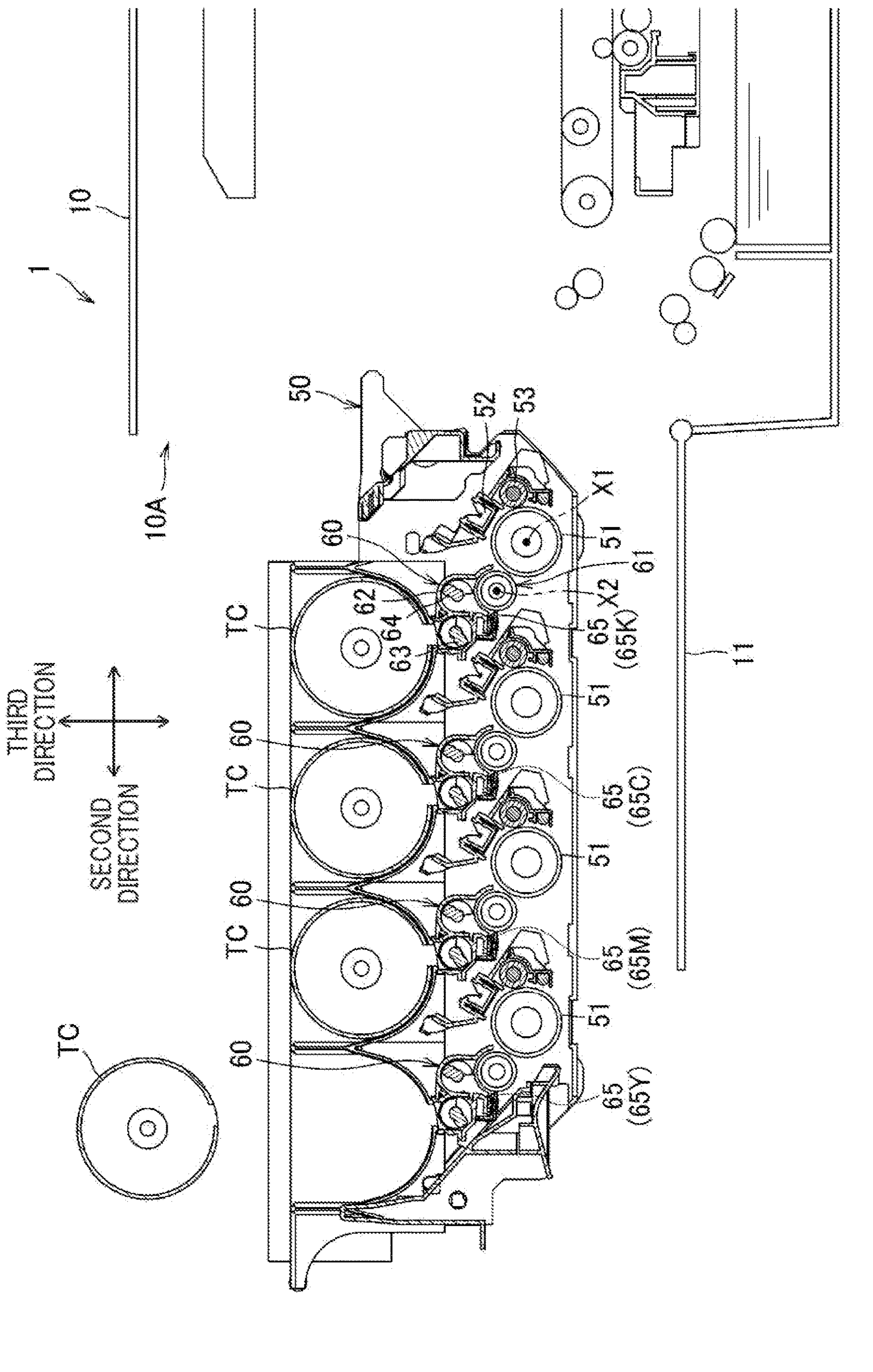
FIG. 2 is a cross-sectional view illustrating a state where a drum unit is in its pulled-out position.

As illustrated in FIG. 2, the toner cartridges TC are attachable to and detachable from the drum unit 50. Specifically, the toner cartridges TC are attachable and detachable in a direction crossing a first direction in which drum axes X1 extend. More specifically, the toner cartridges TC are attachable and detachable in a direction orthogonal to the first direction in which the drum axes X1 extend.

Figure 3:
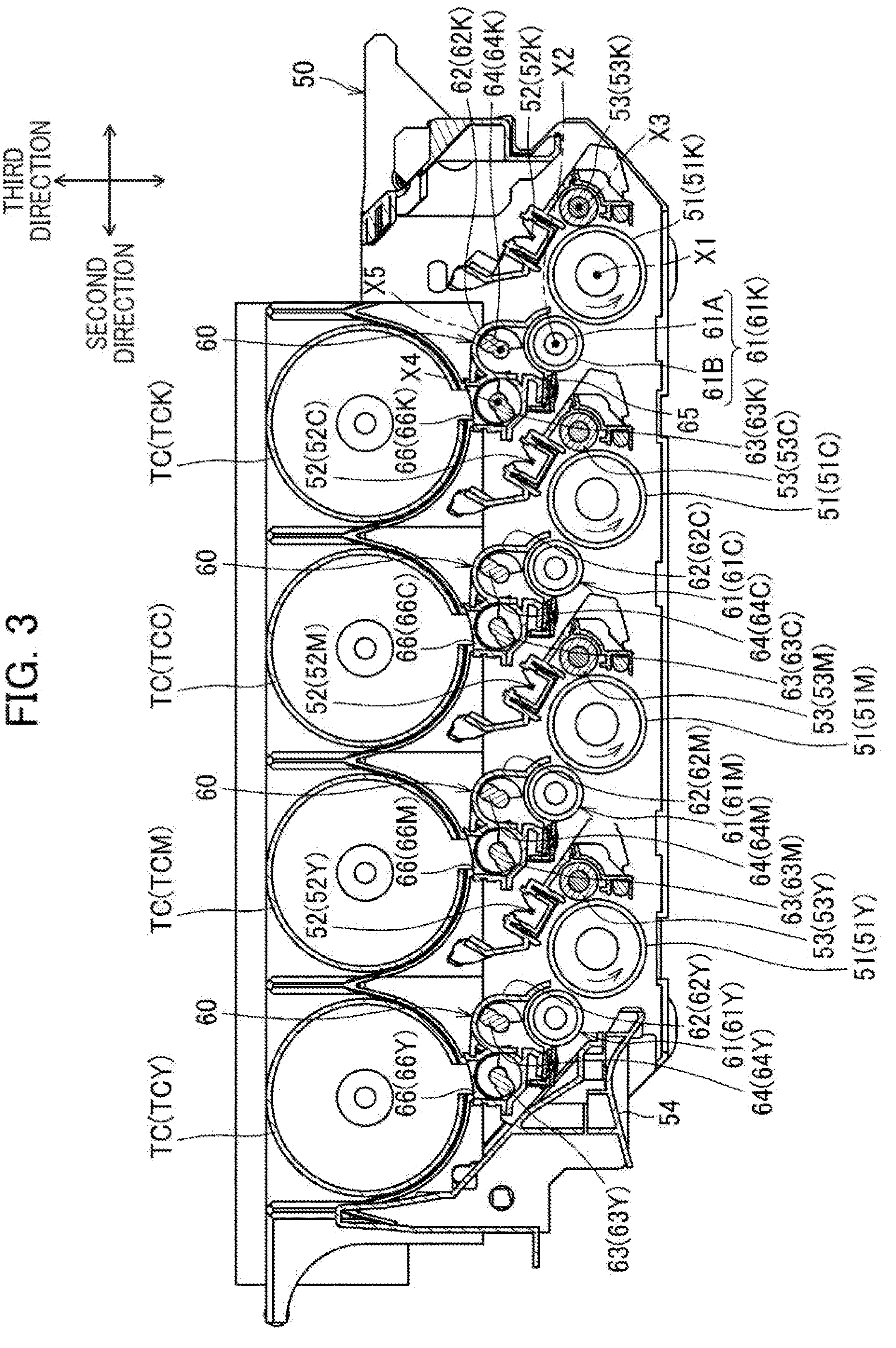
FIG. 3 is a cross-sectional view illustrating the drum unit to which toner cartridges are attached.

The drum unit 50 is attachable to and detachable from the main casing 10. The drum unit 50 is a drawer that is movable through the opening 10A in the second direction relative to the main casing 10. Specifically, the drum unit 50 is movable in the second direction relative to the main casing 10 between an accommodated position (see FIG. 1) in which the drum unit 50 is positioned inside the main casing 10, and a pulled-out position (see FIG. 2) in which the drum unit 50 is pulled out of the main casing 10. As illustrated in FIG. 3, the drum unit 50 includes the photosensitive drums 51, scorotron chargers 52 as examples of the charger, drum cleaning rollers 53, developing units 60, and a sheet guide 54. Specifically, the drum unit 50 includes four photosensitive drums 51, four scorotron chargers 52, four drum cleaning rollers 53, and four developing units 60.

Each of the photosensitive drums 51 is rotatable about the drum axis X1 extending in the first direction. The second direction is a direction crossing the first direction. Specifically, the second direction is a direction orthogonal to the first direction. The four photosensitive drums 51 are arranged in the second direction. The four photosensitive drums 51 include a first photosensitive drum 51Y corresponding to toner of yellow, a second photosensitive drum 51M corresponding to toner of magenta, a third photosensitive drum 51C corresponding to toner of cyan, and a fourth photosensitive drum 51K corresponding to toner of black. The first photosensitive drum 51Y, the second photosensitive drum 51M, the third photosensitive drum 51C, and the fourth photosensitive drum 51K are arranged in this order from upstream to downstream in the conveying direction of the sheets S.

The scorotron chargers 52 are configured to charge the surfaces of the corresponding photosensitive drums 51. Each of the scorotron chargers 52 includes a discharge wire, a grid electrode, and the like depicted without reference numerals. When a positive charging bias Vg is applied to the scorotron charger 52, the scorotron charger 52 charges the surface of the corresponding photosensitive drum 51. The scorotron charger 52 is positioned to be spaced apart from the surface of the corresponding photosensitive drum 51. That is, the scorotron charger 52 and the corresponding photosensitive drum 51 are not in contact with each other.

The four scorotron chargers 52 are arranged in the second direction. The four scorotron chargers 52 include a first scorotron charger 52Y configured to charge the surface of the first photosensitive drum 51Y, a second scorotron charger 52M configured to charge the surface of the second photosensitive drum 51M, a third scorotron charger 52C configured to charge the surface of the third photosensitive drum 51C, and a fourth scorotron charger 52K configured to charge the surfaces of the fourth photosensitive drum 51K. The first scorotron charger 52Y, the second scorotron charger 52M, the third scorotron charger 52C, and the fourth scorotron charger 52K are arranged in this order from upstream to downstream in the conveying direction of the sheets S.

Each of the drum cleaning rollers 53 is rotatable about a cleaning axis X3 that extends in the first direction. The drum cleaning roller 53 is a roller configured to collect toner on the corresponding photosensitive drums 51. The drum cleaning rollers 53 is also configured to discharge collected toner onto the corresponding photosensitive drums 51.

Specifically, each of the drum cleaning rollers 53 can collect toner on the corresponding photosensitive drum 51 and can also discharge collected toner onto the corresponding photosensitive drum 51 when a drum cleaning bias Vc1*n* is applied to the drum cleaning roller 53. More specifically, each of the drum cleaning rollers 53 collects toner on the corresponding photosensitive drum 51 when a negative drum cleaning bias −Vc1 is applied to the drum cleaning roller 53. The negative serves an example of the second polarity, which has a polarity opposite to the first polarity. The drum cleaning roller 53 also discharges toner onto the corresponding photosensitive drum 51 when a positive drum cleaning bias +Vc2 is applied to the drum cleaning roller 53.

The four drum cleaning rollers 53 include a first drum cleaning roller 53Y, a second drum cleaning roller 53M, a third drum cleaning roller 53C, and a fourth drum cleaning roller 53K.

The first drum cleaning roller 53Y is configured to collect toner on the first photosensitive drum 51Y. The first drum cleaning roller 53Y is also configured to discharge collected toner onto the first photosensitive drum 51Y. The second drum cleaning roller 53M is configured to collect toner on the second photosensitive drum 51M. The second drum cleaning roller 53M is also configured to discharge collected toner onto the second photosensitive drum 51M. The third drum cleaning roller 53C is configured to collect toner on the third photosensitive drum 51C. The third drum cleaning roller 53C is also configured to discharge collected toner onto the third photosensitive drum 51C. The fourth drum cleaning roller 53K is configured to collect toner on the fourth photosensitive drum 51K. The fourth drum cleaning roller 53K is also configured to discharge collected toner onto the fourth photosensitive drum 51K.

The four developing units 60 are arranged in the second direction. The developing units 60 are positioned between the toner cartridges TC and the photosensitive drums 51 in the direction in which the toner cartridges TC are attached to the drum unit 50. Each of the four developing units 60 includes a magnetic roller 61, a developing container 62, a first auger 63, a second auger 64, and a thickness-regulating blade 65.

The magnetic roller 61 is a roller configured to supply toner onto the corresponding photosensitive drum 51. Specifically, the magnetic roller 61 is configured to supply positively charged toner to the corresponding photosensitive drum 51. The magnetic roller 61 supplies toner to a part of the surface of the corresponding photosensitive drum 51 that has been exposed by the exposure unit 40. Specifically, the magnetic roller 61 supplies toner to the exposed part of the surface of the corresponding photosensitive drum 51 when a positive developing bias Vb is applied to the magnetic roller 61.

Each of the magnetic rollers 61 has a surface rotatable about a roller axis X2 extending in the first direction. Specifically, each of the magnetic rollers 61 includes a magnetic shaft 61A, and a sleeve 61B.

The magnetic shaft 61A has alternating magnetic poles arranged in a circumferential direction thereof with a predetermined pattern. For example, the magnetic shaft 61A is a solid cylindrical member in which a plurality of permanent magnets are embedded. The magnetic shaft 61A extends in the first direction. The magnetic shaft 61A is fixed to the developing container 62.

The sleeve 61B is configured of a hollow cylindrical member formed primarily of non-magnetic metal material, for example. The sleeve 61B is rotatable relative to the magnetic shaft 61A. In other words, the sleeve 61B is rotatable about the magnetic shaft 61A. The sleeve 61B is configured to hold carrier and toner on a surface thereof. Specifically, carrier is held on the surface of the sleeve 61B through a magnetic force of the magnetic shaft 61A, and toner is held through the carrier.

The magnetic rollers 61 are positioned between the toner cartridges TC and the photosensitive drums 51 in the direction in which the toner cartridges TC are attached to the drum unit 50. The sleeve 61B is rotatable about the roller axis X2. The magnetic roller 61 faces the surface of the corresponding photosensitive drum 51. The magnetic roller 61 is positioned to be spaced apart from the surface of the corresponding photosensitive drum 51. That is, the magnetic roller 61 and the corresponding photosensitive drum 51 are not in contact with each other.

The magnetic rollers 61 include a first magnetic roller 61Y configured to supply toner onto the first photosensitive drum 51Y, a second magnetic roller 61M configured to supply toner onto the second photosensitive drum 51M, a third magnetic roller 61C configured to supply toner onto the third photosensitive drum 51C, and a fourth magnetic roller 61K configured to supply toner onto the fourth photosensitive drum 51K.

Each of the developing containers 62 is a container that accommodates therein magnetic carrier. The carrier is iron powder, for example. Each of the developing containers 62 has a supply port 66 allowing toner to be supplied from the corresponding toner cartridge TC therethrough. The supply port 66 is positioned on the opposite side of the first auger 63 and the second auger 64 from the magnetic roller 61.

The supply port 66 is positioned higher than the first auger 63 and the second auger 64. Specifically, the supply port 66 is positioned above the first auger 63. The roller axis X2 is positioned lower than the first auger 63 and the second auger 64. Specifically, the roller axis X2 is positioned below the second auger 64.

The developing containers 62 include a first developing container 62Y having a first supply port 66Y that allows toner to be supplied from the first toner cartridge TCY therethrough; a second developing container 62M having a second supply port 66M that allows toner to be supplied from the second toner cartridge TCM therethrough; a third developing container 62C having a third supply port 66C that allows toner to be supplied from the third toner cartridge TCC therethrough; and a fourth developing container 62K having a fourth supply port 66K that allows toner to be supplied from the fourth toner cartridge TCK therethrough.

The first auger 63 is positioned inside the developing container 62. The first auger 63 is rotatable about a first auger axis X4 that extends in the first direction. The first auger 63 is juxtaposed with the second auger 64 in the second direction. The first auger 63 is positioned closer to the supply port 66 than the second auger 64 is to the supply port 66. The first auger 63 is configured to circulate the carrier and the toner inside the developing container 62. The first auger 63 is also configured to convey the toner supplied into the developing container 62 through the supply port 66 to the second auger 64.

The first augers 63 include a Y first auger 63Y positioned inside the first developing container 62Y, a M first auger 63M positioned inside the second developing container 62M, a C first auger 63C positioned inside the third developing container 62C, and a K first auger 63K positioned inside the fourth developing container 62K.

The second auger 64 is positioned inside the developing container 62. The second auger 64 is rotatable about a second auger axis X5 that extends in the first direction. The second auger 64 is configured to convey the carrier and the toner inside the developing container 62 toward the magnetic roller 61. That is, the second auger 64 is configured to supply the toner onto the magnetic roller 61. The second auger 64 is also configured to circulate the carrier and the toner inside the developing container 62.

The second augers 64 include a Y second auger 64Y positioned inside the first developing container 62Y, a M second auger 64M positioned inside the second developing container 62M, a C second auger 64C positioned inside the third developing container 62C, and a K second auger 64K positioned inside the fourth developing container 62K.

Each of the thickness-regulating blade 65 is a member configured to regulate a thickness of a toner layer on the magnetic roller 61. The thickness-regulating blade 65 is not in contact with the magnetic roller 61. The thickness-regulating blade 65 is positioned lower than the first auger 63 and the second auger 64. Specifically, the thickness-regulating blade 65 is positioned below the first auger 63. The thickness-regulating blade 65 is juxtaposed with the magnetic roller 61 in the second direction. The roller axis X2 is positioned between the thickness-regulating blade 65 and the drum axis X1 in the second direction.

The thickness-regulating blades 65 include a first thickness-regulating blade 65Y configured to regulate the thickness of the toner layer on the first magnetic roller 61Y, a second thickness-regulating blade 65M configured to regulate the thickness of the toner layer on the second magnetic roller 61M, a third thickness-regulating blade 65C configured to regulate the thickness of the toner layer on the third magnetic roller 61C, and a fourth thickness-regulating blade 65K configured to regulate the thickness of the toner layer on the fourth magnetic roller 61K.

The sheet guide 54 is a guide configured to guide the sheets S toward the photosensitive drums 51. The sheet guide 54 is aligned with the photosensitive drums 51 in the second direction. The sheet guide 54 is positioned upstream of the four photosensitive drums 51 in the conveying direction of the sheets S.

The first magnetic roller 61Y is positioned between the sheet guide 54 and the Y second auger 64Y in a third direction that crosses both the first direction and the second direction. Preferably, the third direction is orthogonal to both the first direction and the second direction. The first thickness-regulating blade 65Y is positioned between the sheet guide 54 and the Y first auger 63Y in the third direction.

As illustrated in FIG. 1, the transfer unit 70 is configured to transfer toner images on the photosensitive drums 51 onto the sheet S. The transfer unit 70 is positioned between the sheet feeding unit 20 and the drum unit 50 in the third direction. The transfer unit 70 includes a drive roller 71, a follow roller 72, a transfer belt 73, and four transfer rollers 74.

The drive roller 71 and the follow roller 72 are spaced apart from each other in the second direction. The drive roller 71 and the follow roller 72 support the transfer belt 73 which is an endless belt. The transfer rollers 74 are positioned within a space encircled by the transfer belt 73. The transfer rollers 74 nip the transfer belt 73 in cooperation with the corresponding photosensitive drums 51. When a negative transferring bias Vt is applied to the transfer rollers 74, the transfer belt 73 transfers the toner images on the photosensitive drums 51 onto the sheet S.

The four transfer rollers 74 are arranged in the second direction. The four transfer rollers 74 include a first transfer roller 74Y for transferring the toner image on the first photosensitive drum 51Y to the sheet S, a second transfer roller 74M for transferring the toner image on the second photosensitive drum 51M to the sheet S, a third transfer roller 74C for transferring the toner image on the third photosensitive drum 51C to the sheet S, and a fourth transfer roller 74K for transferring the toner image on the fourth photosensitive drum 51K to the sheet S. The first transfer roller 74Y, the second transfer roller 74M, the third transfer roller 74C, and the fourth transfer roller 74K are arranged in this order from upstream to downstream in the conveying direction of the sheets S.

The fixing device 80 is configured to fix the toner image on the sheet S to the sheet S. The fixing device 80 includes a heating roller 81, and a pressure roller 82. The heating roller 81 and the pressure roller 82 are configured to nip the sheet S therebetween.

In the image forming unit 30, the scorotron chargers 52 charge the surfaces of the corresponding photosensitive drums 51. The exposure unit 40 then exposes the surfaces of the photosensitive drums 51, thereby forming electrostatic latent images on the photosensitive drums 51.

The toner cartridges TC supply toner into the corresponding developing containers 62. The first augers 63 convey toner and carrier in the developing containers 62 to the corresponding second augers 64. The second augers 64 convey the toner and the carrier in the developing containers 62 to the corresponding magnetic rollers 61. The magnetic rollers 61 supply the toner to the electrostatic latent images on the corresponding photosensitive drums 51, thereby forming toner images on the photosensitive drums 51.

The transfer belt 73 conveys the sheet S between the transfer belt 73 itself and the photosensitive drums 51. The sheet S passes between the photosensitive drums 51 and the corresponding transfer rollers 74. At this time, the toner images on the photosensitive drums 51 are transferred onto the sheet S. Subsequently, the sheet S passes between the heating roller 81 and the pressure roller 82, whereby the toner images on the sheet S are thermally fixed to the sheet S.

The discharging unit 90 includes a plurality of conveying rollers 91. The conveying rollers 91 are configured to discharge the sheets S out of the main casing 10.

The belt cleaner 100 is configured to collect toner on the transfer belt 73. The belt cleaner 100 includes a belt cleaning roller 101, a collecting roller 102, a scraping blade 103, and a backup roller 105. The backup roller 105 is positioned within the space encircled by the transfer belt 73. The backup roller 105 nips the transfer belt 73 in cooperation with the belt cleaning roller 101.

The belt cleaning roller 101 is configured to collect toner on the transfer belt 73. Specifically, the belt cleaning roller 101 collects toner on the transfer belt 73 when a negative belt cleaning bias Vbc is applied to the belt cleaning roller 101. The collecting roller 102 is configured to collect toner on the belt cleaning roller 101. The scraping blade 103 is configured to scrape toner off the collecting roller 102.

The waste toner accommodating unit 109 is configured to accommodate therein toner collected by the belt cleaner 100. Specifically, the waste toner accommodating unit 109 accommodates therein toner collected from the belt cleaning roller 101 by the collecting roller 102 and scraped off the collecting roller 102 by the scraping blade 103.

Figure 4:
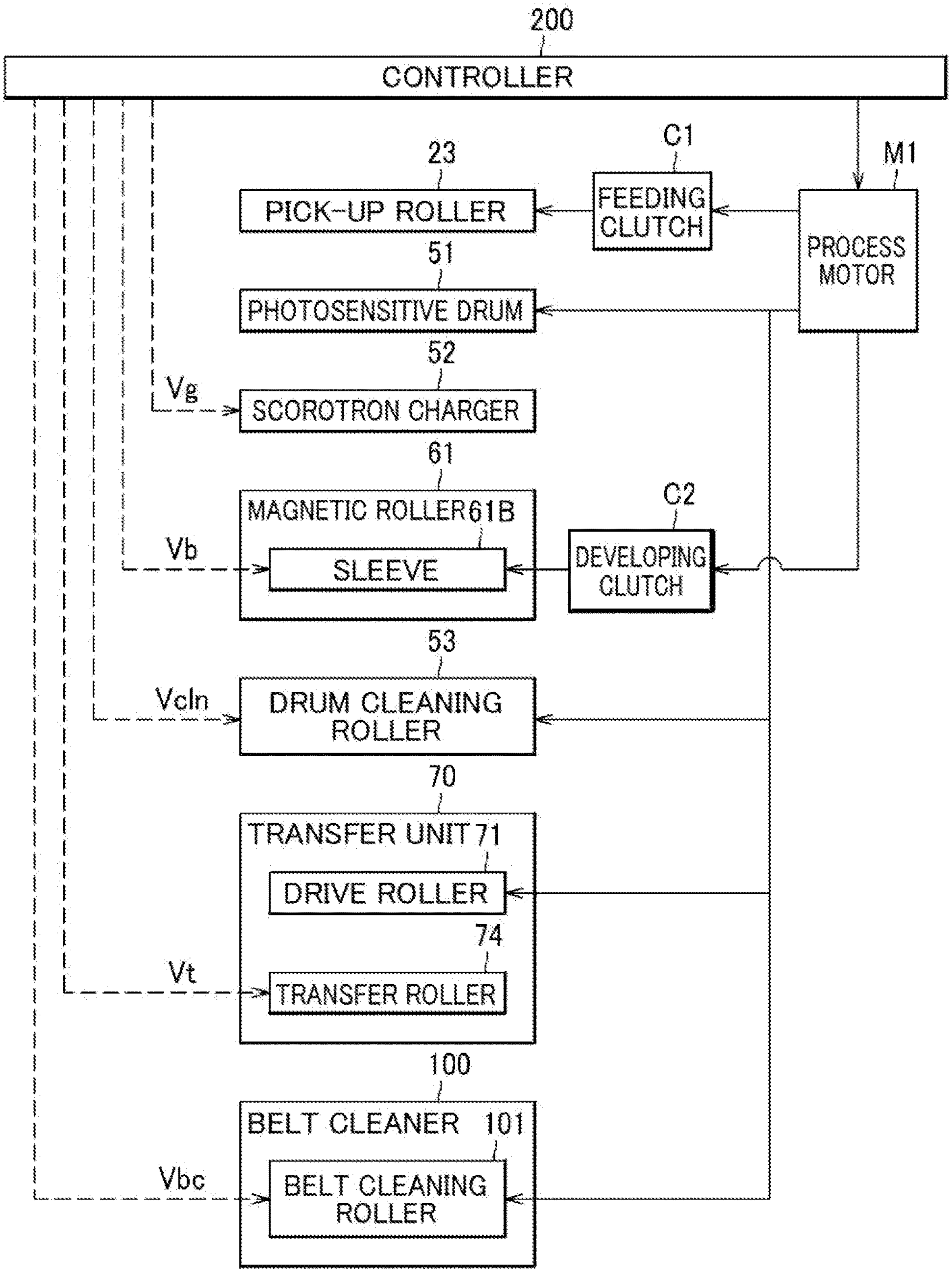
FIG. 4 is a block diagram in the image forming apparatus.

As illustrated in FIG. 4, the color printer 1 further includes a process motor M1, a feeding clutch C1, and a developing clutch C2.

The process motor M1 is a motor configured to drive the photosensitive drums 51, the drum cleaning rollers 53, the drive roller 71 of the transfer unit 70, and the belt cleaning roller 101 of the belt cleaner 100. A driving force of the process motor M1 is transmitted via a process gear train (not illustrated) to the photosensitive drums 51, the drum cleaning rollers 53, the drive roller 71, and the belt cleaning roller 101.

The process motor M1 is configured to also drive the pick-up roller 23. The driving force of the process motor M1 is transmitted via a feed gear train (not illustrated) to the pick-up roller 23. The supply gear train includes the feeding clutch C1 which is controlled by the controller 200.

The feeding clutch C1 is an electromagnetic clutch, for example. The feeding clutch C1 is switchable between a transmission state in which the feeding clutch C1 transmits the driving force from the process motor M1 to the pick-up roller 23, and a cutoff state in which the feeding clutch C1 does not transmit the driving force from the process motor M1 to the pick-up roller 23. The controller 200 is configured to rotate the pick-up roller 23 to feed the sheet S from the feeding tray 21 by setting the feeding clutch C1 to the transmission state. The controller 200 is also configured to stop rotation of the pick-up roller 23 by setting the feeding clutch C1 to the cutoff state.

The process motor M1 is configured to also drive the sleeves 61B of the magnetic rollers 61. The driving force of the process motor M1 is transmitted via a developing gear train (not illustrated) to the sleeves 61B. The developing gear train includes the developing clutch C2 which is controlled by the controller 200.

The developing clutch C2 is an electromagnetic clutch, for example. The developing clutch C2 is switchable between a transmission state in which the developing clutch C2 transmits the driving force from the process motor M1 to the sleeves 61B, and a cutoff state in which the developing clutch C2 does not transmit the driving force from the process motor M1 to the sleeves 61B. The controller 200 is configured to rotate the sleeves 61B by setting the developing clutch C2 to the transmission state. The controller 200 is also configured to stop rotation of the sleeves 61B by setting the developing clutch C2 to the cutoff state.

The controller 200 includes a CPU, a RAM, a ROM, input/output circuits, and the like. The controller 200 is configured to execute control by performing various arithmetic operations on the basis of programs and data stored in the ROM and the like. The controller 200 is configured to control the process motor M1, the feeding clutch C1, and the developing clutch C2. The controller 200 is configured to also control the charging bias Vg, the developing bias Vb, the drum cleaning bias Vc1$n$, the transferring bias Vt, and the belt cleaning bias Vbc.

The controller 200 is configured to execute a printing operation for forming an image on the sheet S, and a cleaning operation for cleaning the drum cleaning rollers 53.

When executing the printing operation, the controller 200 applies the developing bias Vb to the magnetic rollers 61. Specifically, the controller 200 applies a developing bias Vb of a first value to the magnetic rollers 61 when executing the printing operation. Hereinafter, the developing bias Vb of the first value will be referred to as "developing bias Vb1." When executing the printing operation, the controller 200 applies the developing bias Vb1 to the sleeves 61B of the magnetic rollers 61. Applying the developing bias Vb1 is an example of the applying when executing the printing operation.

The controller 200 executes a first collecting process when executing the printing operation. In the first collecting process, the controller 200 applies the drum cleaning bias −Vc1 to the drum cleaning rollers 53. In this way, the controller 200 collects toner on the photosensitive drums 51 using the drum cleaning rollers 53. The first collecting process is an example of the collecting when executing the printing operation.

When executing the cleaning operation, the controller 200 executes a charging bias applying process, a developing bias applying process, a discharging process, a transferring process, and a second collecting process. The charging bias applying process is an example of the applying a charging bias. The developing bias applying process is an example of the applying the developing bias when executing the cleaning operation. The discharging process is an example of the discharging, the transferring process is an example of the transferring, and the second collecting process is an example of the collecting when executing the cleaning operation.

The controller 200 applies the charging bias Vg to the scorotron chargers 52 in the charging bias applying process. Through this application, the controller 200 charges the surfaces of the photosensitive drums 51 using the scorotron chargers 52. When executing the cleaning operation, the controller 200 does not expose the surfaces of charged photosensitive drums 51 using the exposure unit 40.

The controller 200 applies the developing bias Vb to the magnetic rollers 61 in the developing bias applying process. Specifically, in the developing bias applying process, the controller 200 applies the developing bias Vb to the magnetic rollers 61 so that the surface potential of the magnetic rollers 61 has an absolute value that is greater than an absolute value of the surface potential in unexposed parts of the charged photosensitive drums 51.

The controller 200 applies a positive developing bias Vb to the magnetic rollers 61 when executing the developing bias applying process. When executing the cleaning operation, the controller 200 also applies a developing bias Vb of a second value to the magnetic rollers 61 during the developing bias applying process. The second value has an absolute value that is greater than an absolute value of the first value. Hereinafter, the developing bias Vb of the second value will be referred to as "developing bias Vb2." The controller 200 applies the developing bias Vb2 to the sleeves 61B of the magnetic rollers 61 when executing the developing bias applying process.

The controller 200 applies the drum cleaning bias +Vc2 to the drum cleaning rollers 53 in the discharging process. Through this application, the controller 200 discharges toner on the drum cleaning rollers 53 collected in the first collecting process of the printing operation onto the corresponding photosensitive drums 51.

The controller 200 applies the transferring bias Vt to the transfer rollers 74 in the transferring process. Through this application, the controller 200 transfers toner on the photosensitive drums 51 directly onto the transfer belt 73.

The controller 200 applies the belt cleaning bias Vbc to the belt cleaning roller 101 in the second collecting process. Accordingly, the controller 200 collects toner on the transfer belt 73 using the belt cleaner 100 so that the collected toner is accommodated in the waste toner accommodating unit 109.

The controller 200 stops rotation of the magnetic rollers 61 when executing the cleaning operation. Specifically, when executing the cleaning operation, the controller 200 sets the developing clutch C2 to the cutoff state to stop rotation of the sleeves 61B. This operation to stop the rotation of the magnetic rollers 61 is an example of the stopping.

Next, the operations performed by the controller 200 will be described with reference to the flowcharts in FIGS. 5 through 7 and the timing chart in FIG. 8.

Figure 5:
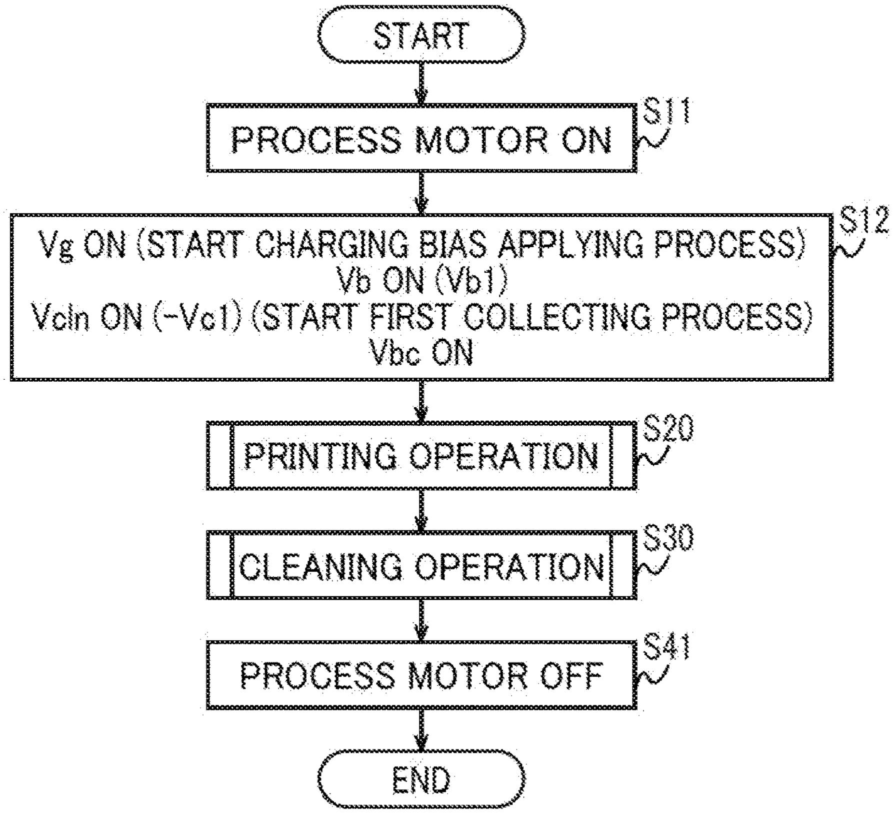
FIG. 5 is a flowchart illustrating one example of operations executed by a controller.
Figure 8:
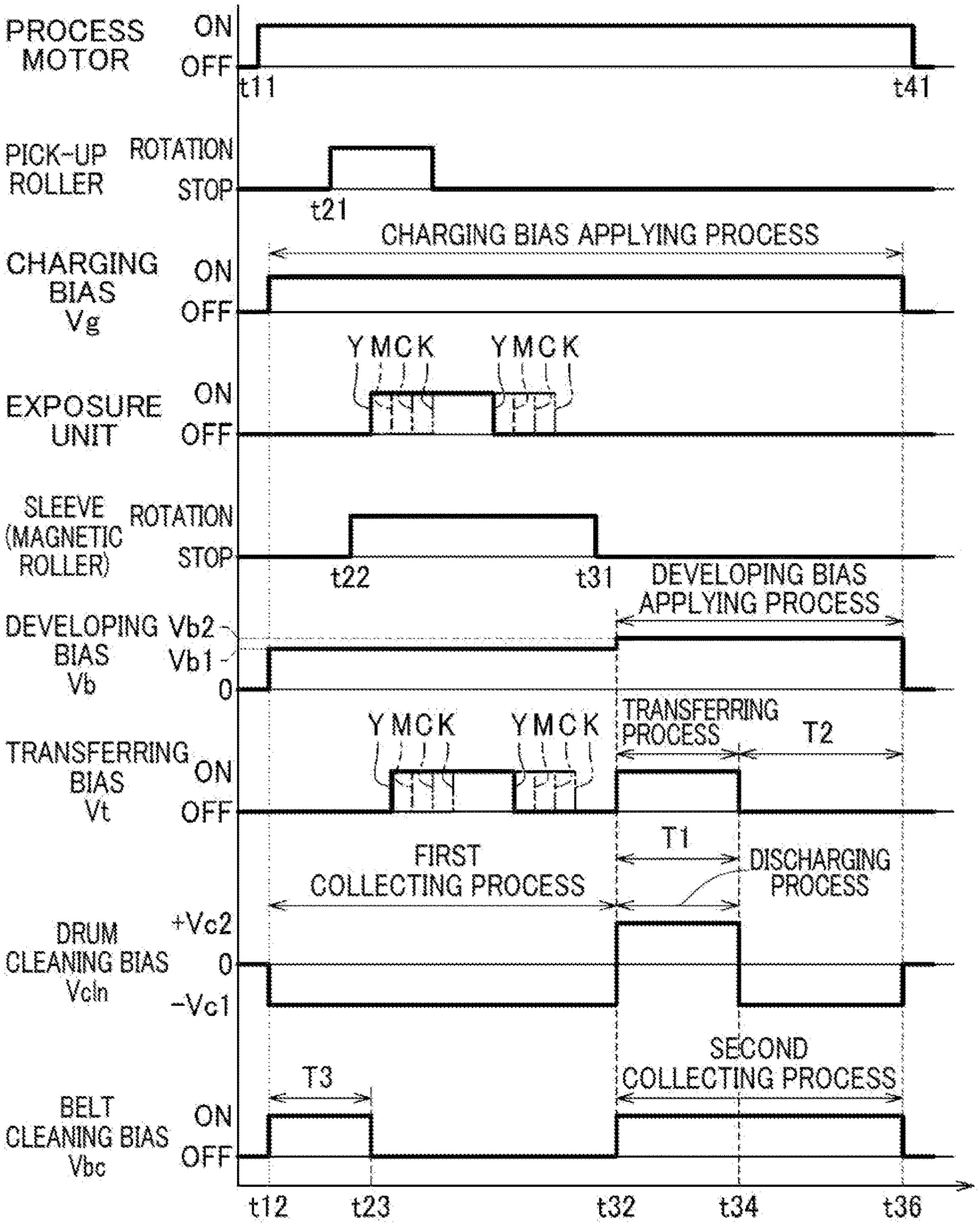
FIG. 8 is a timing chart illustrating one example of the operations executed by the controller.

As illustrated in FIG. 5, when receiving a print job that includes instructions to start printing, image data, and the like, in S11 the controller 200 turns on the process motor M1 (t11 in FIG. 8). This operation rotates the photosensitive drums 51, the drum cleaning rollers 53, the drive roller 71 of the transfer unit 70, the belt cleaning roller 101 of the belt cleaner 100, and the like.

In S12 the controller 200 also turns on the charging bias Vg, the developing bias Vb, the drum cleaning bias Vc1*n*, and the belt cleaning bias Vbc (t12 in FIG. 8). By turning on the charging bias Vg, the controller 200 starts the charging bias applying process to charge the surfaces of the photosensitive drums 51 using the scorotron chargers 52. Further, by turning on the belt cleaning bias Vbc, the controller 200 collects toner on the transfer belt 73 using the belt cleaner 100.

The controller 200 also applies the developing bias Vb1 for executing development to the sleeves 61B of the magnetic rollers 61 as the developing bias Vb. The controller 200 also applies the drum cleaning bias −Vc1 for collecting toner to the drum cleaning rollers 53 as the drum cleaning bias Vc1*n*. Through this application, the controller 200 starts the first collecting process to collect toner on the photosensitive drums 51 using the drum cleaning rollers 53.

Subsequently, in S20 the controller 200 executes the printing operation. Specifically, in S21 illustrated in FIG. 6, the controller 200 rotates the pick-up roller 23 (t21 in FIG. 8) to start feeding of the sheet S. In S22 the controller 200 also starts the rotation of the sleeves 61B of the magnetic rollers 61 (t22 in FIG. 8).

In S23 the controller 200 forms an image on the fed sheet S by executing exposure, development, transfer, and fixing. At this time, the controller 200 executes the exposure using the exposure unit 40 in the order of the first photosensitive drum 51Y corresponding to yellow (Y), the second photosensitive drum 51M corresponding to magenta (M), the third photosensitive drum 51C corresponding to cyan (C), and the fourth photosensitive drum 51K corresponding to black (K), as illustrated in FIG. 8.

In the present embodiment, the controller 200 turns off the belt cleaning bias Vbc prior to executing the transferring process. As an example, the controller 200 turns off the belt cleaning bias Vbc when a third time T3 has elapsed since the belt cleaning bias Vbc has been turned on (t23 in FIG. 8). The third time T3 is set to a length of time required for the transfer belt 73 to make at least one circulation, for example.

Further, in the present embodiment, the controller 200 turns on the transferring bias Vt in the order of the first transfer roller 74Y corresponding to yellow (Y), the second transfer roller 74M corresponding to magenta (M), the third transfer roller 74C corresponding to cyan (C), and the fourth transfer roller 74K corresponding to black (K). Subsequently, the controller 200 turns off the transferring bias Vt in the order of the first transfer roller 74Y corresponding to yellow (Y), the second transfer roller 74M corresponding to magenta (M), the third transfer roller 74C corresponding to cyan (C), and the fourth transfer roller 74K corresponding to black (K).

Note that the controller 200 may turn on the transferring bias Vt simultaneously for all four transfer rollers 74 while executing the printing operation. Similarly, the controller 200 may turn off the transferring bias Vt simultaneously for all four transfer rollers 74 while executing the printing operation.

Figure 6:
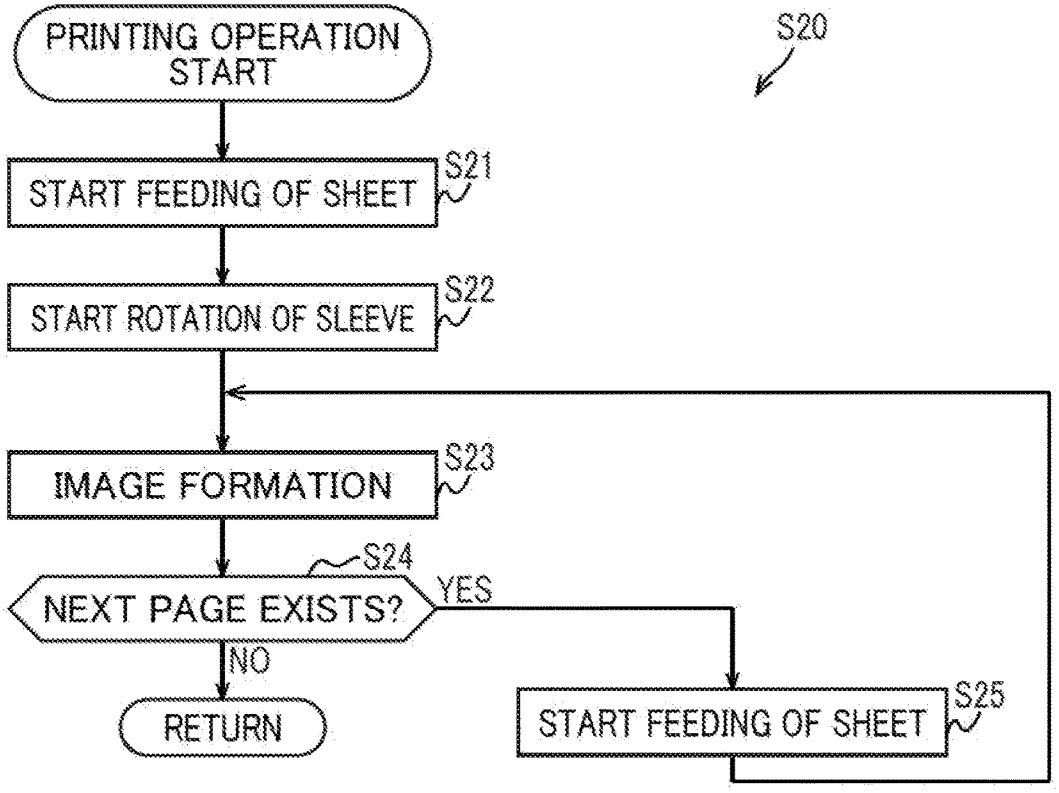
FIG. 6 is a flowchart illustrating one example of a printing operation.
Figure 7:
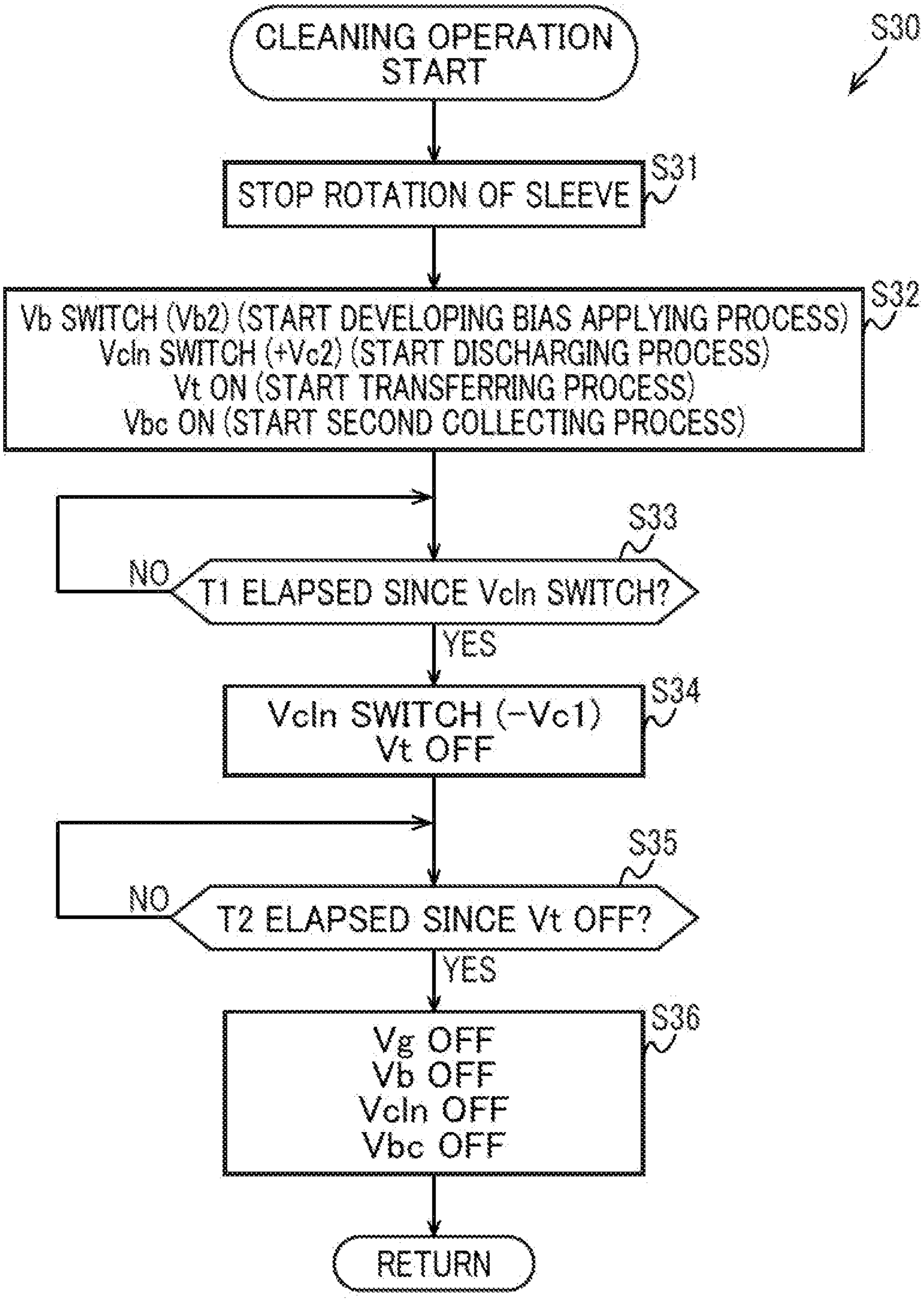
FIG. 7 is a flowchart illustrating one example of a cleaning operation.

After executing the process in S23 of FIG. 6, in S24 the controller 200 determines whether or not there exists a next page in the print job. When a next page exists (S24: YES), in S25 the controller 200 rotates the pick-up roller 23 at a prescribed timing to start feeding of the next sheet S. Subsequently, in S23 the controller 200 forms an image on the next sheet S. When a next page does not exist in the print job in S24 (S24: NO), the controller 200 ends the printing operation.

Referring back to FIG. 5, after completing the printing operation, in S30 the controller 200 executes the cleaning operation. Specifically, in S31 illustrated in FIG. 7, the controller 200 stops the rotation of the sleeves 61B of the magnetic rollers 61 (t31 in FIG. 8).

Subsequently, in S32 the controller 200 switches the developing bias Vb from Vb1 to Vb2 and switches the drum cleaning bias Vc1*n* from −Vc1 to +Vc2. Also, the controller 200 turns on the transferring bias Vt and the belt cleaning bias Vbc (t32 in FIG. 8).

By applying the developing bias Vb2 to the sleeves 61B of the magnetic rollers 61, the controller 200 starts the developing bias applying process. Further, by applying the drum cleaning bias +Vc2 to the drum cleaning rollers 53, the controller 200 ends the first collecting process, and starts the discharging process to cause the drum cleaning rollers 53 to discharge toner onto the photosensitive drums 51.

Further, by applying the transferring bias Vt to the transfer rollers 74, the controller 200 starts the transferring process to cause the photosensitive drums 51 to transfer toner to the transfer belt 73. Further, by applying the belt cleaning bias Vbc to the belt cleaning roller 101, the controller 200 starts the second collecting process to cause the belt cleaner 100 to collect toner on the transfer belt 73.

Subsequently, in S33 the controller 200 determines whether or not a first time T1 has elapsed since the drum cleaning bias Vc1*n* has been switched from −Vc1 to +Vc2. The controller 200 waits until the first time T1 has elapsed (S33: NO). When the first time T1 has elapsed (S33: YES), in S34 the controller 200 switches the drum cleaning bias Vc1*n* from +Vc2 to −Vc1 and turns off the transferring bias Vt (t34 in FIG. 8). The first time T1 is set to a length of time required for the drum cleaning rollers 53 to make at least one rotation, for example.

By applying the drum cleaning bias −Vc1 to the drum cleaning rollers 53, the controller 200 controls the drum cleaning rollers 53 to collect toner on the photosensitive drums 51. In other words, the controller 200 ends the discharging process by switching the drum cleaning bias Vc1*n* applied to the drum cleaning rollers 53 from +Vc2 to −Vc1. The controller 200 also ends the transferring process by turning off the transferring bias Vt. At this time, the controller 200 continues to execute the second collecting process.

Subsequently, in S35 the controller 200 determines whether or not a second time T2 has elapsed since the transferring bias Vt has been turned off. The controller 200 waits until the second time T2 has elapsed (S35: NO). When the second time T2 has elapsed (S35: YES), in S36 the controller 200 turns off the charging bias Vg, the developing bias Vb, the drum cleaning bias Vc1*n*, and the belt cleaning bias Vbc (t36 in FIG. 8) and ends the cleaning operation. The second time T2 is set longer than or equal to a length of time required for a portion of the transfer belt 73 that faces the first photosensitive drum 51Y to move to a position facing the belt cleaning roller 101 in accordance with the circular movement of the transfer belt 73.

By turning off the charging bias Vg, the controller 200 ends the charging bias applying process. Further, by turning off the developing bias Vb, the controller 200 ends the developing bias applying process. Further, by turning off the belt cleaning bias Vbc, the controller 200 ends the second collecting process. While executing the cleaning operation (t31 to t36 in FIG. 8), the controller 200 maintains the exposure unit 40 off so that the surfaces of the photosensitive drums 51 are not exposed to light.

Referring back to FIG. 5, after completing the cleaning operation, in S41 the controller 200 turns off the process motor M1 (t41 in FIG. 8), thereby stopping the rotation of the photosensitive drums 51 and the drum cleaning rollers 53.

With the color printer 1 according to the present embodiment, which employs a two-component developing system including the magnetic rollers 61 configured to supply toner to the photosensitive drums 51, the drum cleaning rollers 53 can collect toner on the photosensitive drums 51 when the color printer 1 executes the printing operation. Further, when executing the cleaning operation in the color printer 1 employing the two-component developing system, toner collected by the drum cleaning rollers 53 during the printing operation can be collected by the belt cleaner 100 through the photosensitive drums 51 and the transfer belt 73 to be accommodated in the waste toner accommodating unit 109.

When executing the cleaning operation, the color printer 1 can also set the surface potential on the sleeves 61B of the magnetic rollers 61 to have an absolute value that is greater than an absolute value of the surface potential on the photosensitive drums 51 by executing the developing bias applying process. This operation can suppress toner on the photosensitive drums 51 from moving to the magnetic rollers 61 while the cleaning operation is executed.

Further, since the rotation of the sleeves 61B of the magnetic rollers 61 is stopped while the cleaning operation is executed, the color printer 1 can suppress toner on the magnetic rollers 61 from moving to the photosensitive drums 51 during the cleaning operation.

Further, the drum cleaning rollers 53 are provided to correspond to the respective four photosensitive drums 51 in the present embodiment. Therefore, even when toner of different colors gets adhered to the surface of the photosensitive drum 51 through the transfer belt 73 during the printing operation, the corresponding drum cleaning roller 53 can collect the adhered toner. This operation can suppress toner of different colors adhered to the surface of the photosensitive drum 51 from moving to the magnetic roller 61 or being transferred to the sheet S.

Further, since the scorotron chargers 52 are employed as chargers, the scorotron chargers 52 need not be in contact with the photosensitive drums 51. Accordingly, the scorotron chargers 52 need not separate from the photosensitive drums 51 when the cleaning operation is executed.

Modifications to First Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The color printer 1 in the embodiment described above applies the developing bias Vb1 to the magnetic rollers 61 when executing the printing operation and applies the developing bias Vb2 to the magnetic rollers 61 in the developing bias applying process when executing the cleaning operation, but the present disclosure is not limited to this method. For example, the color printer 1 may apply the same developing bias Vb1 applied when executing the printing operation to the magnetic rollers 61 in the developing bias applying process when executing the cleaning operation.

When executing the cleaning operation, the color printer 1 in the above embodiment sets the surface potential of the magnetic rollers 61 to an absolute value that is greater than an absolute value of the surface potential of the photosensitive drums 51 by applying the developing bias Vb2 to the magnetic rollers 61, but the present disclosure is not limited to this method.

For example, the color printer 1 may set the surface potential of the photosensitive drums 51 to an absolute value that is smaller than the absolute value of the surface potential of the magnetic rollers 61 when executing the cleaning operation. Specifically, the color printer 1 may reduce the absolute value of the surface potential on the photosensitive drums 51 by applying, to the scorotron chargers 52, a charging bias Vg whose absolute value is smaller than that of the charging bias Vg applied when executing the printing operation.

Alternatively, the color printer 1 may reduce the absolute value of the surface potential on the photosensitive drums 51 by exposing the surfaces of the photosensitive drums 51 to light using the exposure unit 40. Alternatively, when executing the cleaning operation, the color printer 1 may set the surface potential on the magnetic rollers 61 and the photosensitive drums 51 so that the absolute value of the surface potential on the magnetic rollers 61 becomes approximately the same as the absolute value of the surface potential on the photosensitive drums 51.

The color printer 1 in the above embodiment stops the rotation of the sleeves 61B when executing the cleaning operation, but the present disclosure is not limited to this method. For example, the color printer 1 may rotate the sleeves 61B while executing the cleaning operation.

The color printer 1 in the above embodiment starts the discharging process, the transferring process, and the second collecting process simultaneously in the cleaning operation, but the present disclosure is not limited to this method. For example, in the cleaning operation, the color printer 1 may start executing the discharging process, the transferring process, and the second collecting process in this sequence.

The color printer 1 in the above embodiment simultaneously ends the discharging process and the transferring process in the cleaning operation, but the present disclosure is not limited to this method. For example, in the cleaning operation, the color printer 1 may end the transferring process after ending the discharging process.

In the above embodiment, the sleeves 61B are driven by the process motor M1, which also drives the photosensitive drums 51 and the like, but the present disclosure need not be limited to this configuration. For example, the magnetic rollers 61 may be driven by a motor other than the process motor M1. The motor other than the process motor M1 may be a motor exclusively for driving the sleeves 61B. In a case where a motor exclusively for driving the sleeves 61B is provided, the controller 200 may be configured to turn on the motor to rotate the sleeves 61B and turn off the motor to stop the rotation of the sleeves 61B.

In the above embodiment, each of the magnetic rollers 61 includes the magnetic shaft 61A and the sleeve 61B, and only the sleeve 61B is rotatable. However, other configurations may be employed. For example, the entire magnetic roller may be rotatable.

Although the scorotron chargers 52 are employed as the chargers in the above embodiment, the chargers are not limited to this configuration. For example, the chargers may be corotron chargers that do not include any grid electrode. Alternatively, the chargers may be charging rollers.

In the above embodiment, the exposure unit 40 configured to emit laser beams onto the photosensitive drums 51 serves as an example of an exposure unit for exposing the surfaces of the photosensitive drums 51 to light, but the present disclosure is not limited to this configuration. For example, the exposure unit may include an exposure head having a plurality of LEDs arranged in the first direction, and may be configured to expose the surfaces of the photosensitive drums to light by emitting light onto the photosensitive drums from the LEDs.

The transfer belt 73 in the above embodiment is a belt configured to convey the sheet S in cooperation with the photosensitive drums 51, but the present disclosure is not limited to this configuration. For example, the transfer belt may be a so-called intermediate transfer belt, and the transfer unit may further include a secondary transfer roller for transferring toner images on the intermediate transfer belt onto the sheet.

Although the belt cleaner 100 in the above embodiment includes the belt cleaning roller 101, the collecting roller 102, and the scraping blade 103, the belt cleaner need not be limited to this configuration. For example, the collecting roller may be omitted from the belt cleaner. Further, in place of the belt cleaning roller, the belt cleaner may include a cleaning blade configured to collect toner from the transfer belt.

In the above embodiment, the toner cartridges TC that accommodate therein toner are attachable to and detachable from the drum unit 50 that includes the photosensitive drums 51 and the developing units 60 (the magnetic rollers 61). However, the present disclosure need not be limited to this configuration. For example, a cartridge including a magnetic roller and a toner accommodating unit that accommodates therein toner may be attachable to and detachable from a drum unit that includes the photosensitive drum. Additionally, the toner accommodating unit may be configured not to be detachable from the drum unit including the photosensitive drum and the magnetic roller. In other words, the drum unit may be integrally configured of the photosensitive drum, the magnetic roller, and the toner accommodating unit.

In the above embodiment, the color printer 1 including pluralities of photosensitive drums 51, magnetic rollers 61, and drum cleaning rollers 53 serves as an example of the image forming apparatus, but other types of printers may be employed as the image forming apparatus. For example, the image forming apparatus may be a monochromatic printer including only one photosensitive drum, one magnetic roller, and one drum cleaning roller. Further, the image forming apparatus need not be limited to a printer but may be a copying machine or a multifunction peripheral, for example.

Although the first polarity in the above embodiment is positive, the present disclosure need not be limited to this configuration. For example, the first polarity may be negative. In other words, the image forming apparatus need not be limited to a device that uses positively charged toner but may be a device that uses negatively charged toner.

Note that, in a case where the image forming apparatus uses negatively charged toner, the positive and negative biases are opposite those used in the above embodiment. That is, the charging bias Vg, the developing bias Vb, and the drum cleaning bias Vc1*n* for discharging toner are all negative. Further, the transferring bias Vt, the drum cleaning bias Vc1*n* for collecting toner, and the belt cleaning bias Vbc are all positive.

The elements described in the above embodiment and modifications may be suitably combined to be implemented.

SECOND EMBODIMENT

Next, a second embodiment of the present disclosure will be described in detail while referencing the accompanying drawings as appropriate.

Figure 9:
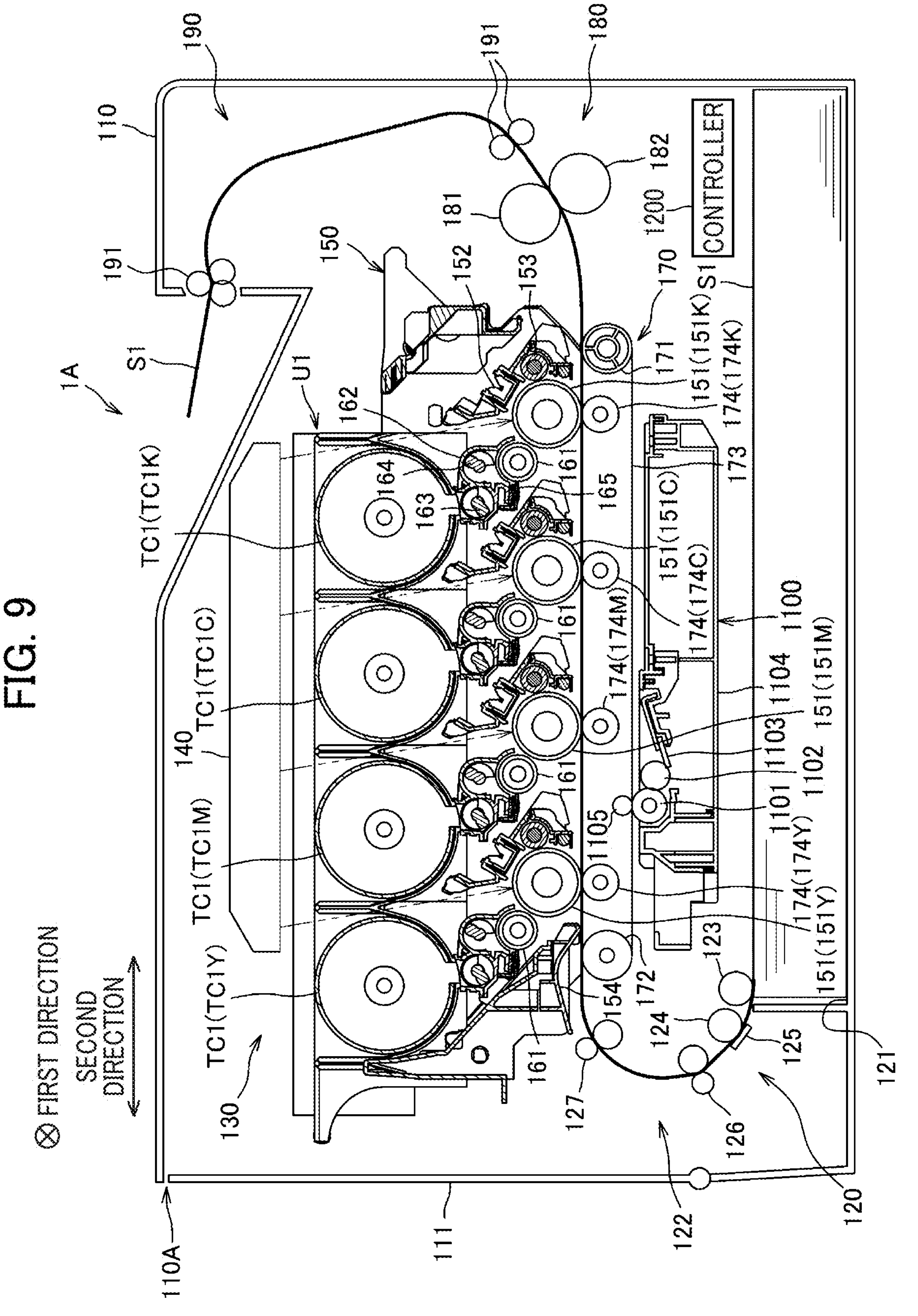
FIG. 9 is a cross-sectional view illustrating an image forming apparatus.

As illustrated in FIG. 9, a color printer 1A as an example of the image forming apparatus includes a main casing 110, a sheet feeding unit 120, an image forming unit 130, a discharging unit 190, a belt cleaner 1100, and a controller 1200.

The main casing 110 has an opening 110A, and includes a front cover 111. The front cover 111 is movable between an open position (see FIG. 10) in which the front cover 111 opens the opening 110A, and a closed position (see FIG. 9) in which the front cover 111 closes the opening 110A. Specifically, the front cover 111 is pivotally movable between the open position and the closed position.

The sheet feeding unit 120 includes a feeding tray 121, and a sheet conveying mechanism 122. The feeding tray 121 accommodates therein sheet(s) S1. The sheets S1 are paper, for example. The sheet conveying mechanism 122 is configured to convey the sheet S1 from the feeding tray 121 to the image forming unit 130. The sheet conveying mechanism 122 includes a pick-up roller 123, a separation roller 124, a separation pad 125, conveying rollers 126, and registration rollers 127.

The pick-up roller 123 is configured to feed the sheets S1 from the feeding tray 121. The separation roller 124 and the separation pad 125 are configured to separate the sheets S1 fed from the feeding tray 121 one by one. The conveying rollers 126 and the registration rollers 127 are configured to convey the sheets S1. The registration rollers 127 are also configured to correct skew in the sheet S1 by straightening a leading edge of the sheet S1.

The image forming unit 130 includes an exposure unit 140, a process unit U1, a transfer unit 170, and a fixing device 180.

The exposure unit 140 is configured to expose four photosensitive drums 151 (151Y, 151M, 151C, and 151K; see FIG. 11) described later to light. Although not illustrated in the drawings, the exposure unit 140 includes a laser emitting unit, a polygon mirror, lenses, reflecting mirrors, and the like. The exposure unit 140 is configured to emit laser beams onto the photosensitive drums 151, as depicted by virtual lines in FIG. 9.

The process unit U1 includes a drum unit 150, and four toner cartridges TC1.

Each of the toner cartridges TC1 accommodates therein toner which is non-magnetic material. The toner is positively charged toner. The four toner cartridges TC1 are arranged in a second direction (described later). Specifically, the toner cartridges TC1 include a first toner cartridge TC1K that accommodates therein toner of black, a second toner cartridge TC1Y that accommodates therein toner of yellow, a third toner cartridge TC1M that accommodates therein toner of magenta, and a fourth toner cartridge TC1C that accommodates therein toner of cyan. The toner cartridges TC1Y, TC1M, TC1C, and TC1K are arranged in this order from upstream to downstream in a conveying direction of the sheets S1.

Figure 10:
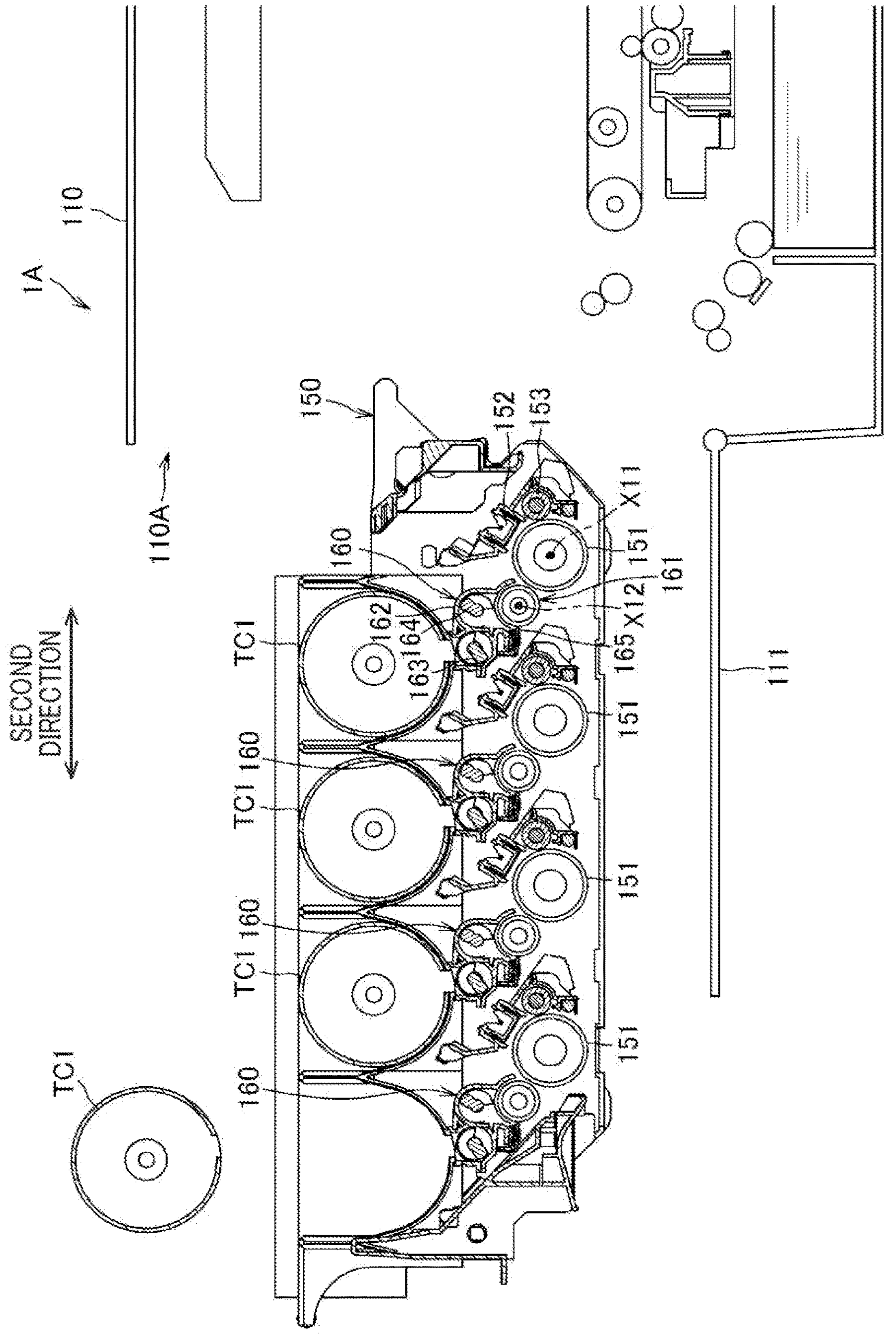
FIG. 10 is a cross-sectional view illustrating a state where a drum unit is in its pulled-out position.

As illustrated in FIG. 10, the toner cartridges TC1 are attachable to and detachable from the drum unit 150. Specifically, the toner cartridges TC1 are attachable and detachable in a direction orthogonal to a first direction in which first axes X11 extend.

Figure 11:
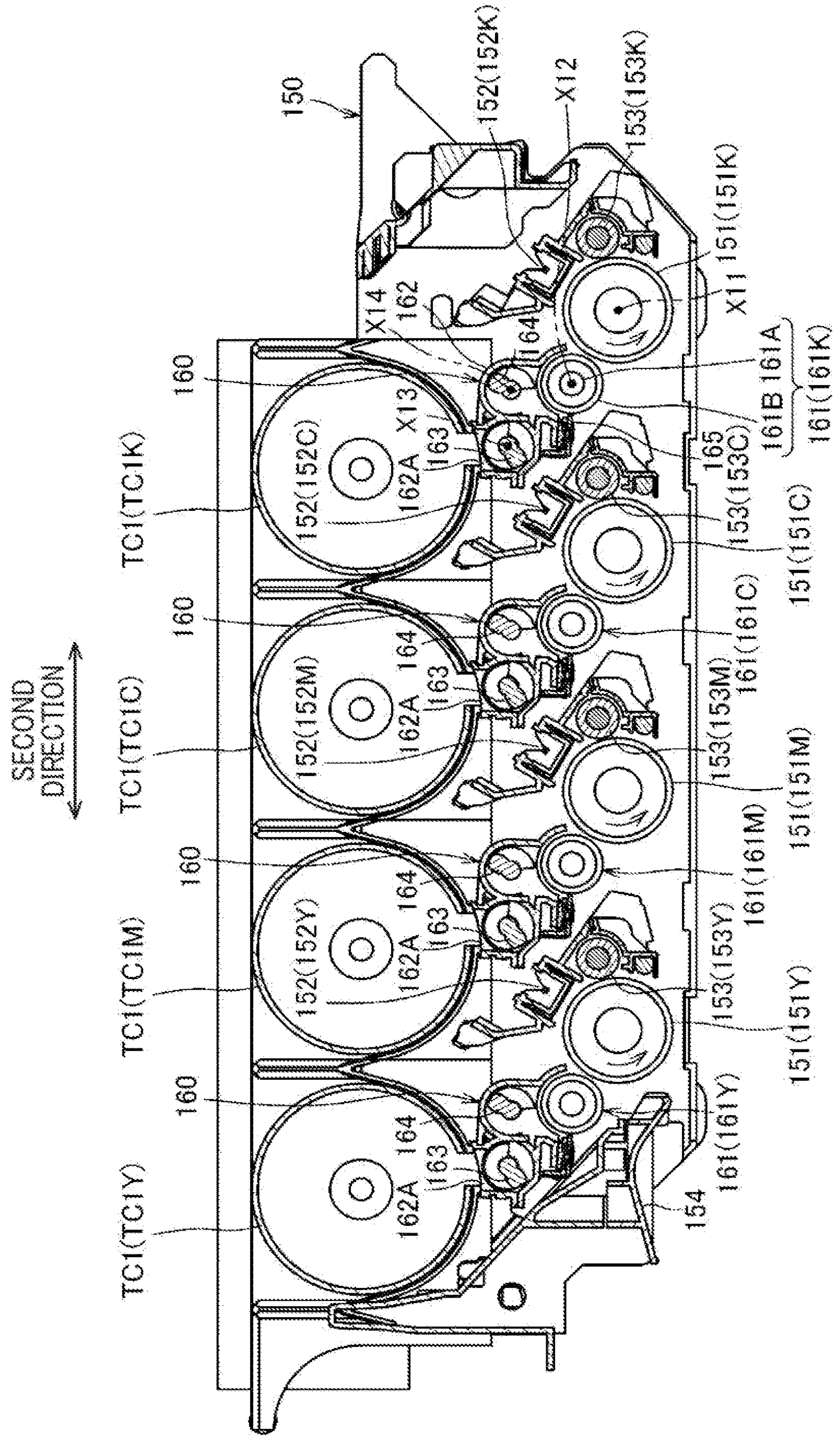
FIG. 11 is a cross-sectional view illustrating the drum unit to which toner cartridges are attached.

The drum unit 150 is movable through the opening 110A in the second direction relative to the main casing 110. Specifically, the drum unit 150 is movable in the second direction relative to the main casing 110 between an accommodated position (see FIG. 9) in which the drum unit 150 is positioned inside the main casing 110, and a pulled-out position (see FIG. 10) in which the drum unit 150 is pulled out of the main casing 110. As illustrated in FIG. 11, the drum unit 150 includes the four photosensitive drums 151, four scorotron chargers 152, four cleaning rollers 153, four developing units 160, and a sheet guide 154.

Each of the photosensitive drums 151 is rotatable about its first axis X11 extending in the first direction. The second direction is a direction crossing the first direction. Specifically, the second direction is a direction orthogonal to the first direction. The four photosensitive drums 151 are arranged in the second direction. The photosensitive drums 151 include a first photosensitive drum 151K corresponding to toner of black, a second photosensitive drum 151Y corresponding to toner of yellow, a third photosensitive drum 151M corresponding to toner of magenta, and a fourth photosensitive drum 151C corresponding to toner of cyan.

The photosensitive drums 151Y, 151M, 151C, and 151K are arranged in this order from upstream to downstream in the conveying direction of the sheets S1. Specifically, among the four photosensitive drums 151, the second photosensitive drum 151Y is positioned most upstream in a direction in which a top surface of a conveying belt 173 (described later) that faces the photosensitive drums 151 moves (hereinafter simply referred to as "moving direction"). The third photosensitive drum 151M is positioned downstream of the second photosensitive drum 151Y in the moving direction. The fourth photosensitive drum 151C is positioned downstream of the third photosensitive drum 151M in the moving direction. The first photosensitive drum 151K is positioned downstream of the third photosensitive drum 151M in the moving direction. The first photosensitive drum 151K is positioned most downstream in the moving direction among the four photosensitive drums 151.

Put another way, the third photosensitive drum 151M is positioned closer to the fixing device 180 (see FIG. 9) than the second photosensitive drum 151Y is to the fixing device 180. The fourth photosensitive drum 151C is positioned closer to the fixing device 180 than the third photosensitive drum 151M is to the fixing device 180. The first photosensitive drum 151K is positioned closer to the fixing device 180 than the fourth photosensitive drum 151C is to the fixing device 180.

The scorotron chargers 152 are configured to charge the corresponding photosensitive drums 151. Each of the scorotron chargers 152 includes a discharge wire, a grid electrode, and the like depicted without reference numerals. When a positive charging bias Vg having the same polarity as the toner is applied to the scorotron charger 152, the scorotron charger 152 charges a surface of the corresponding photosensitive drum 151.

The scorotron chargers 152 include a first scorotron charger 152K, a second scorotron charger 152Y, a third scorotron charger 152M, and a fourth scorotron charger 152C. The first scorotron charger 152K is configured to charge the surface of the first photosensitive drum 151K. The second scorotron charger 152Y is configured to charge the surface of the second photosensitive drum 151Y. The third scorotron charger 152M is configured to charge the surface of the third photosensitive drum 151M. The fourth scorotron charger 152C is configured to charge the surface of the fourth photosensitive drum 151C.

Note that the chargers for charging the photosensitive drums 151 are not limited to the scorotron chargers 152, but may be corotron chargers or charging rollers, for example.

Each of the cleaning rollers 153 is a roller configured to collect toner on the corresponding photosensitive drum 151 when forming images on the sheet S1. The cleaning roller 153 is also configured to discharge collected toner onto the corresponding photosensitive drum 151.

Specifically, each of the cleaning rollers 153 can collect toner on the corresponding photosensitive drum 151 and can also discharge collected toner onto the corresponding photosensitive drum 151 when a cleaning bias Vc1*n* is applied to the cleaning roller 153. More specifically, each of the cleaning rollers 153 collects toner on the corresponding photosensitive drum 151 when a negative cleaning bias −Vc1 of a polarity opposite to the toner's charged polarity is applied to the cleaning roller 153. The cleaning roller 153 also discharges toner onto the corresponding photosensitive drum 151 when a positive cleaning bias +Vc2 is applied to the cleaning roller 153.

The cleaning rollers 153 include a first cleaning roller 153K, a second cleaning roller 153Y, a third cleaning roller 153M, and a fourth cleaning roller 153C. The first cleaning roller 153K is configured to collect toner on the first photosensitive drum 151K and is configured to discharge collected toner onto the first photosensitive drum 151K. The second cleaning roller 153Y is configured to collect toner on the second photosensitive drum 151Y and is configured to discharge collected toner onto the second photosensitive drum 151Y. The third cleaning roller 153M is configured to collect toner on the third photosensitive drum 151M and is configured to discharge collected toner onto the third photosensitive drum 151M. The fourth cleaning roller 153C is configured to collect toner on the fourth photosensitive drum 151C and is configured to discharge collected toner onto the fourth photosensitive drum 151C.

The four developing units 160 are arranged in the second direction. The developing units 160 are positioned between the toner cartridges TC1 and the photosensitive drums 151. Specifically, the developing units 160 are positioned between the toner cartridges TC1 and the first axes X11 in the direction in which the toner cartridges TC1 are attached to and detached from the drum unit 150, which is orthogonal to the first direction. The developing units 160 are positioned higher than the first axes X11. The developing units 160 are positioned lower than the toner cartridges TC1. Each of the developing units 160 includes a magnetic roller 161, a developing container 162, a first auger 163, a second auger 164, and a thickness-regulating member 165.

The magnetic roller 161 is a roller configured to hold carrier and toner on a surface thereof and to supply toner to the corresponding photosensitive drum 151. The magnetic roller 161 supplies toner to a part of the surface of the corresponding photosensitive drum 151 that has been exposed by the exposure unit 140. When a positive developing bias Vb is applied to a sleeve 161B (described later) of the magnetic roller 161, the magnetic roller 161 supplies toner to the exposed part of the surface of the corresponding photosensitive drum 151.

Each of the magnetic roller 161 is positioned between the corresponding toner cartridge TC1 and photosensitive drum 151. The magnetic roller 161 faces the surface of the corresponding photosensitive drum 151. The magnetic roller 161 is positioned to be spaced apart from the surface of the corresponding photosensitive drum 151. That is, the magnetic roller 161 is not in contact with the corresponding photosensitive drum 151.

The magnetic rollers 161 include a first magnetic roller 161K, a second magnetic roller 161Y, a third magnetic roller 161M, and a fourth magnetic roller 161C. The first magnetic roller 161K is configured to supply toner to the first photosensitive drum 151K. The first magnetic roller 161K is positioned to be spaced apart from the first photosensitive drum 151K. The second magnetic roller 161Y is configured to supply toner to the second photosensitive drum 151Y. The second magnetic roller 161Y is positioned to be spaced apart from the second photosensitive drum 151Y. The third magnetic roller 161M is configured to supply toner to the third photosensitive drum 151M. The third magnetic roller 161M is positioned to be spaced apart from the third photosensitive drum 151M. The fourth magnetic roller 161C is configured to supply toner to the fourth photosensitive drum 151C. The fourth magnetic roller 161C is positioned to be spaced apart from the fourth photosensitive drum 151C.

Each of the magnetic rollers 161 includes a magnetic shaft member 161A, and the sleeve 161B. The magnetic shaft member 161A has alternating magnetic poles arranged in a circumferential direction thereof with a predetermined pattern. The magnetic shaft member 161A is a solid cylindrical member in which a plurality of permanent magnets are embedded, for example. The magnetic shaft member 161A is fixed to the developing container 162.

The sleeve 161B is configured of a hollow cylindrical member formed primarily of non-magnetic metal material, for example. The sleeve 161B is rotatable relative to the magnetic shaft member 161A. Specifically, the sleeve 161B is rotatable about a second axis X12 extending in the first direction. The sleeve 161B is configured to hold carrier on the surface thereof through a magnetic force of the magnetic shaft member 161A, and to hold toner through the carrier. Some of the carrier (CA1 in FIG. 13) held on the surface of the sleeve 161B makes contact with the surface of the corresponding photosensitive drum 151.

Each of the developing containers 162 is a container that accommodates therein magnetic carrier. The carrier is iron powder, for example. Each of the developing containers 162 has a supply port 162A allowing toner to be supplied from the corresponding toner cartridge TC1 therethrough. The supply port 162A is positioned on the opposite side of the first auger 163 and the second auger 164 from the magnetic roller 161. The supply port 162A is positioned higher than the first auger 163 and the second auger 164. Specifically, the supply port 162A is positioned above the first auger 163. The second axis X12 is positioned lower than the first auger 163 and the second auger 164. Specifically, the second axis X12 is positioned below the second auger 164.

The first auger 163 is positioned inside the developing container 162. The first auger 163 is rotatable about a third axis X13 that extends in the first direction. The first auger 163 is juxtaposed with the second auger 164 in the second direction. The first auger 163 is positioned closer to the supply port 162A than the second auger 164 is to the supply port 162A. The first auger 163 is configured to circulate the carrier and the toner inside the developing container 162. The first auger 163 is also configured to convey the toner supplied into the developing container 162 through the supply port 162A to the second auger 164.

The second auger 164 is positioned inside the developing container 162. The second auger 164 is rotatable about a fourth axis X14 that extends in the first direction. The second auger 164 is configured to convey the carrier and the toner in the developing container 162 toward the magnetic roller 161. That is, the second auger 164 is configured to supply the toner onto the magnetic roller 161. The second auger 164 is also configured to circulate the carrier and the toner inside the developing container 162.

Each of the thickness-regulating members 165 is a member configured to regulate a thickness of a toner layer on the magnetic roller 161. The thickness-regulating member 165 is not in contact with the magnetic roller 161. The thickness-regulating member 165 is positioned lower than the first auger 163 and the second auger 164. Specifically, the thickness-regulating member 165 is positioned below the first auger 163. The thickness-regulating member 165 is juxtaposed with the magnetic roller 161 in the second direction. The second axis X12 is positioned between the corresponding thickness-regulating member 165 and first axis X11 in the second direction.

The sheet guide 154 a guide configured to guide the sheets S1 toward the photosensitive drums 151. The sheet guide 154 is aligned with the photosensitive drums 151 in the second direction. The sheet guide 154 is positioned upstream of the four photosensitive drums 151 in the conveying direction of the sheets S1.

The magnetic roller 161 positioned most upstream in the conveying direction of the sheets S1 (i.e., the second magnetic roller 161Y) is positioned between the sheet guide 154 and the second auger 164 positioned most upstream in the conveying direction of the sheet S1. The thickness-regulating member 165 positioned most upstream in the conveying direction of the sheets S1 is positioned between the sheet guide 154 and the first auger 163 positioned most upstream in the conveying direction of the sheet S1.

As illustrated in FIG. 9, the transfer unit 170 is configured to transfer toner images on the photosensitive drums 151 (151Y, 151M, 151C, and 151K) onto the sheet S1. The transfer unit 170 is positioned between the sheet feeding unit 120 and the drum unit 150. The transfer unit 170 includes a drive roller 171, a follow roller 172, the conveying belt 173 which is an endless belt, and four transfer rollers 174.

The drive roller 171 and the follow roller 172 are spaced apart from each other in the second direction. The drive roller 171 and the follow roller 172 support the conveying belt 173. The conveying belt 173 faces the second photosensitive drum 151Y, the third photosensitive drum 151M, the fourth photosensitive drum 151C, and the first photosensitive drum 151K. The transfer rollers 174 are positioned within a space encircled by the conveying belt 173. The transfer rollers 174 nip the conveying belt 173 in cooperation with the corresponding photosensitive drums 151. When a negative transferring bias Vt is applied to the transfer rollers 174, the transfer rollers 174 cause toner on the photosensitive drums 151 to be transferred.

The transfer rollers 174 include a first transfer roller 174K, a second transfer roller 174Y, a third transfer roller 174M, and a fourth transfer roller 174C. The first transfer roller 174K nips the conveying belt 173 in cooperation with the first photosensitive drum 151K to cause the toner on the first photosensitive drum 151K to be transferred. The second transfer roller 174Y nips the conveying belt 173 in cooperation with the second photosensitive drum 151Y to cause the toner on the second photosensitive drum 151Y to be transferred. The third transfer roller 174M nips the conveying belt 173 in cooperation with the third photosensitive drum 151M to cause the toner on the third photosensitive drum 151M to be transferred. The fourth transfer roller 174C nips the conveying belt 173 in cooperation with the fourth photosensitive drum 151C to cause the toner on the fourth photosensitive drum 151C to be transferred.

The fixing device 180 is configured to fix the toner image that has been transferred onto the sheet S1 to the sheet S1. The fixing device 180 includes a heating roller 181, and a pressure roller 182. The pressure roller 182 and the heating roller 181 are configured to nip the sheet S1 therebetween.

In the image forming unit 130, the scorotron chargers 152 charge the surfaces of the corresponding photosensitive drums 151. Subsequently, the exposure unit 140 exposes the surfaces of the photosensitive drums 151 to light, thereby forming electrostatic latent images on the photosensitive drums 151.

The toner cartridges TC1 supply toner into the corresponding developing containers 162. The first augers 163 convey the toner and the carrier in the developing containers 162 to the corresponding second augers 164. The second augers 164 convey the toner and the carrier in the developing containers 162 to the corresponding magnetic rollers 161. The magnetic rollers 161 supply the toner to the electrostatic latent images on the corresponding photosensitive drums 151, thereby forming toner images on the photosensitive drums 151.

The conveying belt 173 conveys the sheet S1 between the conveying belt 173 itself and the photosensitive drums 151. The sheet S1 passes between the photosensitive drums 151 and the corresponding transfer rollers 174. At this time, the toner images on the photosensitive drums 151 are transferred onto the sheet S1. Thereafter, the sheet S1 passes between the heating roller 181 and the pressure roller 182. Accordingly, the toner images on the sheet S1 are thermally fixed to the sheet S1.

The discharging unit 190 includes a plurality of conveying rollers 191. The conveying rollers 191 are configured to discharge the sheet S1 out of the main casing 110.

The belt cleaner 1100 is configured to collect toner, paper dust, and other adherents on the conveying belt 173. The belt cleaner 1100 includes a belt cleaning roller 1101, a collecting roller 1102, a scraping blade 1103, a collected matter accommodating container 1104, and a backup roller 1105. The backup roller 1105 is positioned within the space encircled by the conveying belt 173. The backup roller 1105 and the belt cleaning roller 1101 nip the conveying belt 173 therebetween.

The belt cleaning roller 1101 is configured to collect adherents on the conveying belt 173. Specifically, the belt cleaning roller 1101 collects adherents on the conveying belt 173 when a negative belt cleaning bias Vbc is applied to the belt cleaning roller 1101. The collecting roller 1102 is configured to collect adherents on the belt cleaning roller 1101. The scraping blade 1103 is configured to scrape adherents off the collecting roller 1102.

The collected matter accommodating container 1104 is a container configured to accommodate therein adherents collected by the belt cleaning roller 1101. Specifically, the collected matter accommodating container 1104 accommodates therein adherents collected from the belt cleaning roller 1101 by the collecting roller 1102 and scraped off the collecting roller 1102 by the scraping blade 1103.

Figure 12:
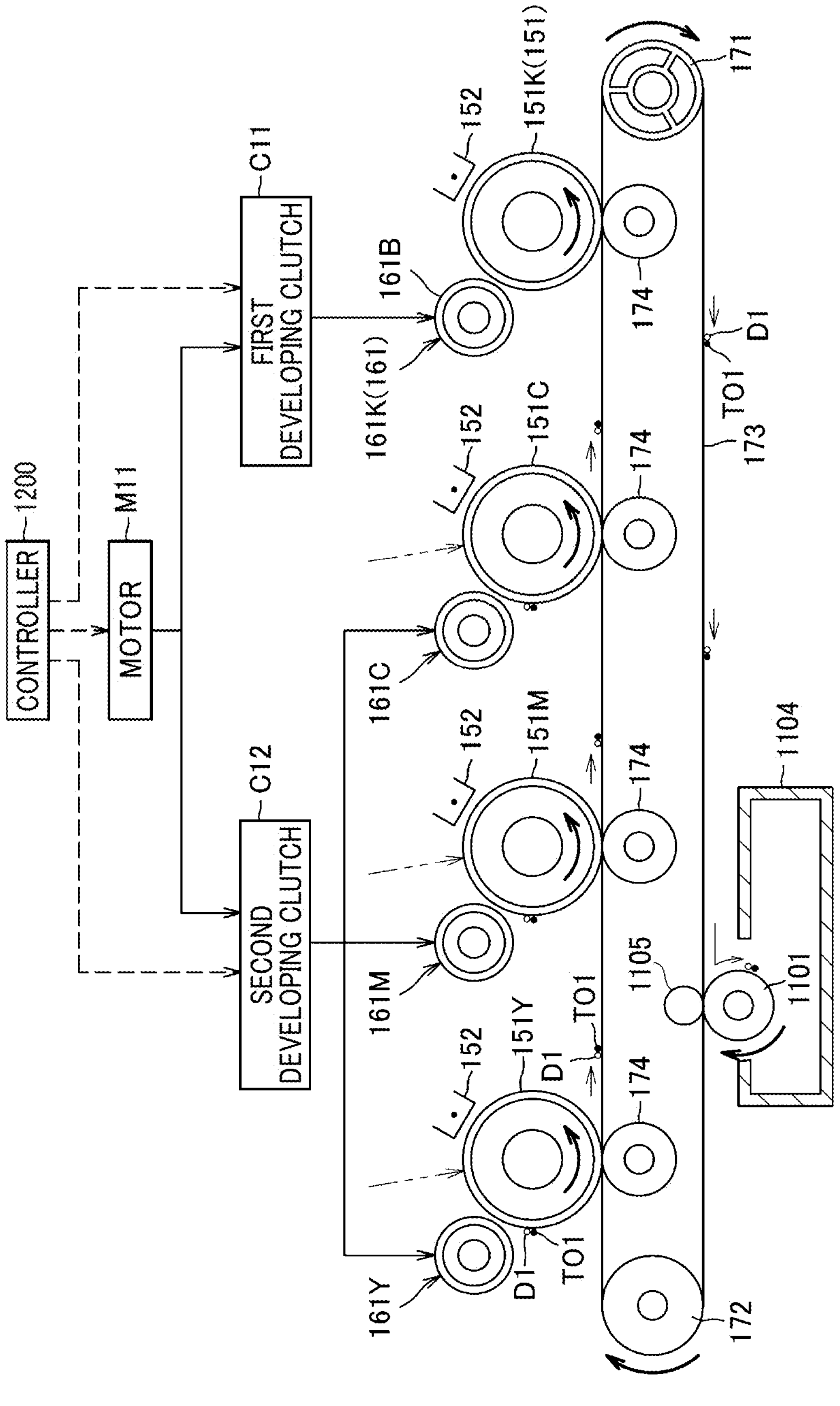
FIG. 12 is an explanatory view of components subjected to control by a controller, and a paper dust collecting operation.

As illustrated in FIG. 12, the color printer 1A further includes a motor M11, a first developing clutch C11, and a second developing clutch C12.

The motor M11 is a motor configured to drive the photosensitive drums 151, the drive roller 171, the belt cleaning roller 1101, and the like. A driving force of the motor M1 is transmitted to the photosensitive drums 151, the drive roller 171, the belt cleaning roller 1101, and the like via a gear train (not illustrated).

The motor M11 is configured to also drive the sleeves 161B of the magnetic rollers 161. The driving force of the motor M11 is transmitted to the magnetic rollers 161 via a developing gear train (not illustrated). The developing gear train includes the first developing clutch C11 and the second developing clutch C12 which are controlled by the controller 1200.

The first developing clutch C11 and the second developing clutch C12 are electromagnetic clutches, for example. The first developing clutch C11 is switchable between a transmission state in which the first developing clutch C11 transmits the driving force from the motor M11 to the first magnetic roller 161K, and a cutoff state in which the first developing clutch C11 does not transmit the driving force from the motor M11 to the first magnetic roller 161K. The controller 1200 rotates the first magnetic roller 161K by setting the first developing clutch C11 to the transmission state. The controller 1200 also stops rotation of the first magnetic roller 161K by setting the first developing clutch C11 to the cutoff state.

The second developing clutch C12 is switchable between a transmission state in which the second developing clutch C12 transmits the driving force from the motor M11 to the magnetic rollers 161Y, 161M, and 161C, and a cutoff state in which the second developing clutch C12 does not transmit the driving force from the motor M11 to the magnetic rollers 161Y, 161M, and 161C. The controller 1200 rotates the magnetic rollers 161Y, 161M, and 161C by setting the second developing clutch C12 to the transmission state. The controller 1200 also stops rotation of the magnetic rollers 161Y, 161M, and 161C by setting the second developing clutch C12 to the cutoff state.

In the following description, setting the developing clutches C11 and C12 to their transmission states will be referred to as "turning on the developing clutches C11 and C12", and setting the developing clutches C11 and C12 to their cutoff states will be referred to as "turning off the developing clutches C11 and C12".

The controller 1200 includes a CPU, a RAM, a ROM, input/output circuits, and the like. The controller 1200 is configured to execute control by performing various arithmetic operations on the basis of programs and data stored in the ROM and the like. The controller 1200 is configured to control the motor M11, the first developing clutch C11, and the second developing clutch C12. The controller 1200 is configured to also control the charging bias Vg, the developing bias Vb, the cleaning bias Vc1*n*, the transferring bias Vt, and the belt cleaning bias Vbc.

The controller 1200 is configured to execute a color printing operation, and a monochromatic printing operation.

In the color printing operation, the controller 1200 forms toner images on the four photosensitive drums 151 (151Y, 151M, 151C, and 151K) and transfers sequentially the toner images on the four photosensitive drums 151 onto the sheet S1 to form a color image on the sheet S1. In the color printing operation, the controller 1200 rotates the four photosensitive drums 151. Further, in the color printing operation, the controller 1200 turns on the first developing clutch C11 and the second developing clutch C12 to rotate the four magnetic rollers 161 (161Y, 161M, 161C, and 161K).

Further, in the monochromatic printing operation, the controller 1200 forms a toner image only on the first photosensitive drum 151K and transfers the toner image on the first photosensitive drum 151K onto the sheet S1 to form a monochromatic image on the sheet S1. In the monochromatic printing operation, the controller 1200 rotates all the four photosensitive drums 151. The controller 1200 also turns on the first developing clutch C11 in the monochromatic printing operation to rotate the first magnetic roller 161K. However, the controller 1200 turns off the second developing clutch C12 in the monochromatic printing operation to stop the rotation of the second magnetic roller 161Y, the third magnetic roller 161M, and the fourth magnetic roller 161C.

The controller 1200 is configured to also execute a cleaning operation. In the cleaning operation, the controller 1200 collects toner on the cleaning rollers 153 using the belt cleaner 1100 through the photosensitive drums 151 and the conveying belt 173. Note that the controller 1200 applies the cleaning bias −Vc1 to the cleaning rollers 153 while executing the color printing operation and while executing the monochromatic printing operation in order to move and collect any toner that has not been transferred onto the sheet S1 and remains on the photosensitive drums 151 onto the cleaning rollers 153, for example.

When executing the cleaning operation, the controller 1200 turns off the first developing clutch C11 and the second developing clutch C12, thereby placing the four magnetic rollers 161 in a stopped state. When executing the cleaning operation, the controller 1200 also applies the charging bias Vg to the scorotron chargers 152 for charging the surfaces of the photosensitive drums 151.

In the cleaning operation, the controller 1200 executes a toner discharging process, a toner moving process, and a toner collecting process.

In the toner discharging process, the controller 1200 moves toner from the cleaning rollers 153 onto the corresponding photosensitive drums 151. Specifically, the controller 1200 applies the cleaning bias +Vc2 to the cleaning rollers 153 to move toner from the cleaning rollers 153 onto the photosensitive drums 151.

In the toner moving process, the controller 1200 moves toner that has been transferred onto the photosensitive drums 151 in the toner discharging process from the photosensitive drums 151 onto the conveying belt 173. Specifically, the controller 1200 applies the transferring bias Vt to the transfer rollers 174 to transfer toner from the photosensitive drums 151 to the conveying belt 173.

In the toner collecting process, the controller 1200 collects, using the belt cleaning roller 1101, toner that has been transferred onto the conveying belt 173 in the toner moving process, and accommodates the collected toner in the collected matter accommodating container 1104. Specifically, the controller 1200 applies the belt cleaning bias Vbc to the belt cleaning roller 1101 to transfer toner on the conveying belt 173 onto the belt cleaning roller 1101. Thereafter, toner on the belt cleaning roller 1101 is collected by the collecting roller 1102, is scraped off the cleaning roller 1102 by the scraping blade 1103, and is accommodated in the collected matter accommodating container 1104.

In the present embodiment, the controller 1200 executes the cleaning operation after completing the color printing operation, and also after completing the monochromatic printing operation. Note that the controller 1200 may be configured to execute the cleaning operation after completing the printing operation when the number of sheets printed since start of the printing operation is greater than or equal to a prescribed cleaning threshold, and not to execute the cleaning operation when the number of sheets printed is less than the cleaning threshold, for example.

Figure 13A:
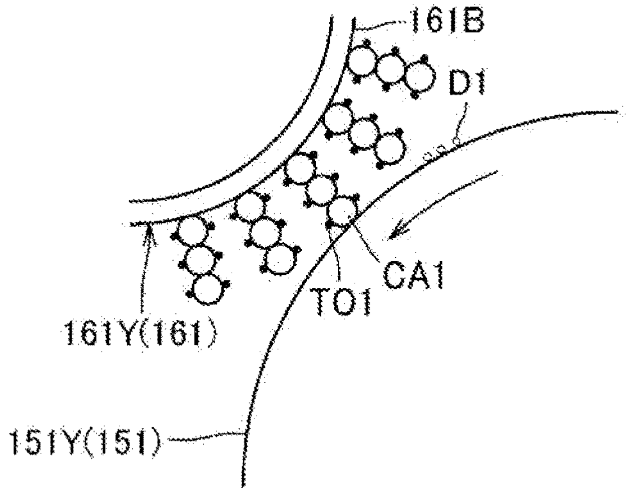
FIGS. 13A to 13C are views illustrating a state where paper dusts are accumulated on magnetic rollers for yellow, magenta, and cyan.
Figure 13B:
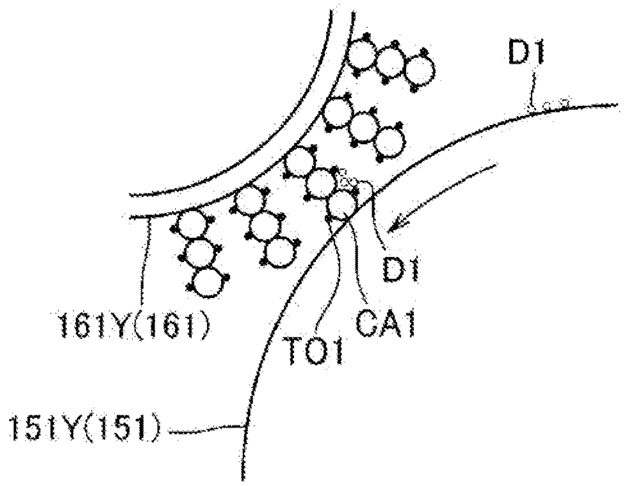

As illustrated in FIG. 13A, paper dust D1 on the sheet S1 may remain adhered to the surface of the rotating photosensitive drum 151 when the color printing operation or the monochromatic printing operation is executed. The paper dust D1 adhered to the surface of the photosensitive drum 151 may be adhered to carrier CA1 or toner TO1 on the surface of the magnetic roller 161, as illustrated in FIG. 13B.

Since the magnetic rollers 161 rotate while the color printing operation is executed, the paper dust D1 adhered to the surfaces of the magnetic rollers 161 is not accumulated in the same part on the surfaces of the magnetic rollers 161. This also applies to the first magnetic roller 161K while the monochromatic printing operation is executed.

Figure 13C:
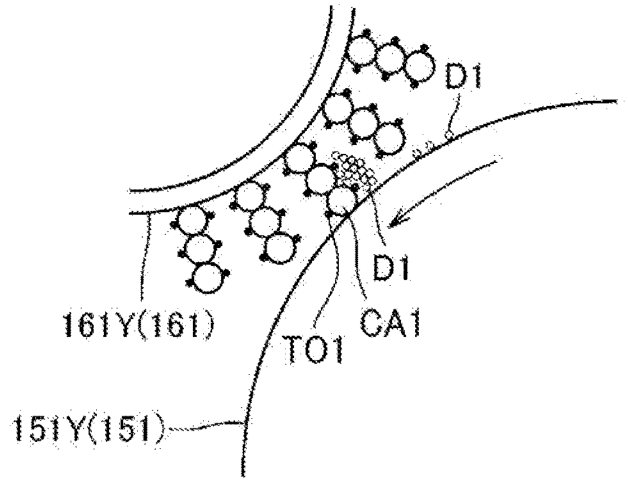

However, since the magnetic rollers 161Y, 161M, and 161C for color are stopped while the monochromatic printing operation is executed, there is a possibility that paper dust D1 adhered to the surfaces of the magnetic rollers 161Y, 161M, and 161C is accumulated in the same part on the surfaces of the magnetic rollers 161Y, 161M, and 161C, for example, as illustrated in FIG. 13C. The paper dust D1 accumulated in the magnetic rollers 161Y, 161M, and 161C could degrade the toner TO1 by decreasing the charging performance of the toner TO1, for example.

The controller 1200 in the present embodiment is configured to also execute a paper dust collecting operation. In the paper dust collecting operation, the controller 1200 collects paper dust D1 that is adhered to the second magnetic roller 161Y, the third magnetic roller 161M, and the fourth magnetic roller 161C.

When executing the paper dust collecting operation, the controller 1200 turns off the first developing clutch C11 and the second developing clutch C12 to place the four magnetic rollers 161 in a stopped state. When executing the paper dust collecting operation, the controller 1200 also applies the charging bias Vg to the scorotron chargers 152 to charge the surfaces of the photosensitive drums 151.

A magnitude of the charging bias Vg applied when executing the paper dust collecting operation is sufficient not to move toner on the magnetic rollers 161Y, 161M, and 161C to parts on the surfaces of the charged photosensitive drums 151 that are not exposed by the exposure unit 140. Specifically, the magnitude of the charging bias Vg is set so that an absolute value of the surface potential on the unexposed parts of the charged photosensitive drums 151 is greater than an absolute value of the surface potential on the magnetic rollers 161Y, 161M, and 161C.

In the paper dust collecting operation, the controller 1200 executes a first moving process, a second moving process, and a paper dust collecting process.

Figure 14A:
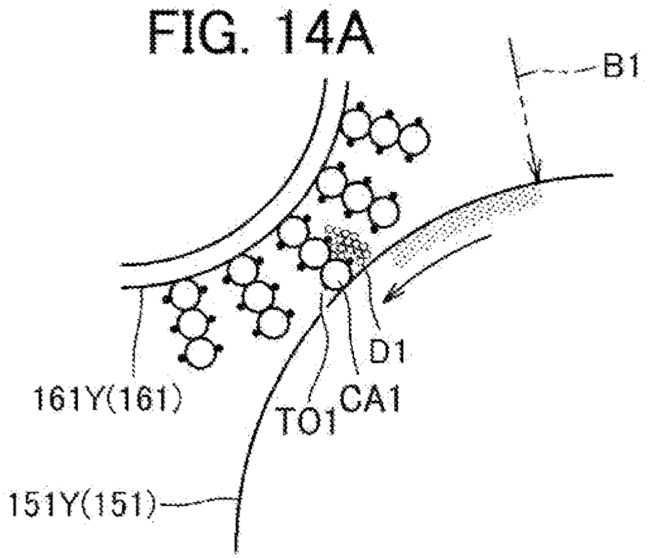
FIGS. 14A to 14C are explanatory views of a first moving process.
Figure 14B:
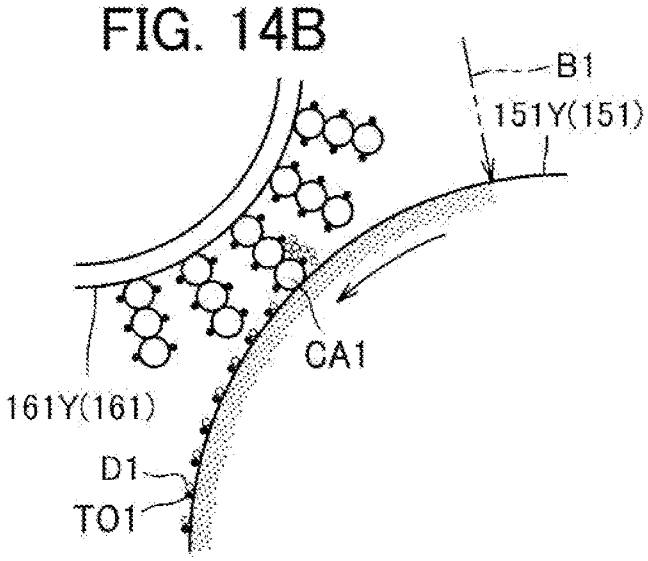
Figure 14C:
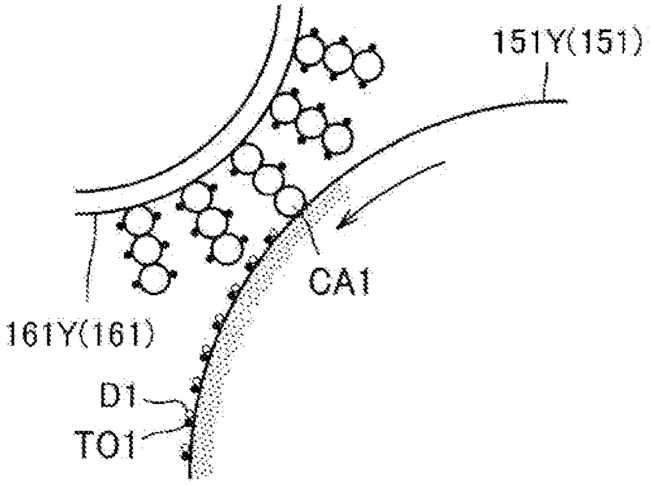

In the first moving process of the paper dust collecting operation, the controller 1200 moves paper dust D1 adhered to the magnetic rollers 161Y, 161M, and 161C from the magnetic rollers 161Y, 161M, and 161C to the corresponding photosensitive drums 151Y, 151M, and 151C, as illustrated in FIGS. 14A to 14C. Specifically, the controller 1200 moves the paper dust D1 adhered to the second magnetic roller 161Y from the second magnetic roller 161Y to the second photosensitive drum 151Y. Similarly, the controller 1200 moves the paper dust D1 adhered to the third magnetic roller 161M from the third magnetic roller 161M to the third photosensitive drum 151M. Further, the controller 1200 moves the paper dust D1 adhered to the fourth magnetic roller 161C from the fourth magnetic roller 161C to the fourth photosensitive drum 151C.

The first moving process includes an exposure process and a development process.

In the exposure process of the first moving process, the controller 1200 exposes the second photosensitive drum 151Y, the third photosensitive drum 151M, and the fourth photosensitive drum 151C to light using the exposure unit 140. Specifically, the controller 1200 controls the exposure unit 140 to emit laser beam B1 continuously. With respect to a main scanning direction of the photosensitive drums 151, the controller 1200 continuously exposes the photosensitive drums 151 to light across the entire part that can be exposed. With respect to a rotational direction of the photosensitive drums 151, the controller 1200 continuously exposes an area of the photosensitive drums 151 having a prescribed exposure length to light. Note that dot hatchings added to the drawings in FIG. 14 and FIG. 15 which will be referred to later, represents the part that has been exposed to light in the exposure process.

In the development process of the first moving process, the controller 1200 moves the toner TO1 on the magnetic rollers 161Y, 161M, and 161C to the parts of the corresponding photosensitive drums 151Y, 151M, and 151C that have been exposed to light in the exposure process (hereinafter referred to as “exposed parts”). At this time, paper dust D1 moves together with the toner TO1 from the magnetic rollers 161Y, 161M, and 161C to the corresponding photosensitive drums 151Y, 151M, and 151C while the paper dust D1 is adhered to the toner TO1.

Specifically, the controller 1200 applies the developing bias Vb to the second magnetic roller 161Y to move toner TO1 on the second magnetic roller 161Y to the exposed part on the second photosensitive drum 151Y. At this time, the paper dust D1 adhered to the second magnetic roller 161Y moves to the second photosensitive drum 151Y together with the toner TO1. Further, the controller 1200 applies the developing bias Vb to the third magnetic roller 161M to move toner TO1 on the third magnetic roller 161M to the exposed part on the third photosensitive drum 151M. At this time, the paper dust D1 adhered to the third magnetic roller 161M moves to the third photosensitive drum 151M together with the toner TO1. Still further, the controller 1200 applies the developing bias Vb to the fourth magnetic roller 161C to move toner TO1 on the fourth magnetic roller 161C to the exposed part on the fourth photosensitive drum 151C. At this time, the paper dust D1 adhered to the fourth magnetic roller 161C moves to the fourth photosensitive drum 151C together with the toner TO1.

Figure 15A:
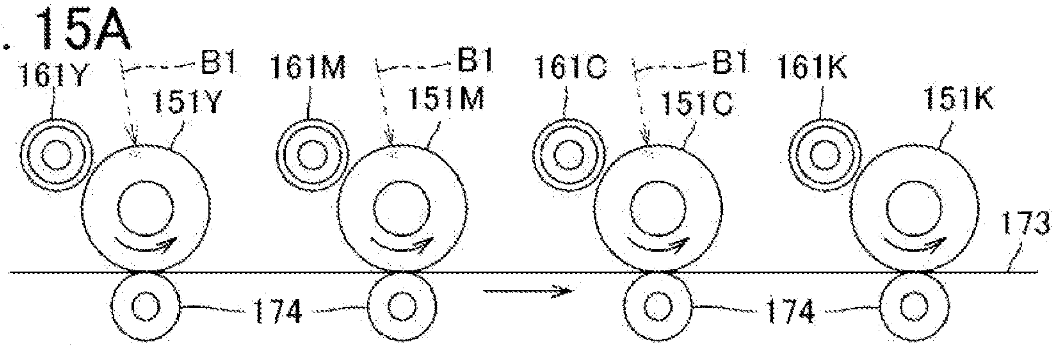
FIGS. 15A to 15E are explanatory views of exposure lengths in an exposure process of the first moving process, and of a second moving process.
Figure 15B:
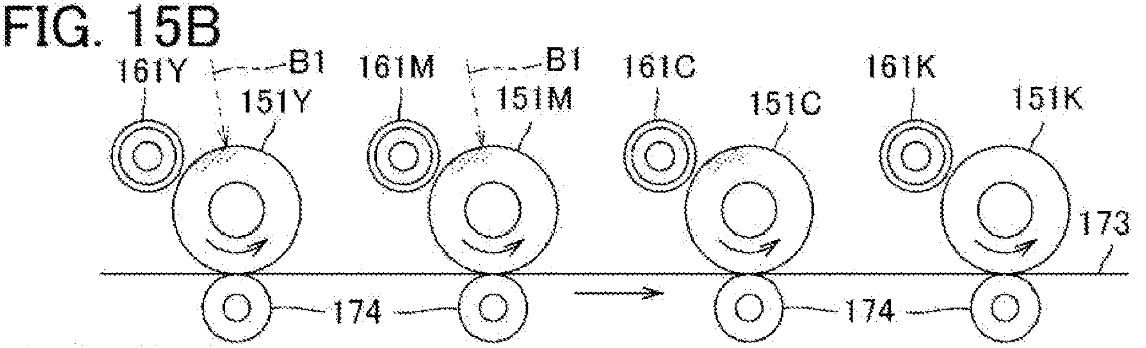
Figure 15C:
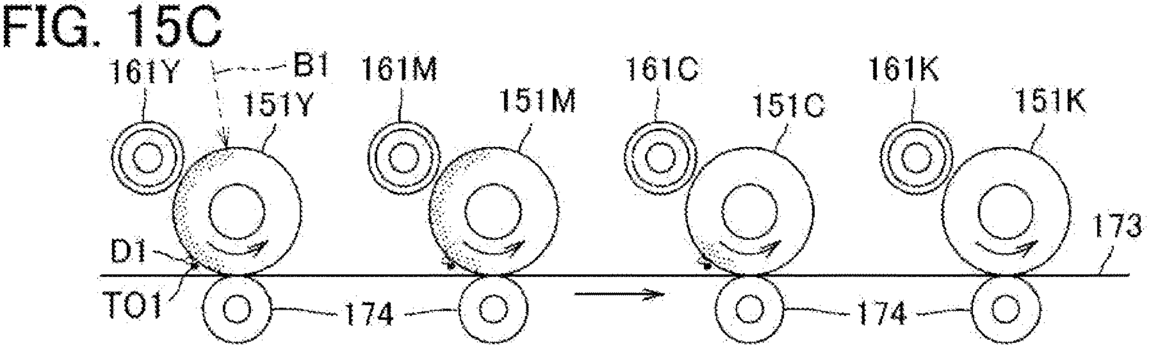
Figure 15D:
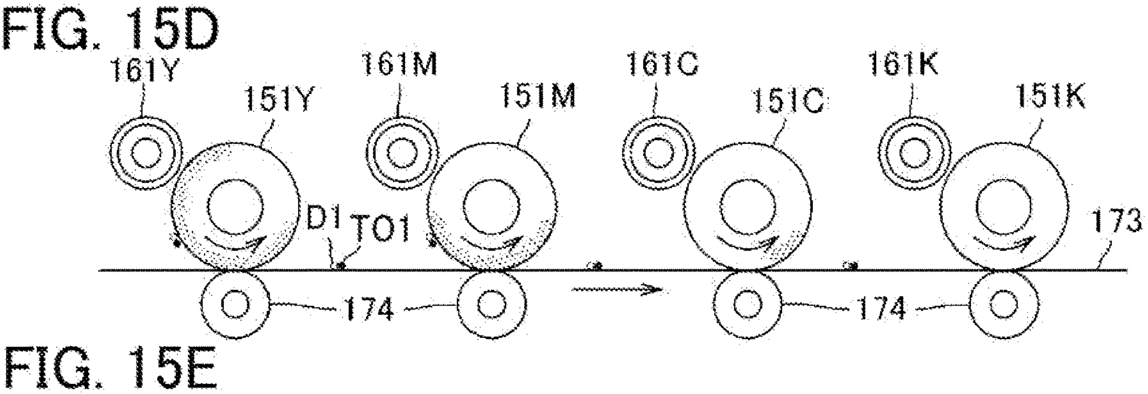
Figure 15E:
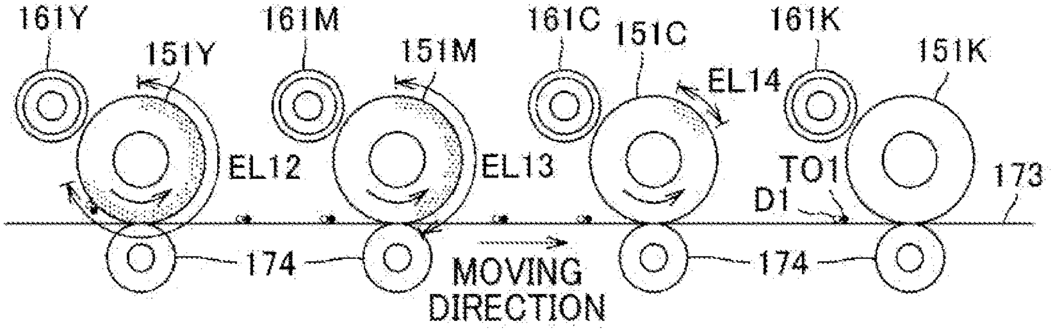

In the exposure process of the first moving process, the controller 1200 sets exposure lengths EL12, EL13, and EL14 in the rotational direction of the corresponding photosensitive drums 151Y, 151M, and 151C so that the longer the exposure length for the photosensitive drums 151 positioned upstream in the moving direction becomes, as illustrated in FIG. 15E. Specifically, the controller 1200 sets the exposure length EL13 in the rotational direction of the third photosensitive drum 151M to be longer than the exposure length EL14 in the rotational direction of the fourth photosensitive drum 151C. Further, the controller 1200 sets the exposure length EL12 in the rotational direction of the second photosensitive drum 151Y to be longer than the exposure length EL13 in the rotational direction of the third photosensitive drum 151M.

As an example, the controller 1200 starts the exposure of the second photosensitive drum 151Y, the exposure of the third photosensitive drum 151M, and the exposure of the fourth photosensitive drum 151C simultaneously, as illustrated in FIG. 15A. Subsequently, the controller 1200 ends the exposure of the fourth photosensitive drum 151C when a first time T11 has elapsed since the start of the exposure, as illustrated in FIG. 15B. Further, the controller 1200 ends the exposure of the third photosensitive drum 151M when a second time T12 that is longer than the first time T11 has elapsed since the start of the exposure, as illustrated in FIG. 15C. Further, the controller 1200 ends the exposure of the second photosensitive drum 151Y when a third time T13 that is longer than the second time T12 has elapsed since the start of the exposure, as illustrated in FIG. 15D, and ends the exposure process.

In the second moving process of the paper dust collecting operation, the controller 1200 moves paper dust D1, which has been transferred onto the photosensitive drums 151Y, 151M, and 151C in the first moving process, from the photosensitive drums 151Y, 151M, and 151C to the conveying belt 173, as illustrated in FIGS. 15C to 15E. Specifically, the controller 1200 moves the paper dust D1 on the second photosensitive drum 151Y from the second photosensitive drum 151Y to the conveying belt 173. Further, the controller 1200 moves the paper dust D1 on the third photosensitive drum 151M from the third photosensitive drum 151M to the conveying belt 173. Further, the controller 1200 moves the paper dust D1 on the fourth photosensitive drum 151C from the fourth photosensitive drum 151C to the conveying belt 173.

The second moving process includes a transferring process. In the transferring process, the controller 1200 transfers toner TO1, which has been moved onto the photosensitive drums 151Y, 151M, and 151C in the development process, from the photosensitive drums 151Y, 151M, and 151C to the conveying belt 173. At this time, the paper dust D1 moves together with the toner TO1 from the photosensitive drums 151Y, 151M, and 151C to the conveying belt 173 while the paper dust D1 is adhered to the toner TO1.

Specifically, the controller 1200 applies the transferring bias Vt to the second transfer roller 174Y to transfer toner TO1 on the second photosensitive drum 151Y from the second photosensitive drum 151Y to the conveying belt 173. At this time, the paper dust D1 on the second photosensitive drum 151Y moves to the conveying belt 173 together with the toner TO1. Further, the controller 1200 applies the transferring bias Vt to the third transfer roller 174M to transfer toner TO1 on the third photosensitive drum 151M from the third photosensitive drum 151M to the conveying belt 173. At this time, the paper dust D1 on the third photosensitive drum 151M moves to the conveying belt 173 together with the toner TO1. The controller 1200 also applies the transferring bias Vt to the fourth transfer roller 174C to transfer the toner TO1 on the fourth photosensitive drum 151C from the fourth photosensitive drum 151C to the conveying belt 173. At this time, the paper dust D1 on the fourth photosensitive drum 151C moves to the conveying belt 173 together with the toner TO1.

In the paper dust collecting process of the paper dust collecting operation, the controller 1200 collects paper dust D1, which has been moved onto the conveying belt 173 in the second moving process, using the belt cleaning roller 1101 so that the collected paper dust D1 is accommodated in the collected matter accommodating container 1104, as illustrated in FIG. 12. Specifically, the controller 1200 applies the belt cleaning bias Vbc to the belt cleaning roller 1101 to move the paper dust D1 and the toner TO1 on the conveying belt 173 from the conveying belt 173 to the belt cleaning roller 1101. Thereafter, the paper dust D1 and the toner TO1 on the belt cleaning roller 1101 are collected by the collecting roller 1102 (see FIG. 9), scraped off the collecting roller 1102 by the scraping blade 1103 (see FIG. 9), and accommodated in the collected matter accommodating container 1104.

Figure 16A:
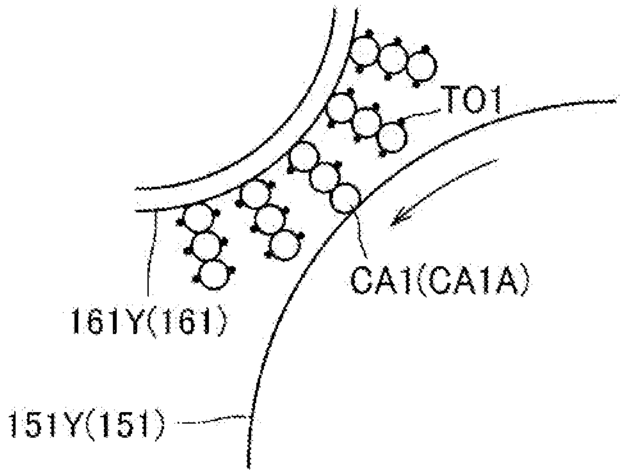
FIGS. 16A to 16C are explanatory views of a rotation process.
Figure 16B:
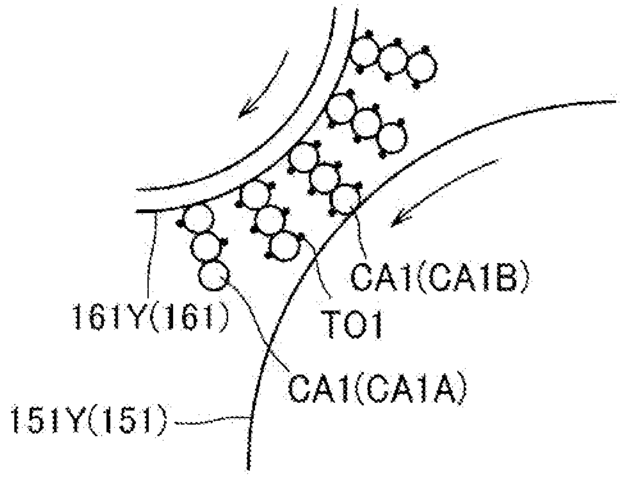
Figure 16C:
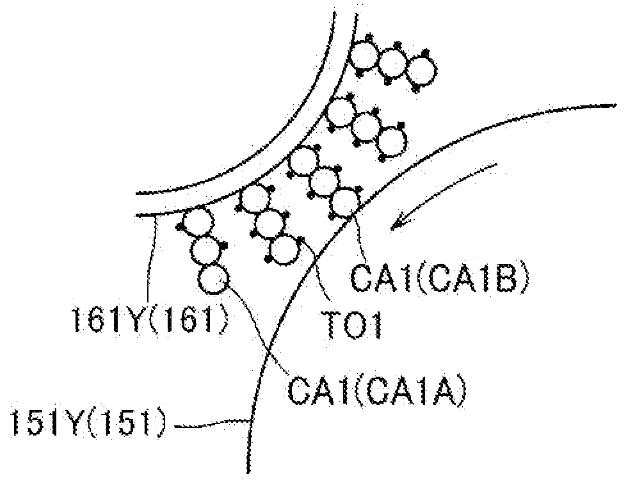

As illustrated in FIGS. 16A to 16C, after completing the first moving process to move the paper dust D1 on the magnetic rollers 161Y, 161M, and 161C to the photosensitive drums 151Y, 151M, and 151C, the controller 1200 further executes a rotation process. In the rotation process, the controller 1200 rotates the second magnetic roller 161Y, the third magnetic roller 161M, and the fourth magnetic roller 161C. Specifically, in the rotation process, the controller 1200 changes positions of the surfaces of the magnetic rollers 161Y, 161M, and 161C that faces the corresponding photosensitive drums 151Y, 151M, and 151C. More specifically, the controller 1200 rotates the magnetic rollers 161Y, 161M, and 161C less than one rotation. That is, the controller 1200 rotates the magnetic rollers 161Y, 161M, and 161C by an angle less than 360°.

As an example, the controller 1200 starts the rotation process when a fourth time T14 has elapsed since the exposure process in the first moving process has ended. When starting the rotation process, the controller 1200 first turns on the second developing clutch C12 (see FIG. 12) to rotate the magnetic rollers 161Y, 161M, and 161C, as illustrated in FIG. 16B. When a fifth time T15 has elapsed since the second developing clutch C12 has been turned on, the controller 1200 turns off the second developing clutch C12 to stop the rotation of the magnetic rollers 161Y, 161M, and 161C, as illustrated in FIG. 16C.

The fourth time T14 is set longer than or equal to a length of time required for a downstream edge of the exposed area on the surface of the second photosensitive drum 151Y in the rotational direction of the second photosensitive drum 151Y to move to a position facing the second magnetic roller 161Y in accordance with the rotation of the second photosensitive drum 151Y. The fifth time T15 is set to a length of time for the magnetic rollers 161Y, 161M, and 161C to rotate by an angle less than 360°.

Preferably, an angular displacement of the magnetic rollers 161Y, 161M, and 161C in the rotation process is smaller than or equal to 180°, more preferably smaller than or equal to 90°, and even more preferably smaller than or equal to 60°.

By executing the rotation process to rotate the magnetic rollers 161Y, 161M, and 161C by an angle less than 360°, the carrier CA1 that makes contact with the surfaces of the magnetic rollers 161Y, 161M, and 161C changes from carrier CA1A before the rotation process is executed to carrier CA1B.

The controller 1200 executes the paper dust collecting operation when the number of printed sheets P1 since the start of the monochromatic printing operation is greater than or equal to a prescribed threshold value. Specifically, the controller 1200 executes the paper dust collecting operation after completing the monochromatic printing operation when the number of printed sheets P1 is greater than or equal to a first threshold P1*th*1.

The controller 1200 also executes the paper dust collecting operation while executing the monochromatic printing operation when the number of printed sheets P1 is greater than or equal to a second threshold P1*th*2. More specifically, when the number of printed sheets P1 becomes greater than or equal to the second threshold P1*th*2 while executing the monochromatic printing operation, the controller 1200 first executes an interruption process to interrupt the monochromatic printing operation. The controller 1200 then executes the paper dust collecting operation after executing the interruption process. The second threshold P1*th*2 is a threshold value that is greater than the first threshold P1*th*1.

Next, the operations executed by the controller 1200 will be described in more detail while referring to the flowcharts in FIGS. 17 to 19 and the timing chart in FIG. 20.

Figure 17:
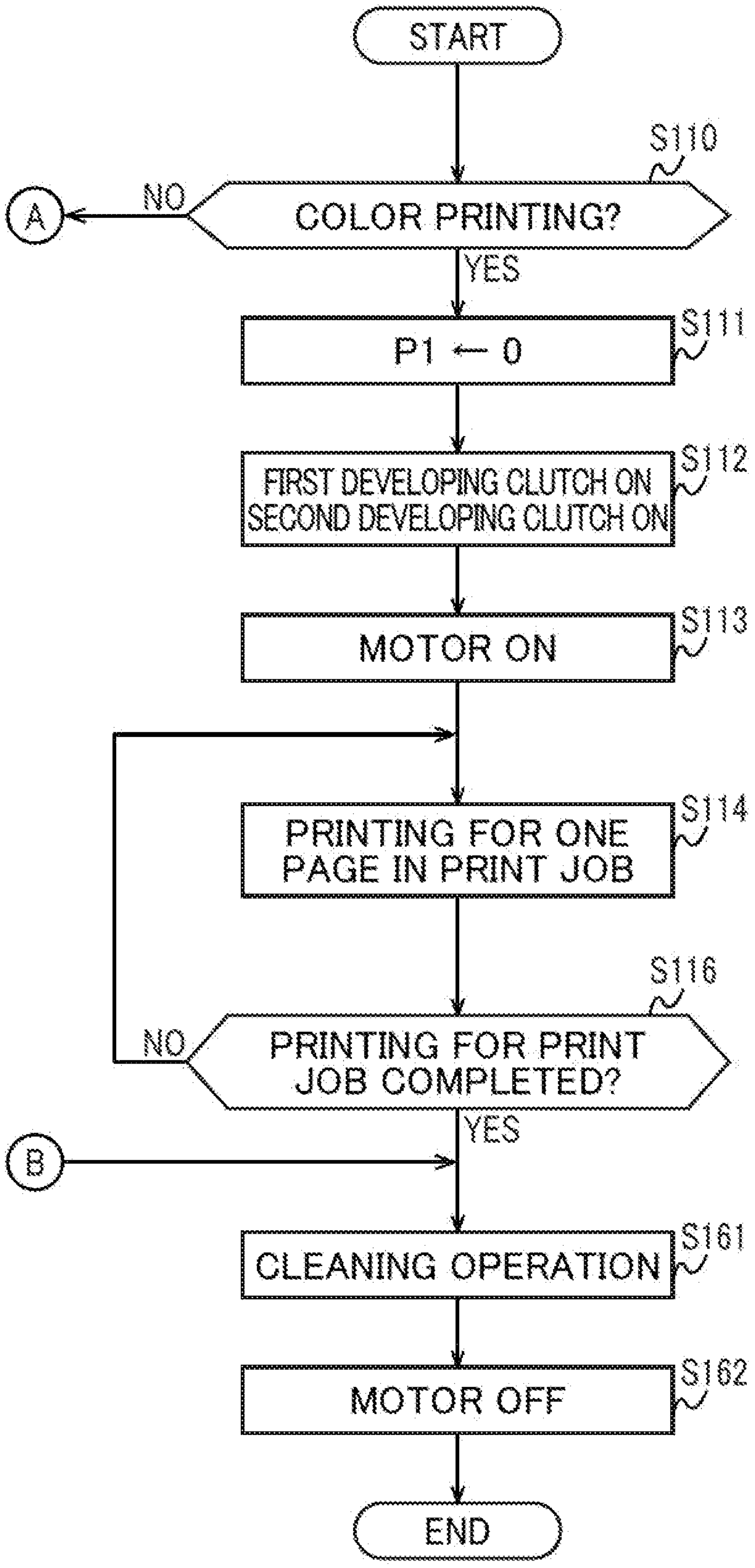
FIG. 17 is a flowchart illustrating one example of operations executed by a controller.

As illustrated in FIG. 17, when the controller 1200 receives a print job that includes instructions to start printing, image data, and the like, in S110 the controller 1200 determines whether or not the printing is a color printing. When the color printing is to be performed (S110: YES), the controller 1200 executes the color printing operation. In S111 the controller 1200 resets the number of printed sheets P1 to 0 in the color printing operation. In S112 the controller 1200 turns on the first developing clutch C11 and turns on the second developing clutch C12. In S113 the controller 1200 turns on the motor M11, thereby rotating the four photosensitive drums 151, the four magnetic rollers 161, and the like.

Subsequently, in S114 the controller 1200 performs printing for one page in the print job to form a color image on the sheet S1. After completing printing for one page in the print job, in S116 the controller 1200 determines whether or not printing for the print job has been completed. When printing for the print job has not yet been completed (S116: NO), the controller 1200 returns to the process in S114. When printing for the print job has been completed (S116: YES), in S161 the controller 1200 executes the cleaning operation using the belt cleaner 1100 to collect toner on the cleaning rollers 153 through the photosensitive drums 151 and the conveying belt 173. Thereafter, in S162 the controller 1200 turns off the motor M11 to end the operation.

When the printing is not a color printing in S110 (S110: NO), the controller 1200 executes the monochromatic printing operation. As illustrated in FIG. 18, in S122 the controller 1200 turns on the first developing clutch C11 and turns off the second developing clutch C12 in the monochromatic printing operation. In S123 the controller 1200 turns on the motor M11, thereby rotating the four photosensitive drums 151, the first magnetic roller 161K, and the like. The second magnetic roller 161Y, the third magnetic roller 161M, and the fourth magnetic roller 161C do not rotate.

Subsequently, in S124 the controller 1200 executes printing for one page in the print job to form a monochromatic image on the sheet S1. After completing printing for one page in the print job, in S125 the controller 1200 increments the number of printed sheets P1 by 1. Further, in S126 the controller 1200 determines whether or not printing for the print job has been completed.

When printing for the print job has been completed (S126: YES), in S131 the controller 1200 determines whether or not the number of printed sheets P1 is greater than or equal to the first threshold P1*th*1. When the number of printed sheets P1 is greater than or equal to the first threshold P1*th*1 (S131: YES), in S140 the controller 1200 executes the paper dust collecting operation. When the number of printed sheets P1 is less than the first threshold P1*th*1 (S131: NO) or after completing the paper dust collecting operation, in S161 illustrated in FIG. 17, the controller 1200 executes the cleaning operation. Subsequently, in S162 the controller 1200 turns off the motor M11 and ends the operation.

Figure 18:
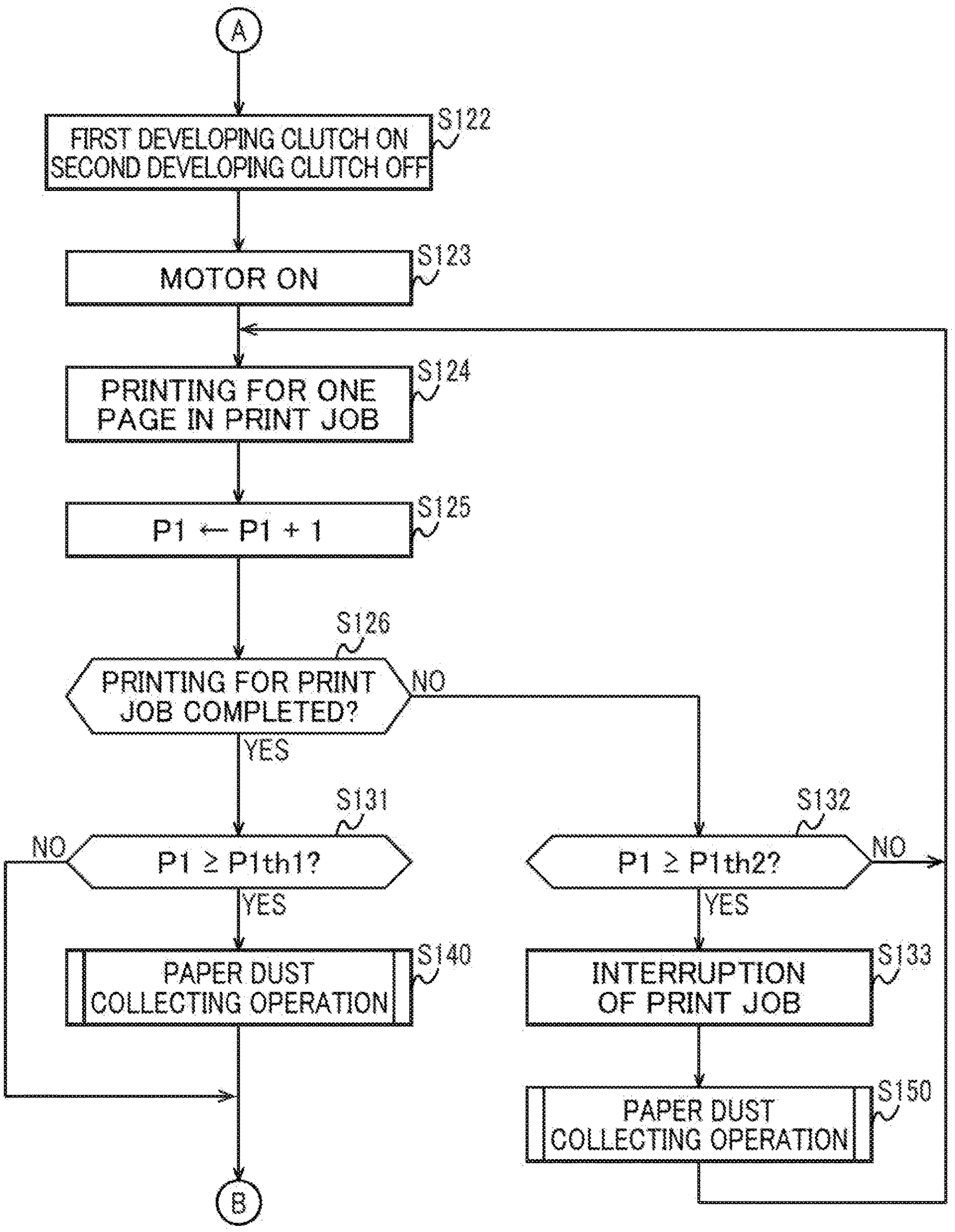
FIG. 18 is a flowchart subsequent to the flowchart of FIG. 17.

When printing for the print job has not yet been completed in S126 of FIG. 18 (S126: NO), in S132 the controller 1200 determines whether or not the number of printed sheets P1 is greater than or equal to the second threshold P1*th*2. When the number of printed sheets P1 is less than the second threshold P1*th*2 (S132: NO), the controller 1200 returns to the process in S124.

When the number of printed sheets P1 is greater than or equal to the second threshold P1*th*2 in S132 (S132: YES), in S133 the controller 1200 executes the interruption process to interrupt the print job. Subsequently, in S150 the controller 1200 executes the paper dust collecting operation. After completing the paper dust collecting operation, the controller 1200 returns to the process in S124 and resumes the print job.

Figure 19:
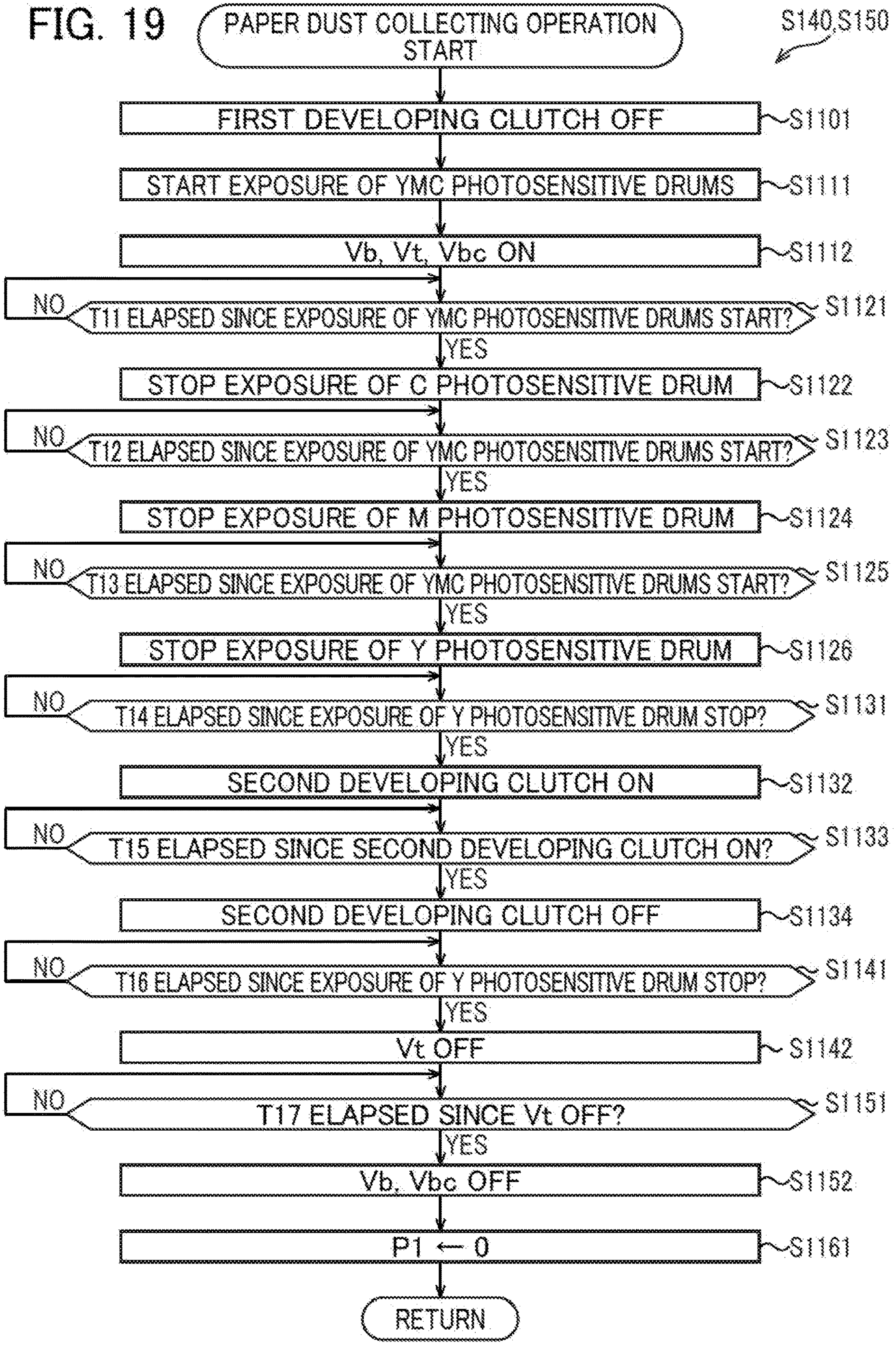
FIG. 19 is a flowchart illustrating one example of the paper dust collecting operation.
Figure 20:
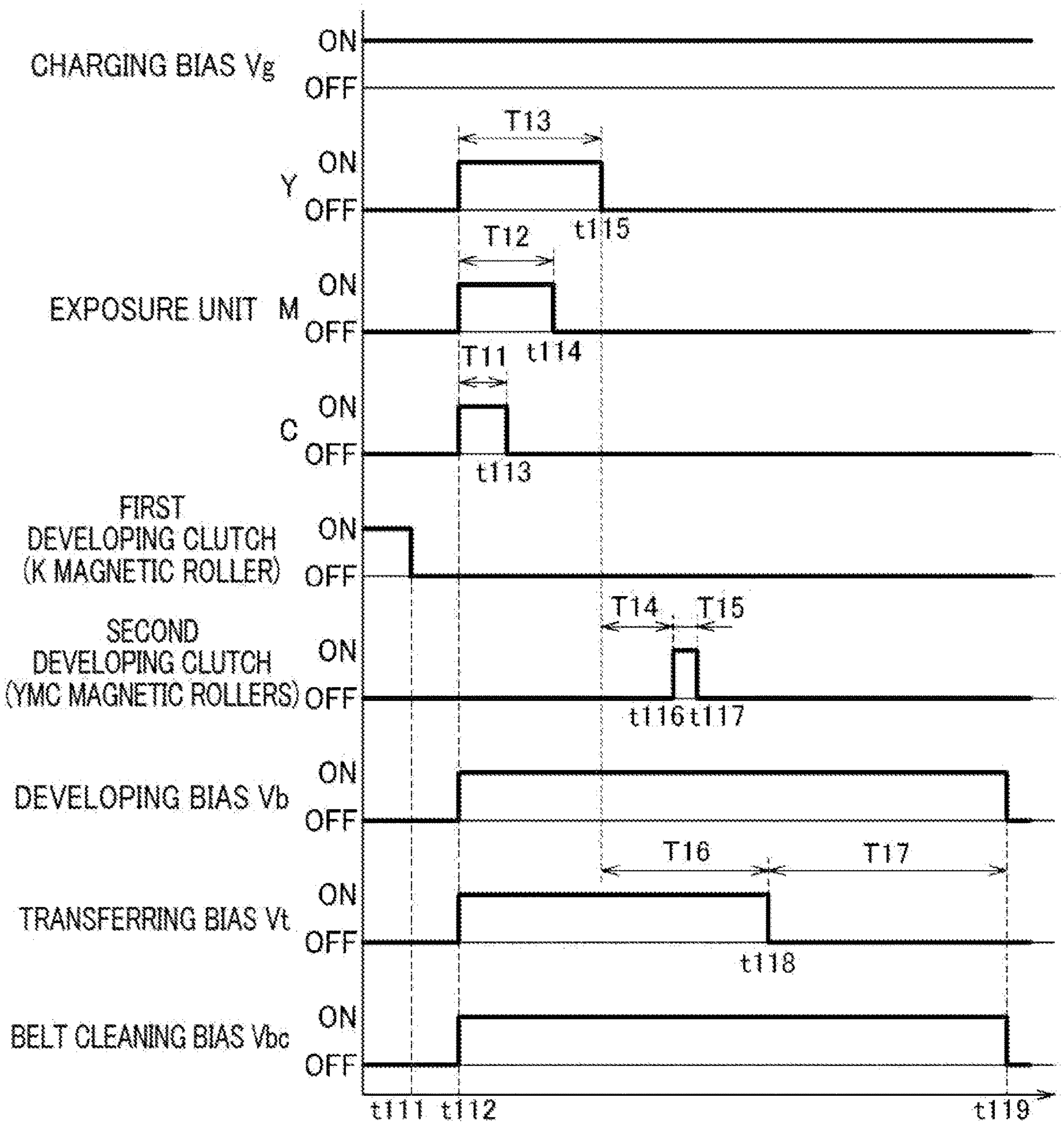
FIG. 20 is a timing chart illustrating one example of the paper dust collecting operation.

As illustrated in FIGS. 19 and 20, in S1101 the controller 1200 turns off the first developing clutch C11 in the paper dust collecting operation (t111), thereby stopping the first magnetic roller 161K. Subsequently, the controller 1200 starts the exposure process in the first moving process. Specifically, in S1111 the controller 1200 starts the exposure of the second photosensitive drum 151Y, the third photosensitive drum 151M, and the fourth photosensitive drum 151C using the exposure unit 140 (*t*112).

The controller 1200 also starts the development process in the first moving process, the transferring process in the second moving process, and the paper dust collecting process. Specifically, in S1112 the controller 1200 turns on the developing bias Vb, the transferring bias Vt, and the belt cleaning bias Vbc (t112). By applying the developing bias Vb to the magnetic rollers 161, the controller 1200 starts the development process. Further, by applying the transferring bias Vt to the transfer rollers 174, the controller 1200 starts the transferring process. Further, by applying the belt cleaning bias Vbc to the belt cleaning roller 1101, the controller 1200 starts the paper dust collecting process.

The controller 1200 waits until the first time T11 has elapsed since the start of the exposure of the photosensitive drums 151Y, 151M, and 151C (S1121: NO). When the first time T11 has elapsed since the controller 1200 has started the exposure of the photosensitive drums 151Y, 151M, and 151C (S1121: YES), in S1122 the controller 1200 stops the exposure of the fourth photosensitive drum 151C (the C photosensitive drum) (t113). Further, the controller 1200 waits until the second time T12 has elapsed since the start of the exposure of the photosensitive drums 151Y, 151M, and 151C (S1123: NO). When the second time T12 has elapsed since the controller 1200 has started the exposure of the photosensitive drums 151Y, 151M, and 151C (S1123: YES), in S1124 the controller 1200 stops the exposure of the third photosensitive drum 151M (the M photosensitive drum) (t114).

The controller 1200 also waits until the third time T13 has elapsed since the start of the exposure of the photosensitive drums 151Y, 151M, and 151C (S1123: NO). When the third time T13 has elapsed since the controller 1200 has started the exposure of the photosensitive drums 151Y, 151M, and 151C (S1125: YES), in S1126 the controller 1200 stops the exposure of the second photosensitive drum 151Y (the Y photosensitive drum) (t115) and ends the exposure process.

Thereafter, the controller 1200 further waits until the fourth time T14 has elapsed since the controller 1200 has ended the exposure of the second photosensitive drum 151Y (S1131: NO). When the fourth time T14 has elapsed since the controller 1200 has ended the exposure of the second photosensitive drum 151Y (S1131: YES), in S1132 the controller 1200 turns on the second developing clutch C12 since the first moving process has been completed (t116). Through this operation, the controller 1200 starts the rotation process to rotate the second magnetic roller 161Y, the third magnetic roller 161M, and the fourth magnetic roller 161C. Subsequently, the controller 1200 waits until the fifth time T15 has elapsed since the controller 1200 has turned on the second developing clutch C12 (S1133: NO). When the fifth time T15 has elapsed since the controller 1200 has turned on the second developing clutch C12 (S1133: YES), in S1134 the controller 1200 turns off the second developing clutch C12 (*t*117). Accordingly, the rotation of the magnetic rollers 161Y, 161M, and 161C is stopped to end the rotation process.

Thereafter, in S1141 the controller 1200 determines whether or not a sixth time T16 has elapsed since the controller 1200 has stopped the exposure of the second photosensitive drum 151Y. The sixth time T16 is set greater than or equal to a length of time for the downstream edge of the exposed area on the surface of the second photosensitive drum 151Y in the rotational direction of the second photosensitive drum 151Y to move to a position that faces the conveying belt 173 in accordance with the rotation of the second photosensitive drum 151Y. The controller 1200 waits until the sixth time T16 has elapsed since the controller 1200 has stopped the exposure of the second photosensitive drum 151Y (S1141: NO).

When the sixth time T16 has elapsed since the controller 1200 stopped the exposure of the second photosensitive drum 151Y (S1141: YES), the controller 1200 ends the transferring process (the second moving process). Specifically, in S1142 the controller 1200 turns off the transferring bias Vt (t118).

Subsequently, in S1151 the controller 1200 determines whether or not a seventh time T17 has elapsed since the transferring bias Vt has been turned off. The seventh time T17 is set greater than or equal to a length of time for the area on the surface of the conveying belt 173 that faces the second photosensitive drum 151Y to move to a position that faces the belt cleaning roller 1101 in accordance with the circular movement of the conveying belt 173. The controller 1200 waits until the seventh time T17 has elapsed since the transferring bias Vt has been turned off (S1151: NO).

When the seventh time T17 has elapsed since the transferring bias Vt has been turned off (S1151: YES), the controller 1200 ends the paper dust collecting process. Specifically, in S1152 the controller 1200 turns off the belt cleaning bias Vbc (t119). At this time, the controller 1200 also turns off the developing bias Vb. In S1161 the controller 1200 resets the number of printed sheets P1 to 0 and ends the paper dust collecting operation.

The color printer 1A according to the second embodiment can move paper dust on the magnetic rollers 161Y, 161M, and 161C to the corresponding photosensitive drums 151Y, 151M, and 151C by executing the first moving process of the paper dust collecting operation. The color printer 1A can also move paper dust on the photosensitive drums 151Y, 151M, and 151C to the conveying belt 173 by executing the second moving process. The color printer 1A can also collect paper dust on the conveying belt 173 using the belt cleaning roller 1101 so that collected paper dust is accommodated in the collected matter accommodating container 1104 by executing the paper dust collecting process. Accordingly, the color printer 1A can suppress deterioration of toner caused by paper dust adhered the magnetic rollers 161Y, 161M, and 161C.

Further, since the first moving process includes the exposure process and the development process, the same method used for developing electrostatic latent images formed on the photosensitive drums 151Y, 151M, and 151C can be used for moving paper dust adhered to toner on the magnetic rollers 161Y, 161M, and 161C to the photosensitive drums 151Y, 151M, and 151C together with the toner. Further, with the above operation, toner that may have deteriorated due to the adherence of paper dust can be moved to the photosensitive drums 151Y, 151M, and 151C and finally accommodated in the collected matter accommodating container 1104.

Further, since the second moving process includes the transferring process, paper dust adhered to toner that has moved to the photosensitive drums 151Y, 151M, and 151C can be transferred, together with the toner, to the conveying belt 173 using the same method used for transferring toner images formed on the photosensitive drums 151Y, 151M, and 151C.

Further, since the paper dust collecting operation is executed when the number of printed sheets P1 since the start of the monochromatic printing operation is greater than or equal to a prescribed threshold value, the paper dust collecting operation can be executed when an amount of paper dust adhered to the magnetic rollers 161Y, 161M, and 161C has increased to a certain extent. Also, this operation can suppress the paper dust collecting operation from being executed more than necessary.

Specifically, the paper dust collecting operation is executed after completing the monochromatic printing operation when the number of printed sheets P1 is greater than or equal to the first threshold P1*th*1. This operation can suppress the paper dust collecting operation from being executed more than necessary after the monochromatic printing operation is completed.

The paper dust collecting operation is also executed while the monochromatic printing operation is executed when the number of printed sheets P1 is greater than or equal to the second threshold P1*th*2. Hence, the paper dust collecting operation can be executed even during the monochromatic printing operation when the amount of paper dust adhered to the magnetic rollers 161Y, 161M, and 161C has increased to a certain extent.

Further, since the second threshold P1*th*2 is greater than the first threshold P1*th*1, executing the paper dust collecting operations during the monochromatic printing operation can be minimized so that paper dust collecting operations are mostly executed following the completion of the monochromatic printing operation. This operation can shorten the waiting time until all the sheets S1 with images formed thereon are outputted from the color printer 1A.

Further, since paper dust is more likely to be adhered to the second photosensitive drum 151Y than to the third photosensitive drum 151M or the fourth photosensitive drum 151C because the second photosensitive drum 151Y is positioned further upstream in the conveying direction of the sheets S1, more paper dust is adhered to the second magnetic roller 161Y than to the third magnetic roller 161M or the fourth magnetic roller 161C. Hence, by setting the exposure length EL12 for the second photosensitive drum 151Y longer in the exposure process, paper dust can be transferred from the second magnetic roller 161Y to the second photosensitive drum 151Y over a longer period of time.

Similarly, since paper dust is more likely to be adhered to the third photosensitive drum 151M than to the fourth photosensitive drum 151C because the third photosensitive drum 151M is positioned further upstream than the fourth photosensitive drum 151C, more paper dust is adhered to the third magnetic roller 161M than to the fourth magnetic roller 161C. Therefore, by setting the exposure length EL13 for the third photosensitive drum 151M longer than the exposure length EL14 for the fourth photosensitive drum 151C in the exposure process, paper dust can be transferred from the third magnetic roller 161M to the third photosensitive drum 151M over a longer period of time.

Further, since the rotation process for rotating the magnetic rollers 161Y, 161M, and 161C is executed after completion of the first moving process, the positions on the surfaces of the magnetic rollers 161Y, 161M, and 161C that face the photosensitive drums 151Y, 151M, and 151C can be changed and the carrier held on the magnetic rollers 161Y, 161M, and 161C can be changed. This operation can suppress paper dust from repeatedly being adhered to the same carrier, thereby suppressing deterioration of the carrier.

Note that the deterioration of the carrier is a phenomenon in which certain components in the paper dust are adhered to or become embedded in a coating layer on a surface of the carrier. As the deterioration of the carrier progresses, the charging capacity of the carrier decreases, which may result in so-called carrier scattering in which the carrier moves to the photosensitive drum, and in an electrical aggregation of the deteriorated carrier with non-deteriorated carrier. The carrier scattering and the aggregation of the carrier can be restrained by suppressing the deterioration of the carrier.

Since the rotation process in the above embodiment changes the positions on the surfaces of the magnetic rollers 161Y, 161M, and 161C that face the photosensitive drums 151Y, 151M, and 151C, the magnetic rollers 161Y, 161M, and 161C need only rotate less than one rotation in the rotation process. This operation eliminates the need to rotate the magnetic rollers 161Y, 161M, and 161C more than necessary, thereby suppressing the deterioration of toner and carrier that inevitably occurs during the rotation of the magnetic rollers 161Y, 161M, and 161C.

Modifications to Second Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the following description, points that differ from the above embodiment will be described in detail, but a description of similar points will be omitted while the same reference numerals are designated with the same components, for example.

The controller 1200 may be configured to execute a cleaning operation in which the belt cleaner 1100 collects toner on the first cleaning roller 153K through the photosensitive drum 151 and the conveying belt 173, and to execute the cleaning operation simultaneously when executing the paper dust collecting operation.

When executing the cleaning operation, the controller 1200 turns off the first developing clutch C11 to place the first magnetic roller 161K in a stopped state. When executing the cleaning operation, the controller 1200 also applies the charging bias Vg to the first scorotron charger 152K to charge the surface of the first photosensitive drum 151K. Note that, when executing the cleaning operation, the controller 1200 does not expose the surface of the first photosensitive drum 151K using the exposure unit 140.

In the cleaning operation, the controller 1200 executes a third moving process, a fourth moving process, and a toner collecting process.

Figure 21:
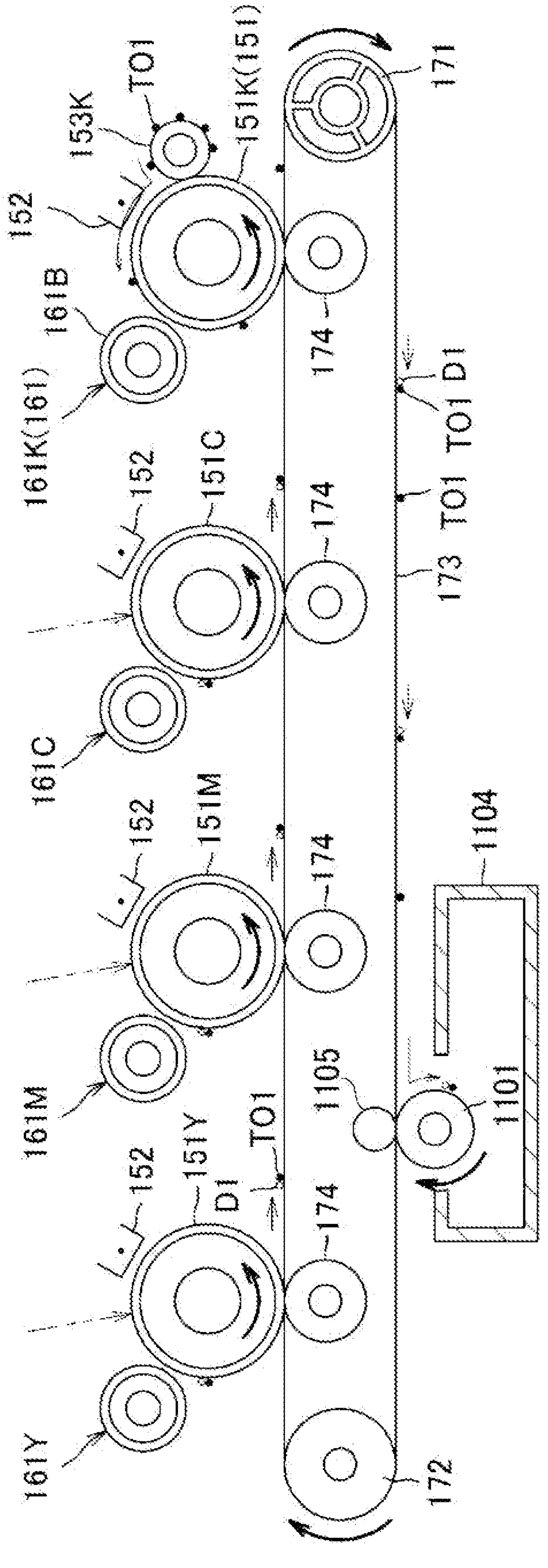
FIG. 21 is a view illustrating a paper dust collecting operation and a cleaning operation.

As illustrated in FIG. 21, in the third moving process, the controller 1200 moves toner TO1 on the first cleaning roller 153K from the first cleaning roller 153K to the first photosensitive drum 151K. Specifically, the controller 1200 applies the cleaning bias +Vc2 to the first cleaning roller 153K to transfer toner TO1 on the first cleaning roller 153K from the first cleaning roller 153K to the first photosensitive drum 151K.

In the fourth moving process, the controller 1200 transfers toner TO1, which has been transferred to the first photosensitive drum 151K in the third moving process, from the first photosensitive drum 151K to the conveying belt 173. Specifically, the controller 1200 applies the transferring bias Vt to the first transfer roller 174K to transfer the toner TO1 on the first photosensitive drum 151K from the first photosensitive drum 151K to the conveying belt 173.

In the toner collecting process, the controller 1200 collects the toner TO1 that has been transferred to the conveying belt 173 in the fourth moving process using the belt cleaning roller 1101 and accommodates the toner TO1 in the collected matter accommodating container 1104. Specifically, the controller 1200 applies the belt cleaning bias Vbc to the belt cleaning roller 1101 to collect the toner TO1 on the conveying belt 173 using the belt cleaning roller 1101 so that the toner TO1 is accommodated in the collected matter accommodating container 1104. The toner collecting process is the same process as the paper dust collecting process in the paper dust collecting operation.

Figure 22:
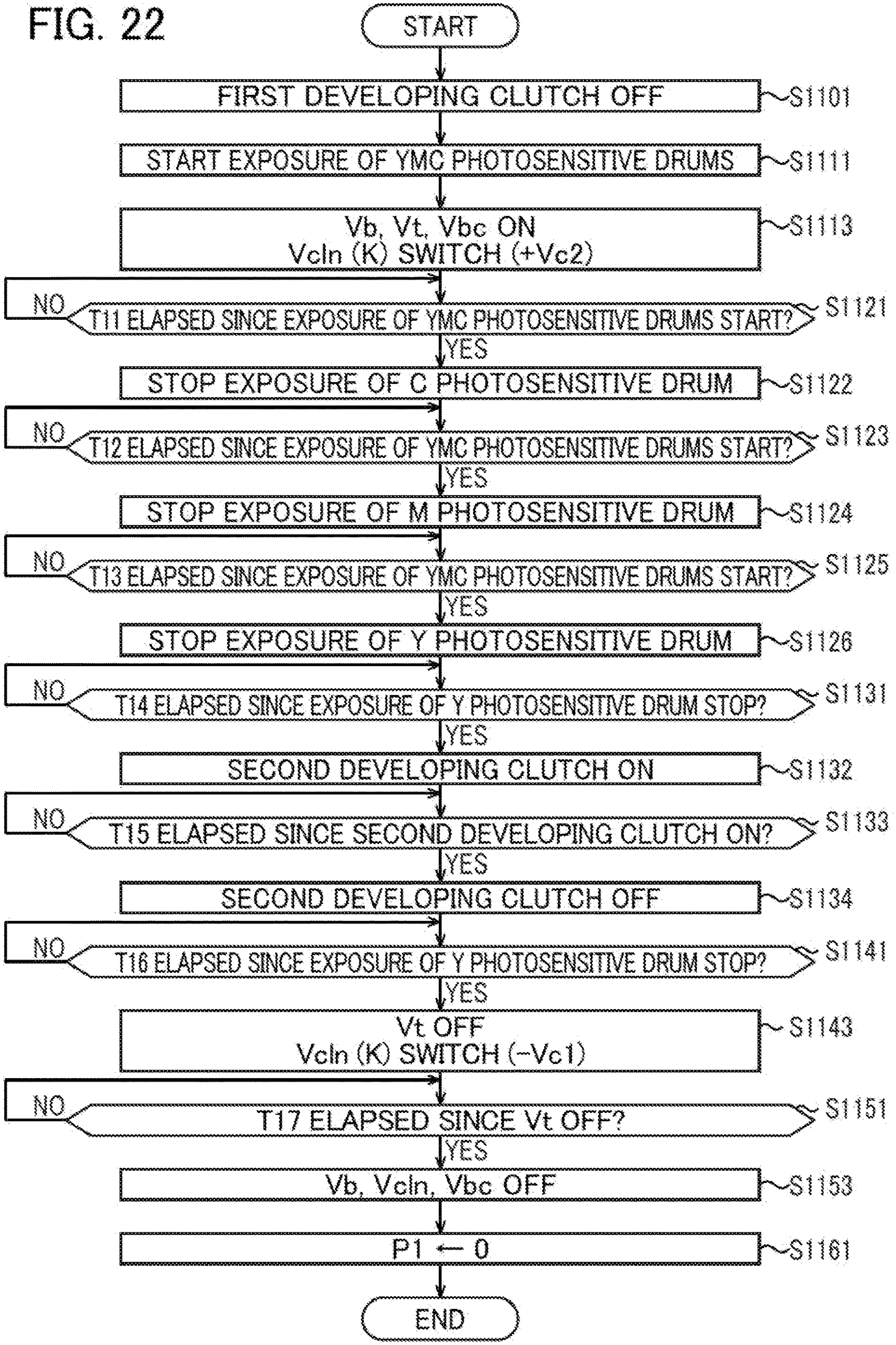
FIG. 22 is a flowchart illustrating the paper dust collecting operation and the cleaning operation.
Figure 23:
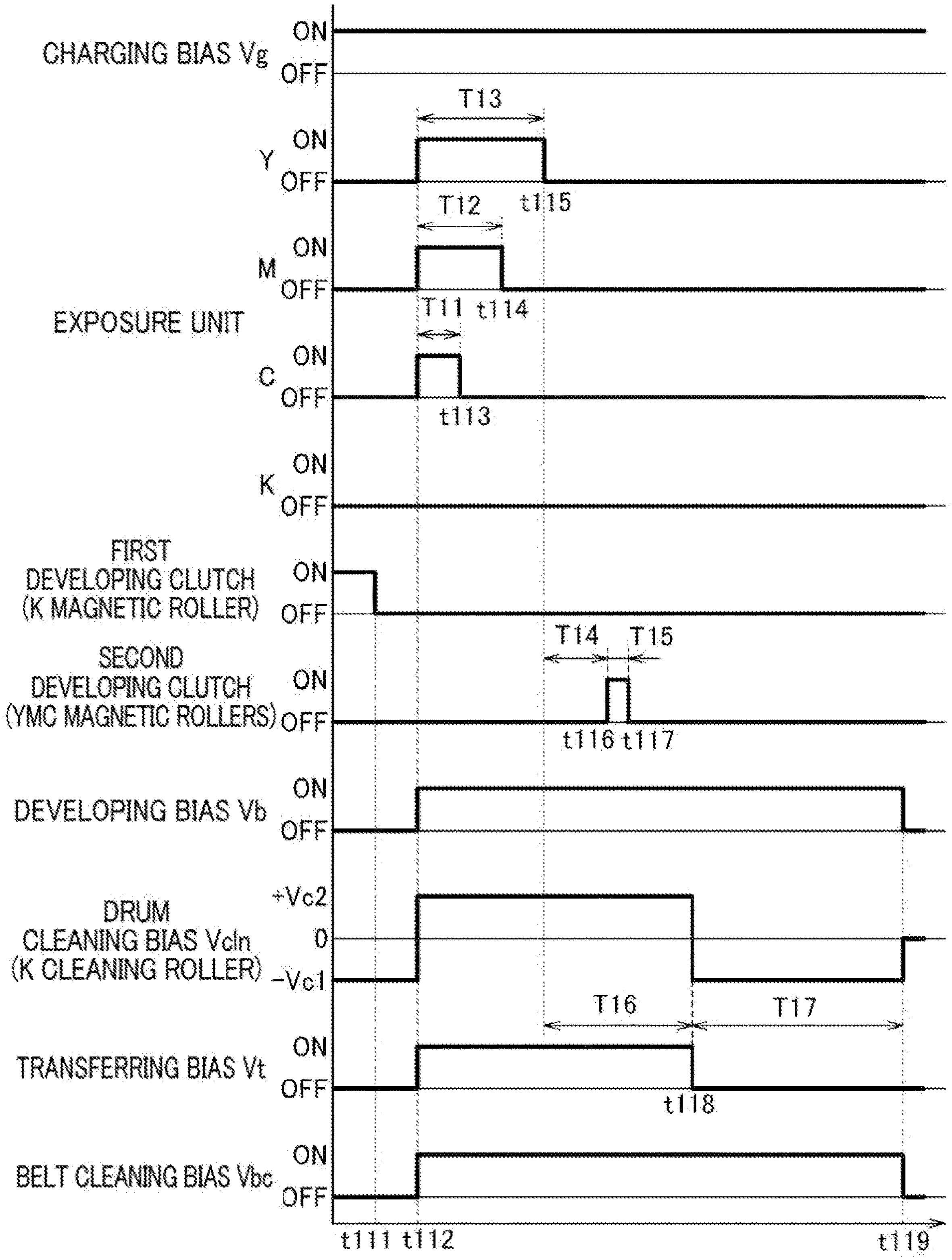
FIG. 23 is a timing chart illustrating the paper dust collecting operation and the cleaning operation.

At the beginning of the paper dust collecting operation illustrated in FIGS. 22 and 23, in S1101 the controller 1200 turns off the first developing clutch C11 (t111) and in S1111 starts the exposure process in the first moving process (t112).

In S1113 the controller 1200 also turns on the developing bias Vb, the transferring bias Vt, and the belt cleaning bias Vbc and switches the cleaning bias Vc1*n* for the first cleaning roller 153K from −Vc1 to +Vc2 (t112). By applying the cleaning bias +Vc2 to the first cleaning roller 153K, the controller 1200 starts the third moving process of the cleaning operation. Further, by applying the transferring bias Vt to the transfer rollers 174, the controller 1200 starts the transferring process of the paper dust collecting operation and the fourth moving process of the cleaning operation. Further, by applying the belt cleaning bias Vbc to the belt cleaning roller 1101, the controller 1200 starts the paper dust collecting process of the paper dust collecting operation and the toner collecting process of the cleaning operation.

After completing the exposure process in the paper dust collecting operation (S1126; t115) and after completing the rotation process (S1134; t117), in S1141 the controller 1200 determines whether or not the sixth time T16 has elapsed since the exposure of the second photosensitive drum 151Y has ended. When the sixth time T16 has elapsed (S1141: YES), in S1143 the controller 1200 turns off the transferring bias Vt and switches the cleaning bias Vc1*n* for the first cleaning roller 153K from +Vc2 to −Vc1 (t118). Through this operation, the controller 1200 ends the transferring process (the second moving process) of the paper dust collecting operation and the third moving process and the fourth moving process of the cleaning operation.

Subsequently, when the seventh time T17 has elapsed since the transferring bias Vt has been turned off (S1151: YES), in S1153 the controller 1200 turns off the developing bias Vb, the cleaning bias Vc1*n*, and the belt cleaning bias Vbc, thereby ending the paper dust collecting process of the paper dust collecting operation and the toner collecting process of the cleaning operation.

By executing the cleaning operation for the first cleaning roller 153K at the same time as the paper dust collecting operation as described above, the waiting time until the next printing is available can be shorten in comparison with a case in which the cleaning operation is executed after completion of the paper dust collecting operation.

In the exposure process of the embodiment described above, the exposure lengths EL12, EL13, and EL14 in the rotational direction of the photosensitive drums 151Y, 151M, and 151C are set longer for the photosensitive drums 151 positioned upstream in the moving direction of the top surface of the conveying belt 173, but the present disclosure is not limited to this method. For example, the exposure length for the third photosensitive drum 151M may be set equivalent to the exposure length for the second photosensitive drum 151Y. Further, the exposure length for the second photosensitive drum 151Y may be set longer than the exposure lengths for the photosensitive drums 151M and 151C while the exposure length for the third photosensitive drum 151M is set equivalent to the exposure length for the fourth photosensitive drum 151C. Alternatively, the exposure lengths on the second photosensitive drum 151Y, the third photosensitive drum 151M, and the fourth photosensitive drum 151C may all be the same.

In the rotation process of the embodiment described above, the magnetic rollers 161Y, 161M, and 161C rotate less than one full rotation, but the present disclosure need not be limited to this method. For example, the magnetic rollers 161Y, 161M, and 161C may make one or more rotations in the rotation process. As an alternative configuration, the rotation process may be omitted.

In the above embodiment, the paper dust collecting operation is executed after completing the monochromatic printing operation and while executing the monochromatic printing operation when the number of printed sheets P1 becomes greater than or equal to a prescribed threshold value. However, other operations may be employed. For example, the controller 1200 may be configured to execute the paper dust collecting operation after completing the monochromatic printing operation and not to execute the paper dust collecting operation while the monochromatic printing operation is executed. Alternatively, the controller 1200 may be configured to execute the paper dust collecting operation while executing the monochromatic printing and not to execute the paper dust collecting operation after completing the monochromatic printing operation.

The controller 1200 may also be configured to execute the paper dust collecting operation every time the monochromatic printing operation is completed, regardless of the number of sheets printed. Further, the controller 1200 may be configured to execute the paper dust collecting operation prior to executing the monochromatic printing operation, such as prior to feeding the first sheet S1 from the feeding tray 121 after receiving a print job, for example.

In the above embodiment, the controller 1200 is configured to execute the paper dust collecting operation when the number of printed sheets P1 since the start of the monochromatic printing operation becomes greater than or equal to a prescribed threshold value, but the present disclosure is not limited to this method. For example, the controller 1200 may be configured to execute the paper dust collecting operation when the number of rotations P2 of the first photosensitive drum 151K from the start of the monochromatic printing operation becomes greater than or equal to a prescribed threshold value. Specifically, the controller 1200 may be configured to execute the paper dust collecting operation after completing the monochromatic printing operation when the number of rotations P2 of the first photosensitive drum 151K is greater than or equal to a first threshold P2*th*1.

Further, the controller 1200 may be configured to execute the interruption process to interrupt the monochromatic printing operation when the number of rotations P2 of the first photosensitive drum 151K becomes greater than or equal to a second threshold P2*th*2 during the monochromatic printing operation and to execute the paper dust collecting operation after executing the interruption process.

Note that the number of rotations P2 is not limited to the number of rotations of the first photosensitive drum 151K but may be the number of rotations of the second photosensitive drum 151Y, for example. Alternatively, the number of rotations P2 may be the number of rotations of the third photosensitive drum 151M. Still alternatively, the number of rotations P2 may be the number of rotations of the fourth photosensitive drum 151C.

In the above embodiment, the exposure unit 140 is configured to expose the photosensitive drums 151 to light by emitting laser beams onto the photosensitive drums 151, but the exposure unit need not be limited to this configuration. For example, the exposure unit may include an exposure head having a plurality of LEDs and may be configured to expose the photosensitive drums to light by emitting light from the LEDs onto the photosensitive drums.

Further, the exposure unit may include a first exposure unit configured to expose the first photosensitive drum 151K to light, a second exposure unit configured to expose the second photosensitive drum 151Y to light, a third exposure unit configured to expose the third photosensitive drum 151M to light, and a fourth exposure unit configured to expose the fourth photosensitive drum 151C to light.

Although the transfer unit 170 includes the conveying belt 173 as the endless belt in the above embodiment, the transfer unit need not be limited to this configuration. For example, the endless belt may be an intermediate transfer belt, and the transfer unit may further include a second transfer roller for transferring toner images on the intermediate transfer belt to the sheet.

In the above embodiment, the fixing device 180 includes the heating roller 181 and the pressure roller 182, but the fixing device need not be limited to this configuration. For example, the fixing device may employ a belt fixing system.

In the above embodiment, the belt cleaning roller 1101 serves as the belt cleaning member, but the present disclosure need not be limited to this configuration. For example, the belt cleaning member may be a belt cleaning blade configured to collect adherents by scraping the adherents off the endless belt.

In the above embodiment, the color printer 1A including the four photosensitive drums 151 and the four magnetic rollers 161 serves as an example of the image forming apparatus. However, the image forming apparatus need not be limited to the above configuration. For example, the image forming apparatus may be a printer including three photosensitive drums and three magnetic rollers. Alternatively, the image forming apparatus may be a printer including two photosensitive drums and two magnetic rollers. Still alternatively, the image forming apparatus may be a printer including five or more photosensitive drums and magnetic rollers. Further, the image forming apparatus need not be limited to a printer but may be a copying machine or a multifunction peripheral, for example.

Although the above embodiment describes an image forming apparatus that uses positively charged toner, the present disclosure need not be limited to this configuration. For example, an image forming apparatus that uses negatively charged toner may be employed. In a case where the image forming apparatus uses negatively charged toner, the positive and negative biases are opposite those used in the above embodiment.

The elements described in the above embodiment and modifications may be suitably combined to be implemented.

THIRD EMBODIMENT

Next, a third embodiment of the present disclosure will be described in detail while referring to the accompanying drawings as appropriate.

Figure 24:
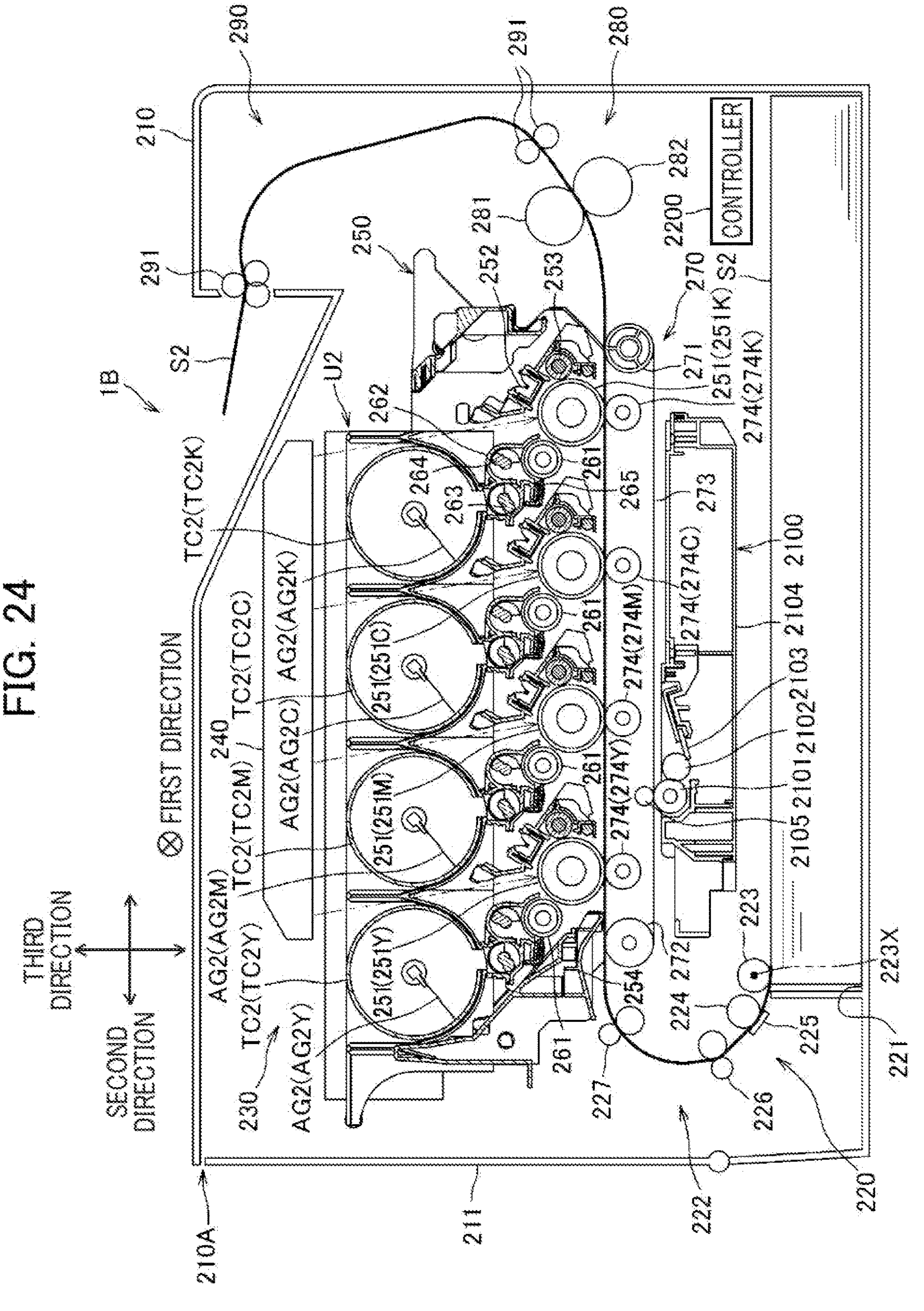
FIG. 24 is a cross-sectional view illustrating an image forming apparatus.

As illustrated in FIG. 24, a color printer 1B as an example of the image forming apparatus includes a main casing 210, a sheet feeding unit 220, an image forming unit 230, a discharging unit 290, a belt cleaner 2100, and a controller 2200.

The main casing 210 has an opening 210A, and includes a front cover 211. The front cover 211 is movable between an open position (see FIG. 25) in which the front cover 211 opens the opening 210A, and a closed position (see FIG. 24) in which the front cover 211 closes the opening 210A.

Specifically, the front cover 211 is pivotally movable between the open position and closed position.

The sheet feeding unit 220 includes a feeding tray 221, and a sheet conveying mechanism 222. The feeding tray 221 accommodates therein sheet(s) S2. The sheet conveying mechanism 222 is configured to convey the sheet S2 from the feeding tray 221 to the image forming unit 230. The sheet conveying mechanism 222 includes a sheet feeding roller 223, a separation roller 224, a separation pad 225, a pair of conveying rollers 226, and a pair of registration rollers 227.

The sheet feeding roller 223 is a roller configured to feed the sheets S2 toward a transfer belt 273 (described later). The sheet feeding roller 223 is rotatable about a second roller axis 223X extending in a first direction. The sheet feeding roller 223 is configured to feed the sheets S2 from the feeding tray 221. The separation roller 224 and the separation pad 225 are configured to separate the sheets S2 fed from the feeding tray 221 one by one. The conveying rollers 226 and the registration rollers 227 are configured to convey the sheets S2. The registration rollers 227 are also configured to correct skew in the sheet S2 by straightening a leading edge of the sheet S2.

The image forming unit 230 includes an exposure unit 240, a process unit U2, a transfer unit 270, and a fixing device 280.

The exposure unit 240 is configured to expose surfaces of photosensitive drums 251 to light after the surfaces are charged. Although not illustrated in the drawings, the exposure unit 240 includes a laser emitting unit, a polygon mirror, lenses, reflecting mirrors, and the like. The exposure unit 240 is configured to emit laser beams onto the photosensitive drums 251, as depicted by virtual lines in FIG. 24.

The process unit U2 includes a drum unit 250, and four toner boxes TC2.

The toner boxes TC2 accommodate therein toner to be supplied to magnetic rollers 261 (described later). The toner is non-magnetic material. The toner is positively charged toner in which the positive is an example of the first polarity. Each of the toner boxes TC2 includes an agitator AG2. The agitator AG2 is configured to agitate toner in the toner box TC2 by rotating.

The four toner boxes TC2 are arranged in a second direction (described later). Specifically, the four toner boxes TC2 include a first toner box TC2Y that accommodates therein toner of yellow, a second toner box TC2K that accommodates therein toner of black, a third toner box TC2M that accommodates therein toner of magenta, and a fourth toner box TC2C that accommodates therein toner of cyan. The first toner box TC2Y, the third toner box TC2M, the fourth toner box TC2C, and the second toner box TC2K are arranged in this order from upstream to downstream in a conveying direction of the sheets S2.

The agitators AG2 include a first agitator AG2Y configured to agitate toner inside the first toner box TC2Y, a second agitator AG2K configured to agitate toner inside the second toner box TC2K, a third agitator AG2M configured to agitate toner inside the third toner box TC2M, and a fourth agitator AG2C configured to agitate toner inside the fourth toner box TC2C.

Figure 25:
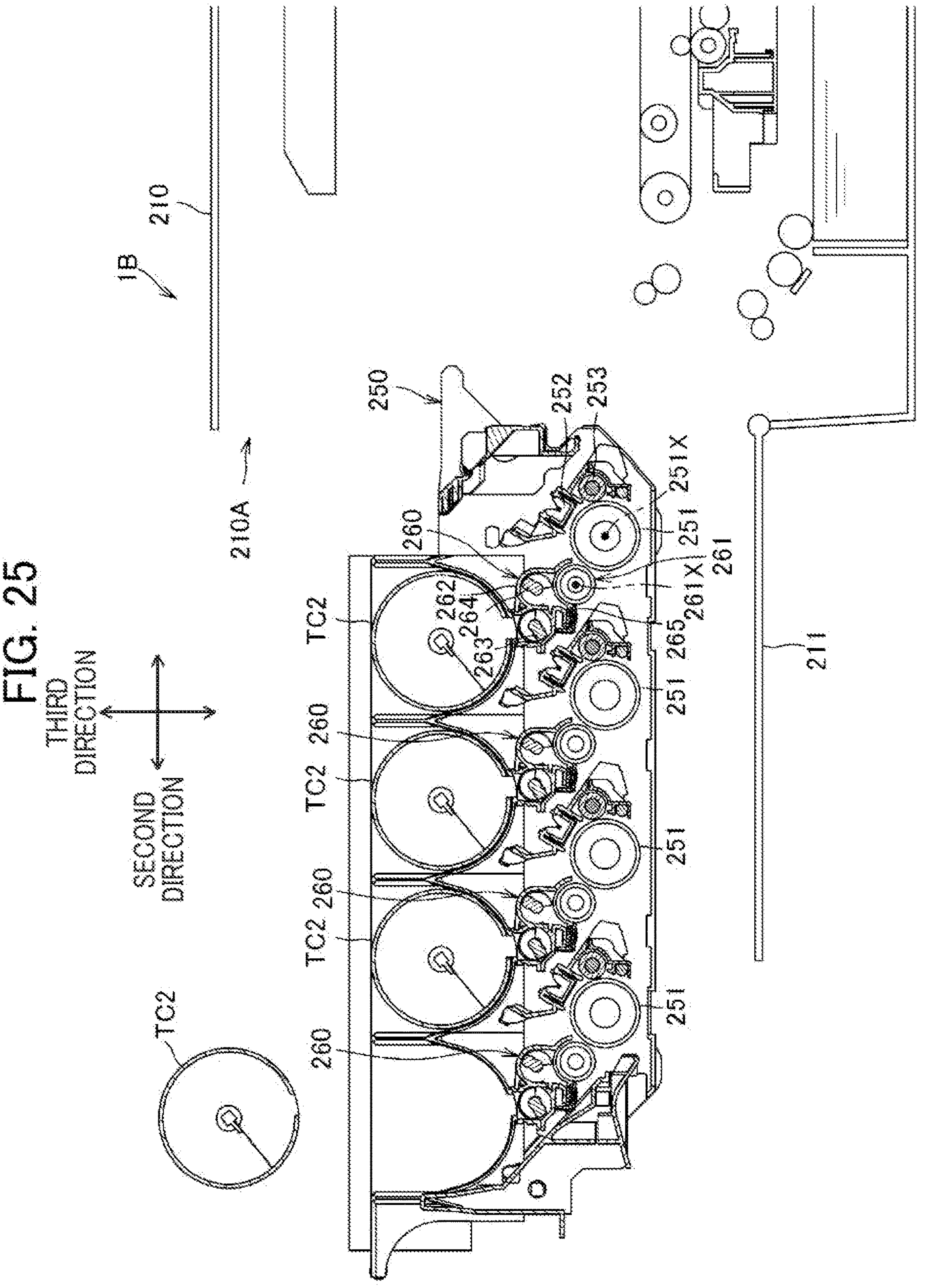
FIG. 25 is a cross-sectional view illustrating a state where a drum unit is in its pulled-out position.

As illustrated in FIG. 25, the toner boxes TC2 are attachable to and detachable from the drum unit 250. Specifically, the toner boxes TC2 are attachable and detachable in a direction crossing the first direction in which drum axes 251X extend. More specifically, the toner boxes TC2 are attachable and detachable in a direction orthogonal to the first direction in which the drum axes 251X extend.

Figure 26:
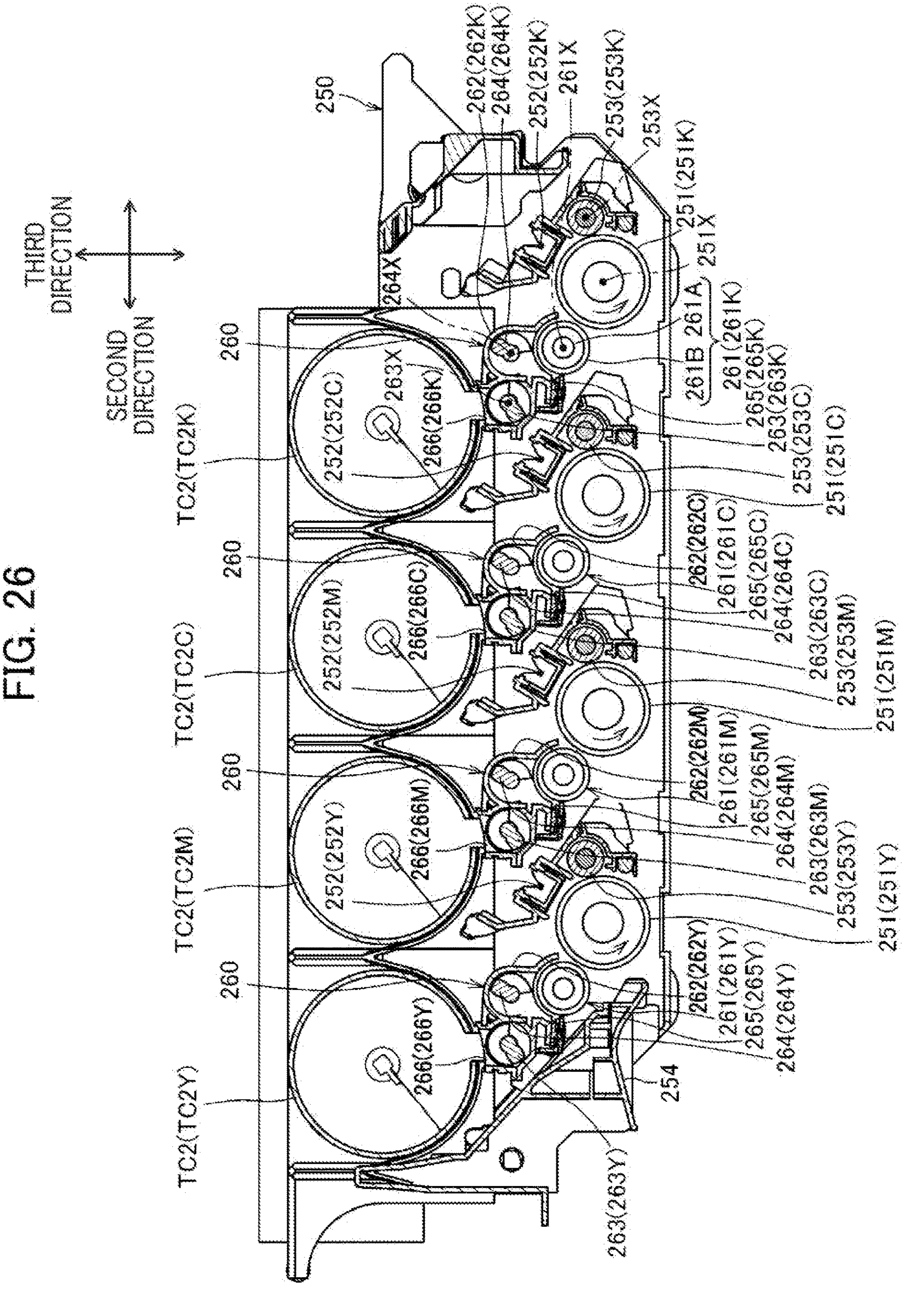
FIG. 26 is a cross-sectional view illustrating the drum unit to which toner boxes are attached.

The drum unit 250 is attachable to and detachable from the main casing 210. The drum unit 250 is a drawer that is movable through the opening 210A in the second direction relative to the main casing 210. Specifically, the drum unit 250 is movable in the second direction relative to the main casing 210 between an accommodated position (see FIG. 24) in which the drum unit 250 is positioned inside the main casing 210, and a pulled-out position (see FIG. 25) in which the drum unit 250 is pulled out of the main casing 210. As illustrated in FIG. 26, the drum unit 250 includes the photosensitive drums 251, scorotron chargers 252, drum cleaning rollers 253, developing units 260, and a sheet guide 254. Specifically, the drum unit 250 includes four photosensitive drums 251, four scorotron chargers 252, four drum cleaning rollers 253, and four developing units 260.

Each of the photosensitive drums 251 is rotatable about the drum axis 251X that extends in the first direction. The second direction is a direction crossing the first direction. Specifically, the second direction is a direction orthogonal to the first direction. The four photosensitive drums 251 are arranged in the second direction.

The photosensitive drums 251 include a first photosensitive drum 251Y corresponding to toner of yellow, a second photosensitive drum 251K corresponding to toner of black, a third photosensitive drum 251M corresponding to toner of magenta, and a fourth photosensitive drum 251C corresponding to toner of cyan. The first photosensitive drum 251Y, the third photosensitive drum 251M, the fourth photosensitive drum 251C, and the second photosensitive drum 251K are arranged in this order from upstream to downstream in the conveying direction of the sheets S2.

The scorotron chargers 252 are configured to charge the surfaces of the corresponding photosensitive drums 251. Each of the scorotron chargers 252 includes a discharge wire, a grid electrode, and the like depicted without reference numerals. When a positive charging bias Vg is applied to the scorotron charger 252, the scorotron charger 252 charges the surface of the corresponding photosensitive drum 251. The scorotron charger 252 is positioned to be spaced apart from the surface of the corresponding photosensitive drum 251. That is, the scorotron charger 252 and the corresponding photosensitive drum 251 are not in contact with each other.

The four scorotron chargers 252 are arranged in the second direction. The four scorotron chargers 252 include a first scorotron charger 252Y configured to charge the surface of the first photosensitive drum 251Y, a second scorotron charger 252K configured to charge the surface of the second photosensitive drum 251K, a third scorotron charger 252M configured to charge the surface of the third photosensitive drum 251M, and a fourth scorotron charger 252C configured to charge the surface of the fourth photosensitive drum 251C. The first scorotron charger 252Y, the third scorotron charger 252M, the fourth scorotron charger 252C, and the second scorotron charger 252K are arranged in this order from upstream to downstream in the conveying direction of the sheets S2.

Each of the drum cleaning rollers 253 is rotatable about a cleaning axis 253X that extends in the first direction. Each of the drum cleaning rollers 253 is a roller configured to collect toner on the corresponding photosensitive drum 251, and also configured to discharge collected toner onto the corresponding photosensitive drum 251.

Specifically, each of the drum cleaning rollers 253 can collect toner on the corresponding photosensitive drum 251 and can also discharge collected toner onto the corresponding photosensitive drum 251 when a drum cleaning bias Vc1*n* is applied to the drum cleaning roller 253. More specifically, each of the drum cleaning rollers 253 collects toner on the corresponding photosensitive drum 251 when a negative drum cleaning bias −Vc1 is applied to the drum cleaning roller 253. The negative serves an example of the second polarity, which has a polarity opposite to the first polarity. The drum cleaning roller 253 also discharges toner onto the corresponding photosensitive drum 251 when a positive drum cleaning bias +Vc2 is applied to the drum cleaning roller 253.

The four drum cleaning rollers 253 include a first drum cleaning roller 253Y, a second drum cleaning roller 253K, a third drum cleaning roller 253M, and a fourth drum cleaning roller 253C.

The first drum cleaning roller 253Y is configured to collect toner on the first photosensitive drum 251Y. The first drum cleaning roller 253Y is also configured to discharge collected toner onto the first photosensitive drum 251Y. The second drum cleaning roller 253K is configured to collect toner on the second photosensitive drum 251K. The second drum cleaning roller 253K is also configured to discharge collected toner onto the second photosensitive drum 251K. The third drum cleaning roller 253M is configured to collect toner on the third photosensitive drum 251M. The third drum cleaning roller 253M is also configured to discharge collected toner onto the third photosensitive drum 251M. The fourth drum cleaning roller 253C is configured to collect toner on the fourth photosensitive drum 251C. The fourth drum cleaning roller 253C is also configured to discharge collected toner onto the fourth photosensitive drum 251C.

The four developing units 260 are arranged in the second direction. The developing units 260 are positioned between the toner boxes TC2 and the photosensitive drums 251 in the direction in which the toner boxes TC2 are attached to the drum unit 250. Each of the four developing units 260 includes the magnetic roller 261, a developing container 262, a first auger 263, a second auger 264, and a thickness-regulating blade 265.

Each of the magnetic rollers 261 is a roller configured to supply toner onto the corresponding photosensitive drum 251. Specifically, the magnetic roller 261 is configured to supply positively charged toner onto the corresponding photosensitive drum 251. The magnetic roller 261 supplies toner to a part of the surface of the corresponding photosensitive drum 251 that has been exposed by the exposure unit 240. When a positive developing bias Vb is applied to the magnetic roller 261, the magnetic roller 261 supplies toner to the exposed part on the surface of the corresponding photosensitive drum 251.

Each of the magnetic rollers 261 has a surface rotatable about a first roller axis 261X that extends in the first direction. Specifically, each of the magnetic rollers 261 includes a magnetic shaft 261A, and a sleeve 261B. The first roller axis 261X is an example of the roller axis.

The magnetic shaft 261A has alternating magnetic poles arranged in a circumferential direction thereof with a predetermined pattern. The magnetic shaft 261A is a solid cylindrical member in which a plurality of permanent magnets are embedded, for example. The magnetic shaft 261A extends in the first direction. The magnetic shaft 261A is fixed to the developing container 262.

The sleeve 261B is configured of a hollow cylindrical member formed primarily of non-magnetic metal material, for example. The sleeve 261B is rotatable relative to the magnetic shaft 261A. In other words, the sleeve 261B is rotatable about the magnetic shaft 261A. The sleeve 261B is configured to hold carrier and toner on a surface thereof. Specifically, the sleeve 261B is configured to hold carrier on the surface thereof through a magnetic force of the magnetic shaft 261A, and to hold toner through the carrier.

The magnetic rollers 261 are positioned between the toner boxes TC2 and the photosensitive drums 251 in the direction in which the toner boxes TC2 are attached to the drum unit 250. The sleeve 261B is rotatable about the first roller axis 261X. The magnetic roller 261 faces the surface of the corresponding photosensitive drum 251. The magnetic roller 261 is positioned to be spaced apart from the surface of the corresponding photosensitive drum 251. That is, the magnetic roller 261 and the corresponding photosensitive drum 251 are not in contact with each other.

The magnetic rollers 261 include a first magnetic roller 261Y, a second magnetic roller 261K, a third magnetic roller 261M, and a fourth magnetic roller 261C.

The first magnetic roller 261Y is configured to supply toner onto the first photosensitive drum 251Y. Further, the first magnetic roller 261Y is positioned to be spaced apart from the first photosensitive drum 251Y. The second magnetic roller 261K is configured to supply toner onto the second photosensitive drum 251K. Further, the second magnetic roller 261K is positioned to be spaced apart from the second photosensitive drum 251K. The third magnetic roller 261M is configured to supply toner onto the third photosensitive drum 251M. Further, the third magnetic roller 261M is positioned to be spaced apart from the third photosensitive drum 251M. The fourth magnetic roller 261C is configured to supply toner onto the fourth photosensitive drum 251C. Further, the fourth magnetic roller 261C is positioned to be spaced apart from the fourth photosensitive drum 251C.

Each of the developing containers 262 is a container that accommodates therein magnetic carrier. The carrier is iron powder, for example. Each of the developing containers 262 has a supply port 266 that allows toner from the corresponding toner box TC2 to be supplied therethrough. The supply port 266 is positioned on the opposite side of the first auger 263 and the second auger 264 from the magnetic roller 261.

The supply port 266 is positioned higher than the first auger 263 and the second auger 264. Specifically, the supply port 266 is positioned above the first auger 263. The first roller axis 261X is positioned lower than the first auger 263 and the second auger 264. Specifically, the first roller axis 261X is positioned below the second auger 264.

The developing containers 262 include a first developing container 262Y having a first supply port 266Y that allows toner to be supplied from the first toner box TC2Y therethrough; a second developing container 262K having a second supply port 266K that allows toner to be supplied from the second toner box TC2K therethrough; a third developing container 262M having a third supply port 266M that allows toner to be supplied from the third toner box TC2M therethrough; and a fourth developing container 262C having a fourth supply port 266C that allows toner to be supplied from the fourth toner box TC2C therethrough.

The first auger 263 is positioned inside the developing container 262. The first auger 263 is rotatable about a first auger axis 263X that extends in the first direction. The first auger 263 is juxtaposed with the second auger 264 in the second direction. The first auger 263 is positioned closer to the supply port 266 than the second auger 264 is to the supply port 266. The first auger 263 is configured to circulate the carrier and the toner inside the developing container 262.

The first auger 263 is also configured to convey toner supplied through the supply port 266 to the second auger 264.

The first augers 263 include a Y first auger 263Y positioned inside the first developing container 262Y, a K first auger 263K positioned inside the second developing container 262K, a M first auger 263M positioned inside the third developing container 262M, and a C first auger 263C positioned inside the fourth developing container 262C.

The second auger 264 is positioned inside the developing container 262. The second auger 264 is rotatable about a second auger axis 264X that extends in the first direction. The second auger 264 is configured to convey the carrier and the toner in the developing container 262 toward the magnetic roller 261. That is, the second auger 264 is configured to supply toner onto the magnetic roller 261. The second auger 264 is also configured to circulate the carrier and the toner inside the developing container 262.

The second augers 264 include a Y second auger 264Y positioned inside the first developing container 262Y, a K second auger 264K positioned inside the second developing container 262K, a M second auger 264M positioned inside the third developing container 262M, and a C second auger 264C positioned inside the fourth developing container 262C.

Each of the thickness-regulating blades 265 is a member configured to regulate a thickness of a toner layer on the corresponding magnetic roller 261. The thickness-regulating blade 265 is not in contact with the corresponding magnetic roller 261. The thickness-regulating blade 265 is positioned lower than the first auger 263 and the second auger 264. Specifically, the thickness-regulating blade 265 is positioned below the first auger 263. The thickness-regulating blade 265 is juxtaposed with the magnetic roller 261 in the second direction. The first roller axis 261X is positioned between the corresponding thickness-regulating blade 265 and drum axis 251X in the second direction.

The thickness-regulating blades 265 include a first thickness-regulating blade 265Y configured to regulate the thickness of the toner layer on the first magnetic roller 261Y, a second thickness-regulating blade 265K configured to regulate the thickness of the toner layer on the second magnetic roller 261K, a third thickness-regulating blade 265M configured to regulate the thickness of the toner layer on the third magnetic roller 261M, and a fourth thickness-regulating blade 265C configured to regulate the thickness of the toner layer on the fourth magnetic roller 261C.

The sheet guide 254 is a guide configured to guide the sheets S2 toward the photosensitive drums 251. The sheet guide 254 is aligned with the photosensitive drums 251 in the second direction. The sheet guide 254 is positioned upstream of the four photosensitive drums 251 in the conveying direction of the sheets S2.

The first magnetic roller 261Y is positioned between the sheet guide 254 and the Y second auger 264Y in a third direction that crosses both the first direction and the second direction. Preferably, the third direction is orthogonal to both the first direction and the second direction. The first thickness-regulating blade 265Y is positioned between the sheet guide 254 and the Y first auger 263Y in the third direction.

As illustrated in FIG. 24, the transfer unit 270 is configured to transfer toner images on the photosensitive drums 251 onto the sheet S2. The transfer unit 270 is positioned between the sheet feeding unit 220 and the drum unit 250 in the third direction. The transfer unit 270 includes a drive roller 271, a follow roller 272, the transfer belt 273, and four transfer rollers 274.

The drive roller 271 and the follow roller 272 are spaced apart from each other in the second direction. The drive roller 271 and the follow roller 272 support the transfer belt 273 which is an endless belt. The transfer rollers 274 are positioned within a space encircled by the transfer belt 273. The transfer rollers 274 and the corresponding photosensitive drums 251 nip the transfer belt 273 therebetween. When a negative transferring bias Vt is applied to the transfer rollers 274, the transfer belt 273 transfers the toner images on the photosensitive drums 251 onto the sheet S2.

The four transfer rollers 274 are arranged in the second direction. The four transfer rollers 274 include a first transfer roller 274Y configured to transfer the toner image on the first photosensitive drum 251Y to the sheet S2, a second transfer roller 274K configured to transfer the toner image on the second photosensitive drum 251K to the sheet S2, a third transfer roller 274M configured to transfer the toner image on the third photosensitive drum 251M to the sheet S2, and a fourth transfer roller 274C configured to transfer the toner image on the fourth photosensitive drum 251C to the sheet S2. The first transfer roller 274Y, the third transfer roller 274M, the fourth transfer roller 274C, and the second transfer roller 274K are arranged in this order from upstream to downstream in the conveying direction of the sheets S2.

The fixing device 280 is configured to fix the toner image on the sheet S2 to the sheet S2. The fixing device 280 includes a heating roller 281 serving as an example of the fixing roller configured to fix the toner image to the sheet S2, and a pressure roller 282. The pressure roller 282 and the heating roller 281 are configured to nip the sheet S2 therebetween.

In the image forming unit 230, the scorotron chargers 252 charge the surfaces of the corresponding photosensitive drums 251. The exposure unit 240 then exposes the surfaces of the photosensitive drums 251, thereby forming electrostatic latent images on the photosensitive drums 251.

The toner boxes TC2 supply toner into the corresponding developing containers 262. The first augers 263 convey the toner and the carrier in the developing containers 262 to the second augers 264. The second augers 264 convey the toner and the carrier in the developing containers 262 to the corresponding magnetic rollers 261. The magnetic rollers 261 supply the toner onto the electrostatic latent images on the corresponding photosensitive drums 251, thereby forming toner images on the photosensitive drums 251.

The transfer belt 273 conveys the sheet S2 between the transfer belt 273 itself and the photosensitive drums 251. As the sheet S2 passes between the photosensitive drums 251 and the corresponding transfer rollers 274, the toner images on the photosensitive drums 251 are transferred onto the sheet S2. Thereafter, the sheet S2 passes between the heating roller 281 and the pressure roller 282. At this time, the toner image on the sheet S2 is fixed to the sheet S2.

The discharging unit 290 includes a plurality of sheet discharging rollers 291. The sheet discharging rollers 291 are configured to discharge the sheet S2 on which an image has been formed out of the main casing 210.

The belt cleaner 2100 is configured to collect toner on the transfer belt 273. The belt cleaner 2100 includes a belt cleaning roller 2101, a collecting roller 2102, a scraping blade 2103, a waste toner accommodating unit 2104, and a backup roller 2105. The backup roller 2105 is positioned within the space encircled by the transfer belt 273. The backup roller 2105 and the belt cleaning roller 2101 nip the transfer belt 273 therebetween.

The belt cleaning roller 2101 is configured to collect toner from the transfer belt 273. Specifically, the belt cleaning roller 2101 collects toner on the transfer belt 273 when a negative belt cleaning bias Vbc is applied to the belt cleaning roller 2101. The collecting roller 2102 is configured to collect toner on the belt cleaning roller 2101. The scraping blade 2103 is configured to scrape toner off the collecting roller 2102.

The waste toner accommodating unit 2104 is configured to accommodate therein toner collected by the belt cleaning roller 2101. Specifically, the waste toner accommodating unit 2104 accommodates therein toner collected from the belt cleaning roller 2101 by the collecting roller 2102 and scraped off the collecting roller 2102 by the scraping blade 2103.

Figure 27:
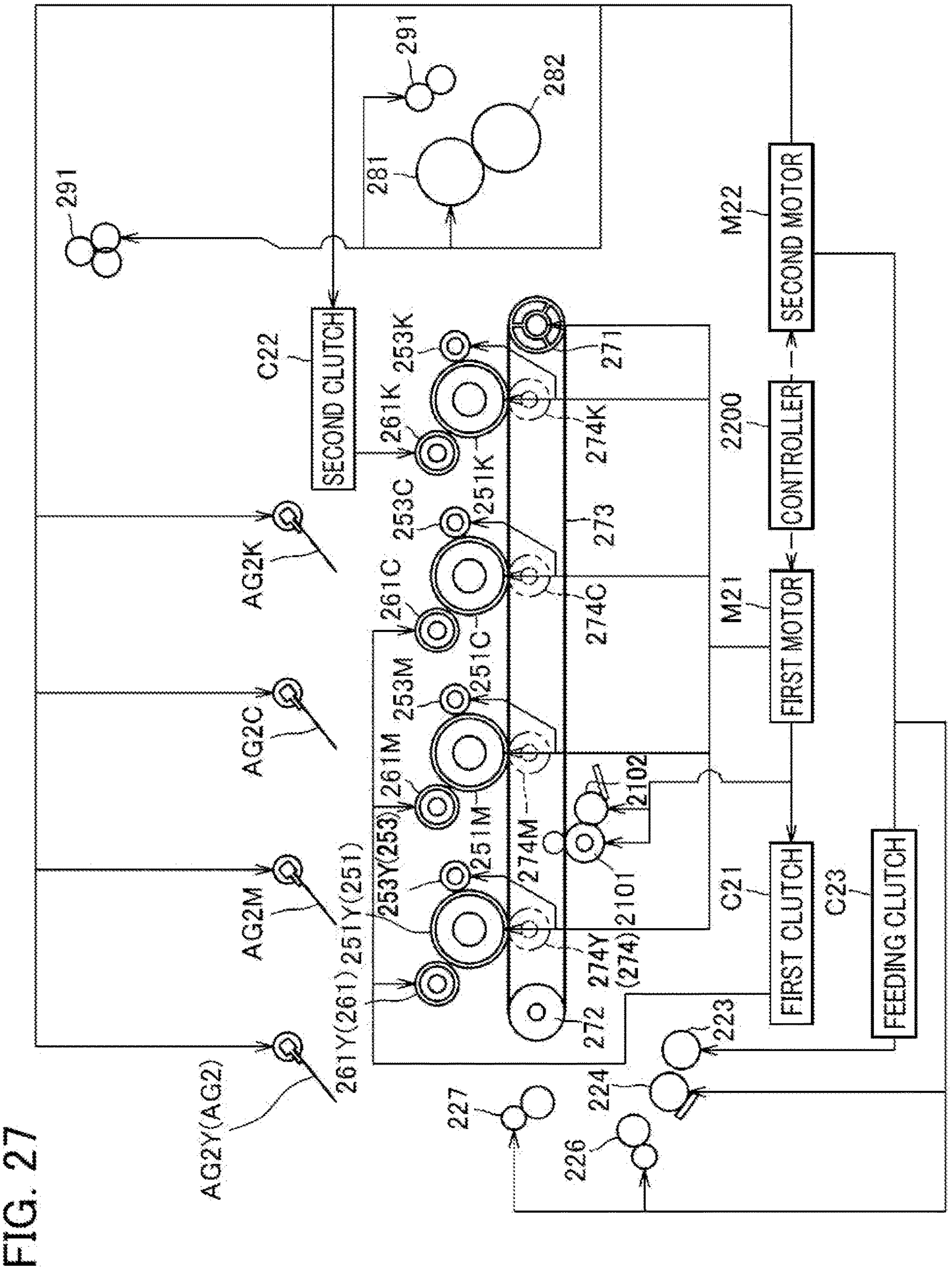
FIG. 27 is a view illustrating a transmission configuration of a driving force of a motor in a simplified manner.

As illustrated in FIG. 27, the color printer 1B further includes a first motor M21, a second motor M22, a first clutch C21, a second clutch C22, and a feeding clutch C23.

The first motor M21 is configured to drive the photosensitive drums 251, the transfer belt 273, and the drum cleaning rollers 253. Specifically, the first motor M21 is configured to drive the four photosensitive drums 251 (251Y, 251M, 251C, and 251K), and the four drum cleaning rollers 253 (253Y, 253M, 253C, and 253K). By driving the drive roller 271, the first motor M21 also drives the transfer belt 273 and the four transfer rollers 274 (274Y, 274M, 274C, and 274K). A driving force of the first motor M21 is transmitted to the four photosensitive drums 251, the four drum cleaning rollers 253, and the drive roller 271 via a gear train (not illustrated).

The first motor M21 is configured to also drive the first magnetic roller 261Y, the third magnetic roller 261M, the fourth magnetic roller 261C, the belt cleaning roller 2101, and the collecting roller 2102. The driving force of the first motor M21 is transmitted via a gear train (not illustrated) to the first magnetic roller 261Y, the third magnetic roller 261M, the fourth magnetic roller 261C, the belt cleaning roller 2101, and the collecting roller 2102.

The gear train for transmitting the driving force of the first motor M21 to the first magnetic roller 261Y, the third magnetic roller 261M, and the fourth magnetic roller 261C includes the first clutch C21 which is controlled by the controller 2200. The first clutch C21 is an electromagnetic clutch, for example. The first clutch C21 is switchable between a first transmission state in which the first clutch C21 transmits the driving force from the first motor M21 to the first magnetic roller 261Y, the third magnetic roller 261M, and the fourth magnetic roller 261C, and a first cutoff state in which the first clutch C21 does not transmit the driving force from the first motor M21 to the first magnetic roller 261Y, the third magnetic roller 261M, and the fourth magnetic roller 261C.

The controller 2200 rotates the sleeves 261B of the first magnetic roller 261Y, the third magnetic roller 261M, and the fourth magnetic roller 261C by setting the first clutch C21 to the first transmission state. The controller 2200 also stops rotation of the sleeves 261B of the first magnetic roller 261Y, the third magnetic roller 261M, and the fourth magnetic roller 261C by setting the first clutch C21 to the first cutoff state.

The second motor M22 is a motor configured to drive the sheet feeding roller 223. A driving force of the second motor M22 is transmitted to the sheet feeding roller 223 via a gear train (not illustrated). The gear train for transmitting the driving force of the second motor M22 to the sheet feeding roller 223 includes the feeding clutch C23 which is controlled by the controller 2200. The feeding clutch C23 is an electromagnetic clutch, for example. The feeding clutch C23 is switchable between a third transmission state in which the feeding clutch C23 transmits the driving force from the second motor M22 to the sheet feeding roller 223, and a third cutoff state in which the feeding clutch C23 does not transmit the driving force from the second motor M22 to the sheet feeding roller 223.

The controller 2200 rotates the sheet feeding roller 223 to feed the sheet S2 from the feeding tray 221 by setting the feeding clutch C23 to the third transmission state. The controller 2200 also stops rotation of the sheet feeding roller 223 by setting the feeding clutch C23 to the third cutoff state.

The second motor M22 is configured to also drive the separation roller 224, the conveying roller 226, and the registration roller 227. The driving force of the second motor M22 is transmitted via a gear train (not illustrated) to the separation roller 224, the conveying roller 226, and the registration roller 227.

The second motor M22 is configured to also drive the second magnetic roller 261K, the heating roller 281, the sheet discharging rollers 291, and the agitators AG2 (AG2Y, AG2M, AG2C, and AG2K) in the four toner boxes TC2. The driving force of the second motor M22 is transmitted via gear trains (not illustrated) to the second magnetic roller 261K, the heating roller 281, the sheet discharging rollers 291, and the four agitators AG2.

The gear train for transmitting the driving force of the second motor M22 to the second magnetic roller 261K includes the second clutch C22 which is controlled by the controller 2200. The second clutch C22 is an electromagnetic clutch, for example. The second clutch C22 is switchable between a second transmission state in which the second clutch C22 transmits the driving force from the second motor M22 to the second magnetic roller 261K, and a second cutoff state in which the second motor M22 does not transmit the driving force from the second motor M22 to the second magnetic roller 261K.

The controller 2200 rotates the sleeve 261B of the second magnetic roller 261K by setting the second clutch C22 to the second transmission state. The controller 2200 also stops rotation of the sleeve 261B of the second magnetic roller 261K by setting the second clutch C22 to the second cutoff state.

The controller 2200 includes a CPU, a RAM, a ROM, input/output circuits, and the like. The controller 2200 is configured to execute control by performing various arithmetic operations on the basis of programs and data stored in the ROM and the like. The controller 2200 is configured to control the first motor M21, the second motor M22, the first clutch C21, the second clutch C22, and the feeding clutch C23. The controller 2200 is configured to also control the charging bias Vg, the developing bias Vb, the drum cleaning bias Vc1*n*, the transferring bias Vt, and the belt cleaning bias Vbc.

The controller 2200 is configured to execute a printing operation for forming an image on the sheet S2, and a cleaning operation for cleaning the drum cleaning rollers 253.

When executing the printing operation, the controller 2200 drives the first motor M21 and the second motor M22. In this way, the controller 2200 can drive the sheet feeding roller 223, the separation roller 224, the conveying roller 226, the registration roller 227, the transfer belt 273, the four transfer rollers 274, the four photosensitive drums 251, the four drum cleaning rollers 253, the heating roller 281, the sheet discharging rollers 291, the belt cleaning roller 2101, the collecting roller 2102, and the four agitators AG2.

As the printing operation, the controller 2200 is configured to execute a color printing operation for forming a color image on the sheet S2, and a monochromatic printing operation for forming a monochromatic image on the sheet S2.

When executing the color printing operation, the controller 2200 drives the first magnetic roller 261Y, the third magnetic roller 261M, the fourth magnetic roller 261C, and the second magnetic roller 261K. Specifically, when executing the color printing operation, the controller 2200 sets the first clutch C21 to the first transmission state and the second clutch C22 to the second transmission state. As a result, the driving force of the first motor M21 is transmitted to the first magnetic roller 261Y, the third magnetic roller 261M, and the fourth magnetic roller 261C so that the sleeves 261B of the first magnetic roller 261Y, the third magnetic roller 261M, and the fourth magnetic roller 261C are driven. Further, the driving force of the second motor M22 is transmitted to the second magnetic roller 261K so that the sleeve 261B of the second magnetic roller 261K is driven.

When executing the monochrome printing operation, the controller 2200 drives the second magnetic roller 261K, but does not drive the first magnetic roller 261Y, the third magnetic roller 261M, and the fourth magnetic roller 261C. Specifically, when executing the monochrome printing operation, the controller 2200 sets the first clutch C21 to the first cutoff state and the second clutch C22 to the second transmission state. Accordingly, the driving force of the first motor M21 is not transmitted to the first magnetic roller 261Y, the third magnetic roller 261M, and the fourth magnetic roller 261C and the sleeves 261B of the first magnetic roller 261Y, the third magnetic roller 261M, and the fourth magnetic roller 261C are not driven. Further, the driving force of the second motor M22 is transmitted to the second magnetic roller 261K so that the sleeve 261B of the second magnetic roller 261K is driven.

When executing the printing operation, the controller 2200 applies the developing bias Vb to the magnetic rollers 261, irrespective of whether the printing operation is the color printing operation or the monochrome printing operation. Specifically, the controller 2200 applies a developing bias Vb of a first value to the magnetic rollers 261 when executing the printing operation. In the following description, the developing bias Vb of the first value will be referred to as "developing bias Vb1." When executing the printing operation, the controller 2200 applies the developing bias Vb1 to the sleeves 261B of the magnetic rollers 261.

When executing the printing operation, the controller 2200 also executes a first collecting process irrespective of whether the printing operation is the color printing operation or the monochrome printing operation. In the first collecting process, the controller 2200 applies the drum cleaning bias −Vc1 to the four drum cleaning rollers 253. In this way, the controller 2200 collects toner on the photosensitive drums 251 using the drum cleaning rollers 253.

When executing the cleaning operation, the controller 2200 drives the first motor M21 but does not drive the second motor M22. Consequently, the controller 2200 can drive the four drum cleaning rollers 253, the four photosensitive drums 251, the transfer belt 273, the four transfer rollers 274, the belt cleaning roller 2101, and the collecting roller 2102. However, the sheet feeding roller 223, the separation roller 224, the conveying roller 226, the registration roller 227, the heating roller 281, the sheet discharging rollers 291, and the four agitators AG2 are not driven.

When executing the cleaning operation, the controller 2200 executes a charging bias applying process, a developing bias applying process, a discharging process, a transferring process, and a second collecting process.

In the charging bias applying process, the controller 2200 applies the charging bias Vg to the four scorotron chargers 252. Through this application, the controller 2200 charges the surfaces of the photosensitive drums 251 using the scorotron chargers 252. When executing the cleaning operation, the controller 2200 does not expose the surfaces of the four charged photosensitive drums 251 using the exposure unit 240.

In the developing bias applying process, the controller 2200 applies the developing bias Vb to the four magnetic rollers 261. Specifically, the controller 2200 applies the developing bias Vb to the four magnetic rollers 261 in the developing bias applying process so that the surface potential on the magnetic rollers 261 has an absolute value that is greater than an absolute value of the surface potential on unexposed parts of the charged photosensitive drums 251.

When executing the developing bias applying process, the controller 2200 applies a positive developing bias Vb to the four magnetic rollers 261. Specifically, when executing the cleaning operation, the controller 2200 applies a developing bias Vb of a second value to the four magnetic rollers 261 in the developing bias applying process. An absolute value of the second value is greater than an absolute value of the first value. Hereinafter, the developing bias Vb of the second value will be referred to as "developing bias Vb2." When executing the developing bias applying process, the controller 2200 applies the developing bias Vb2 to the sleeves 261B of the four magnetic rollers 261.

In the discharging process, the controller 2200 applies the drum cleaning bias +Vc2 to the four drum cleaning rollers 253. Through this application, the controller 2200 discharges toner on the drum cleaning rollers 253 collected in the first collecting process of the printing operation onto the corresponding photosensitive drums 251.

In the transferring process, the controller 2200 applies the transferring bias Vt to the four transfer rollers 274. Through this application, the controller 2200 transfers toner on the photosensitive drums 251 directly onto the transfer belt 273.

In the second collecting process, the controller 2200 applies the belt cleaning bias Vbc to the belt cleaning roller 2101. Through this application, the controller 2200 collects toner on the transfer belt 273 using the belt cleaning roller 2101 so that collected toner is accommodated in the waste toner accommodating unit 2104.

When executing the cleaning operation, the controller 2200 stops the rotation of the four magnetic rollers 261. Specifically, when executing the cleaning operation, the controller 2200 does not drive the second motor M22 and sets the first clutch C21 to the first cutoff state. Accordingly, the driving force of the first motor M21 is not transmitted to the first magnetic roller 261Y, the third magnetic roller 261M, and the fourth magnetic roller 261C, and thus the rotation of the sleeves 261B of the first magnetic roller 261Y, the third magnetic roller 261M, and the fourth magnetic roller 261C can be stopped. Also, the rotation of the sleeve 261B of the second magnetic roller 261K can be stopped. Note that, when executing the cleaning operation, the controller 2200 sets the second clutch C22 to the second cutoff state.

Next, one example of the operations performed by the controller 2200 will be described while referring to the flowcharts in FIGS. 28 to 30 and the timing charts in FIGS. 31 and 32. In the following description, setting the clutches C21 to C23 to their transmission states will be referred to as "turning on the clutches", and setting the clutches C21 to C23 to their cutoff states will be referred to as "turning off the clutches". Before a print job is received, the clutches C21 to C23 are maintained OFF.

Figure 28:
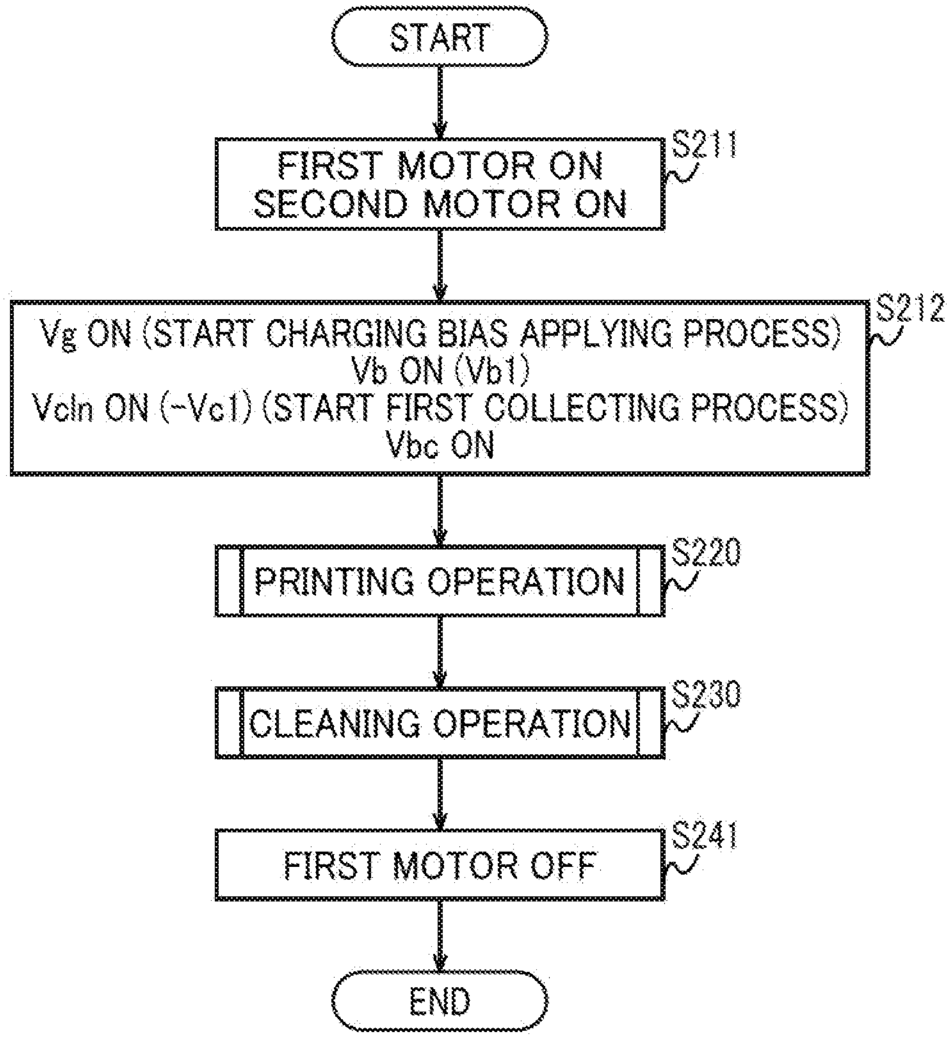
FIG. 28 is a flowchart illustrating one example of operations executed by a controller.
Figure 31:
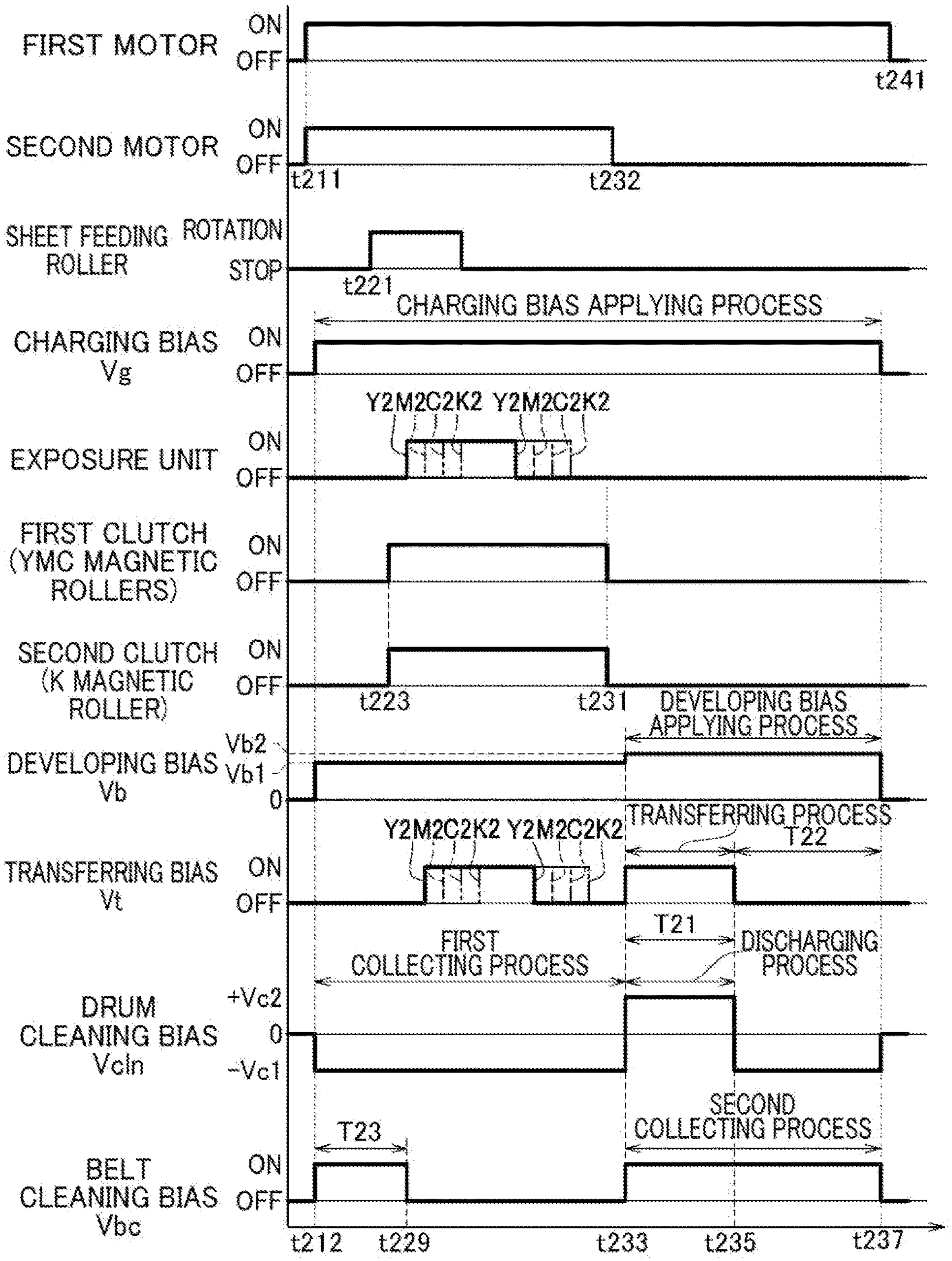
FIG. 31 is a timing chart illustrating a case where the cleaning operation is executed after executing a color printing operation.
Figure 32:
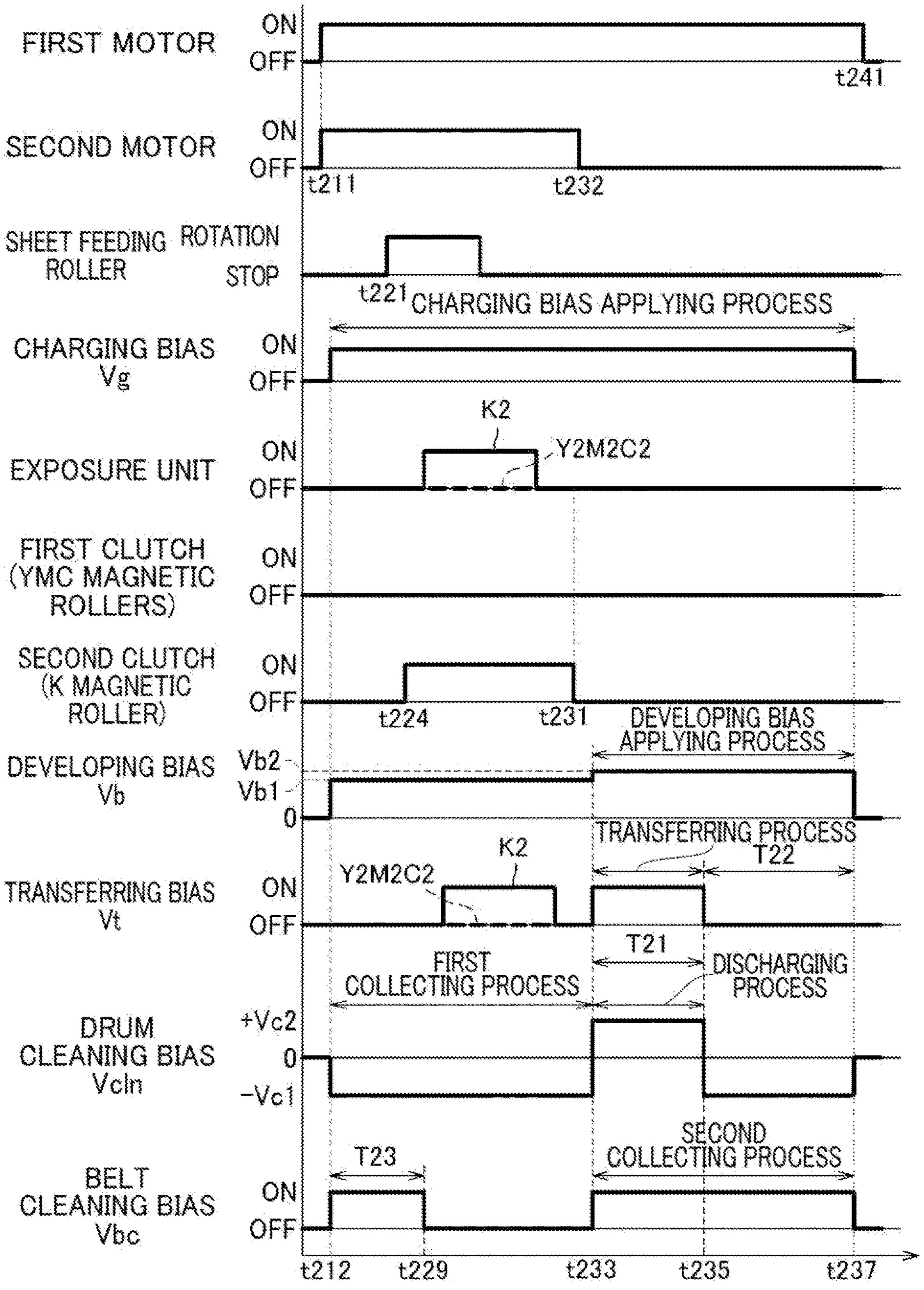
FIG. 32 is a timing chart illustrating a case where the cleaning operation is executed after executing a monochromatic printing operation.

As illustrated in FIG. 28, when receiving a print job that includes instructions to start printing, image data, and the like, in S211 the controller 2200 turns on the first motor M21 and the second motor M22 (*t*211 in FIGS. 31 and 32). This operation causes the separation roller 224, the conveying rollers 226, the registration rollers 227, the transfer belt 273, the four transfer rollers 274, the four photosensitive drums 251, the four drum cleaning rollers 253, the heating roller 281, the sheet discharging rollers 291, the belt cleaning roller 2101, the collecting roller 2102, and the four agitators AG2 to rotate.

In S212 the controller 2200 also turns on the charging bias Vg, the developing bias Vb, the drum cleaning bias Vc1*n*, and the belt cleaning bias Vbc (t212 in FIGS. 31 and 32). By turning on the charging bias Vg, the controller 2200 starts the charging bias applying process in which the scorotron chargers 252 charge the surfaces of the corresponding photosensitive drums 251. Further, by turning on the belt cleaning bias Vbc, the controller 2200 collects toner on the transfer belt 273 into the waste toner accommodating unit 2104 using the belt cleaning roller 2101.

The controller 2200 also applies the developing bias Vb1 to the sleeves 261B of the magnetic rollers 261 as the developing bias Vb. The controller 2200 also applies the drum cleaning bias −Vc1 for collecting toner to the drum cleaning rollers 253 as the drum cleaning bias Vc1*n*. Through this application, the controller 2200 starts the first collecting process in which the drum cleaning rollers 253 collect toner on the corresponding photosensitive drums 251.

In S220 the controller 2200 executes the printing operation. Specifically, in S221 illustrated in FIG. 29, the controller 2200 rotates the sheet feeding roller 223 (*t*221 in FIGS. 31 and 32) by turning on the feeding clutch C23 to start feeding of the sheet S2. After the feeding of one sheet S2 has been completed, the controller 2200 turns off the feeding clutch C23 to stop the sheet feeding roller 223.

In S222 the controller 2200 determines whether or not the printing operation is the color printing operation. When the printing operation is the color printing operation (S222: YES), in S223 the controller 2200 turns on the first clutch C21 and the second clutch C22 (*t*223 in FIG. 31), thereby rotating the sleeves 261B of the four magnetic rollers 261.

In S225 the controller 2200 forms a color image on the fed sheet S2 by executing exposure, development, transfer, and fixing. At this time, the controller 2200 executes the exposure using the exposure unit 240 in the order of the first photosensitive drum 251Y corresponding to yellow (Y), the third photosensitive drum 251M corresponding to magenta (M), the fourth photosensitive drum 251C corresponding to cyan (C), and the second photosensitive drum 251K corresponding to black (K), as illustrated in FIG. 31.

In the present embodiment, the controller 2200 turns off the belt cleaning bias Vbc prior to executing the transfer. As an example, the controller 2200 turns off the belt cleaning bias Vbc once a third time T23 has elapsed since the belt cleaning bias Vbc has been turned on (t229 in FIGS. 31 and 32). The third time T23 is set to a length of time required for the transfer belt 273 to make at least one circulation, for example.

In the present embodiment, the controller 2200 turns on the transferring bias Vt at timings for starting the transfer in the order of the first transfer roller 274Y corresponding to yellow (Y), the third transfer roller 274M corresponding to magenta (M), the fourth transfer roller 274C corresponding to cyan (C), and the second transfer roller 274K corresponding to black (K). Subsequently, the controller 2200 turns off the transferring bias Vt at timings at which the transfer has completed in the order of the first transfer roller 274Y corresponding to yellow (Y), the third transfer roller 274M corresponding to magenta (M), the fourth transfer roller 274C corresponding to cyan (C), and the second transfer roller 274K corresponding to black (K).

Note that the controller 2200 may turn on the transferring bias Vt simultaneously for all four transfer rollers 274 while executing the color printing operation. Similarly, the controller 2200 may turn off the transferring bias Vt simultaneously for all four transfer rollers 274 while executing the color printing operation.

Figure 29:
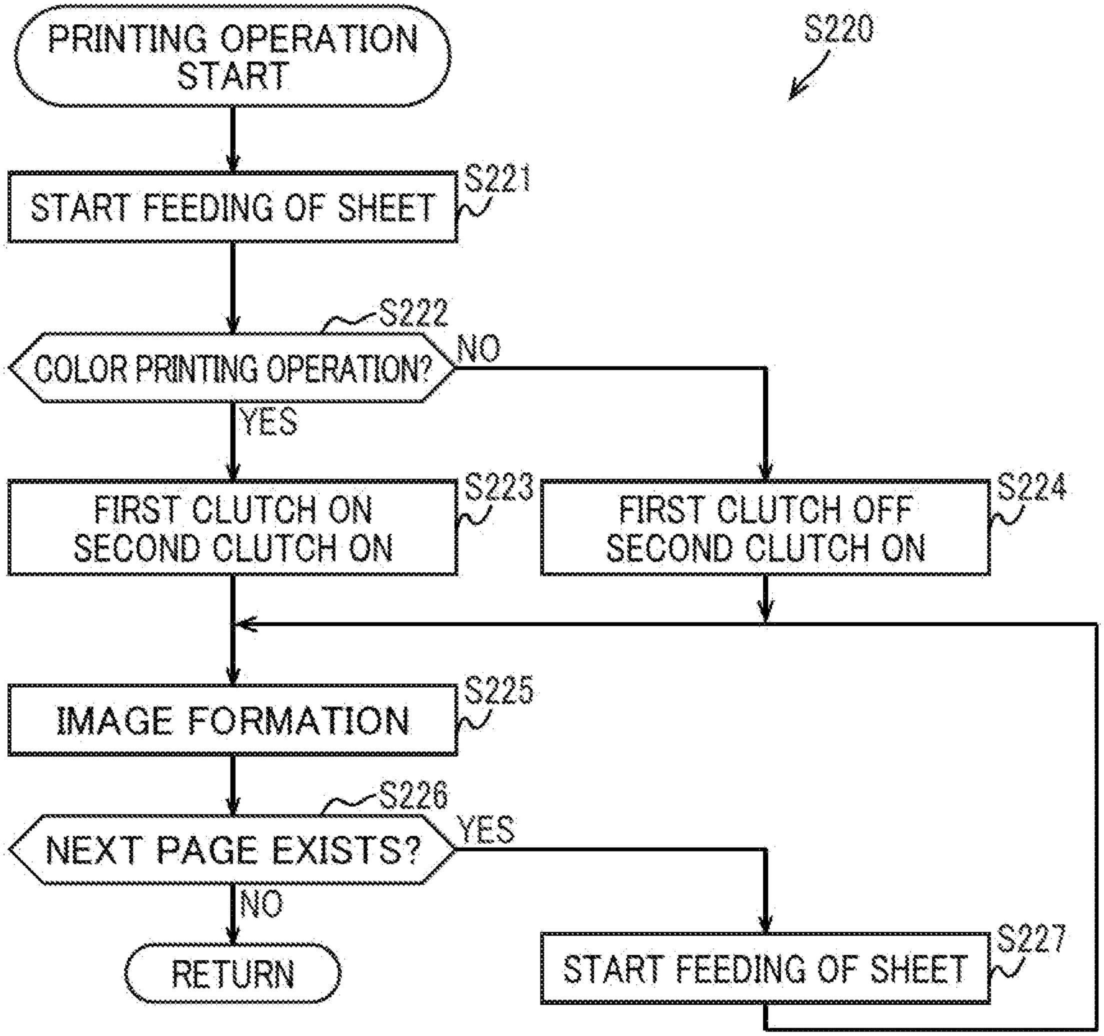
FIG. 29 is a flowchart illustrating one example of a printing operation.
Figure 30:
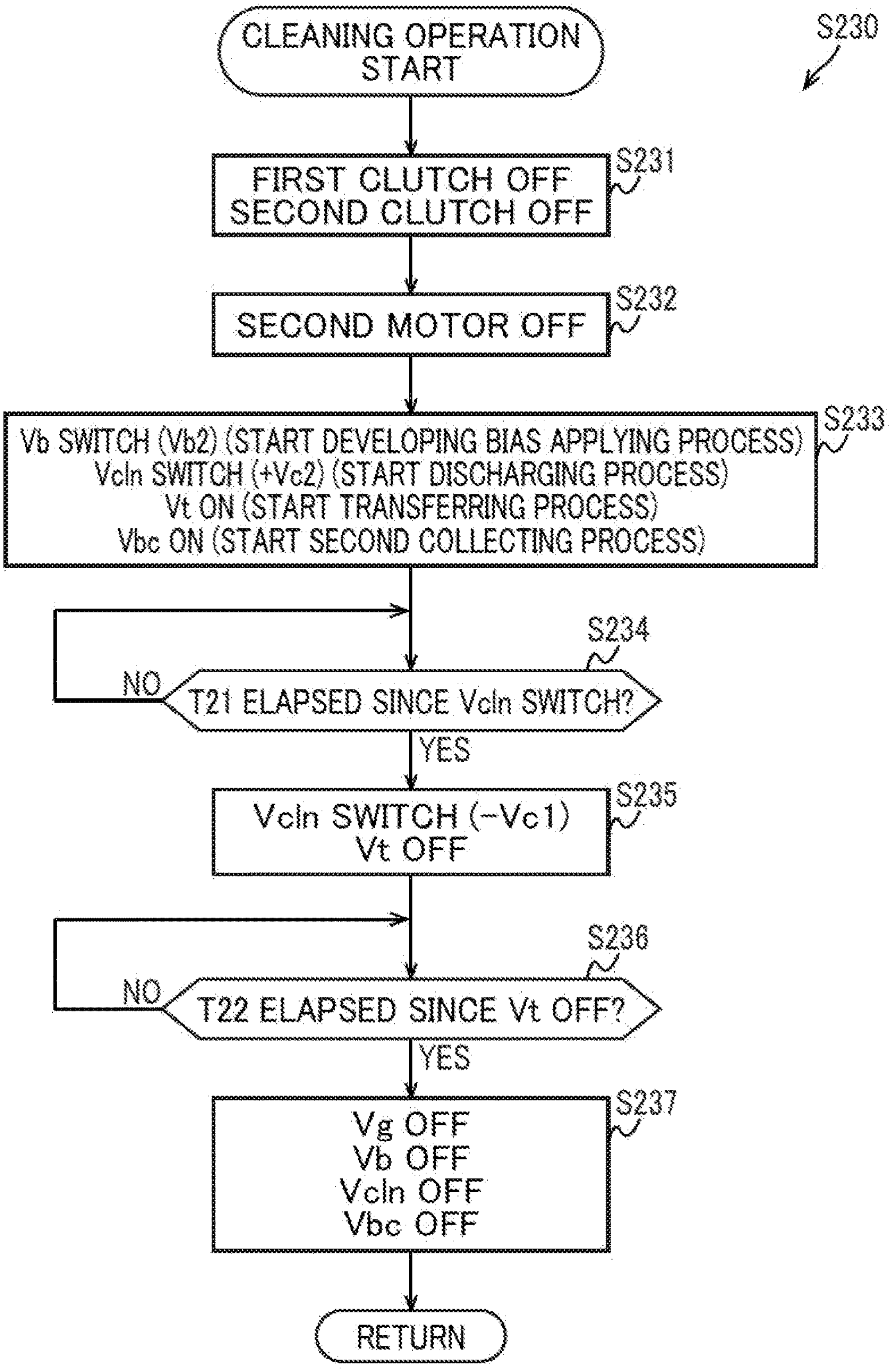
FIG. 30 is a flowchart illustrating one example of a cleaning operation.

After the process of S225 in FIG. 29, in S226 the controller 2200 determines whether or not the print job includes a next page. When there is a next page in the print job (S226: YES), in S227 the controller 2200 turns on the feeding clutch C23 at a prescribed timing for rotating the sheet feeding roller 223 to feed the next sheet S2. Thereafter, in S225 the controller 2200 forms an image on the next sheet S2. When the print job does not include a next page in S226 (S226: NO), the controller 2200 ends the color printing operation as the printing operation.

When the printing operation is the monochromatic printing operation in S222 (S222: NO), in S224 the controller 2200 turns off the first clutch C21 and turns on the second clutch C22 (*t*224 in FIG. 32). As a result, the sleeves 261B of the first magnetic roller 261Y, the third magnetic roller 261M, and the fourth magnetic roller 261C do not rotate while only the sleeve 261B of the second magnetic roller 261K rotates.

In S225 the controller 2200 forms a monochromatic image on the fed sheet S2 by executing exposure, development, transfer, and fixing. At this time, the controller 2200 executes the exposure using the exposure unit 240 only for the second photosensitive drum 251K corresponding to black (K), as illustrated in FIG. 32. The controller 2200 also turns on the transferring bias Vt only for the second transfer roller 274K corresponding to black (K) at a timing for starting the transfer. Subsequently, the controller 2200 turns off the transferring bias Vt at a timing at which the transfer has completed.

After the process in S225 of FIG. 29, in S226 the controller 2200 determines whether or not the print job includes a next page. When there is a next page in the print job (S226: YES), in S227 the controller 2200 starts feeding of the next sheet S2 and in S225 forms an image on the next sheet S2. When a next page does not exist in the print job (S226: NO), the controller 2200 ends the monochromatic printing operation as the printing operation.

Referring back to FIG. 28, after completing the printing operation, in S230 the controller 2200 executes the cleaning operation. Specifically, in S231 illustrated in FIG. 30 the controller 2200 turns off the first clutch C21 and the second clutch C22 (*t*231 in FIGS. 31 and 32), thereby stopping the rotation of the sleeves 261B of the four magnetic rollers 261.

In S232 the controller 2200 also turns off the second motor M22 (*t*232 in FIG. 31). This operation can ensure that the sheet feeding roller 223, the separation roller 224, the conveying rollers 226, the registration rollers 227, the heating roller 281, the sheet discharging rollers 291, and the four agitators AG2, which are not used in the cleaning operation, are not driven.

Subsequently, in S233 the controller 2200 switches the developing bias Vb from Vb1 to Vb2 and switches the drum cleaning bias Vc1*n* from −Vc1 to +Vc2. The controller 2200 also turns on the transferring bias Vt and the belt cleaning bias Vbc (t233 in FIGS. 31 and 32).

By applying the developing bias Vb2 to the sleeves 261B of the magnetic rollers 261, the controller 2200 starts the developing bias applying process. Further, by applying the drum cleaning bias +Vc2 to the drum cleaning rollers 253, the controller 2200 ends the first collecting process and starts the discharging process for discharging toner on the drum cleaning rollers 253 onto the photosensitive drums 251.

Further, by applying the transferring bias Vt to the transfer rollers 274, the controller 2200 starts the transferring process for transferring toner on the photosensitive drums 251 to the transfer belt 273. Further, by applying the belt cleaning bias Vbc to the belt cleaning roller 2101, the controller 2200 starts the second collecting process for collecting toner on the transfer belt 273 into the waste toner accommodating unit 2104 using the belt cleaning roller 2101.

Subsequently, in S234 the controller 2200 determines whether or not a first time T21 has elapsed since the drum cleaning bias Vc1*n* has been switched from −Vc1 to +Vc2. The controller 2200 waits until the first time T21 has elapsed (S234: NO). When the first time T21 has elapsed (S234: YES), in S235 the controller 2200 switches the drum cleaning bias Vc1*n* from +Vc2 to −Vc1 and turns off the transferring bias Vt (t235 in FIGS. 31 and 32). The first time T21 is set to a length of time required for the drum cleaning rollers 253 to make at least one rotation, for example.

By applying the drum cleaning bias −Vc1 to the drum cleaning rollers 253, the controller 2200 collects toner on the photosensitive drums 251 using the drum cleaning rollers 253. By switching the drum cleaning bias Vc1*n* applied to the drum cleaning rollers 253 from +Vc2 to −Vc1, the controller 2200 ends the discharging process. Further, by turning off the transferring bias Vt, the controller 2200 ends the transferring process. At this time, the controller 2200 continues to execute the second collecting process.

Subsequently, in S236 the controller 2200 determines whether or not a second time T22 has elapsed since the transferring bias Vt has been turned off. The controller 2200 waits until the second time T22 has elapsed (S236: NO). When the second time T22 has elapsed (S236: YES), in S237 the controller 2200 turns off the charging bias Vg, the developing bias Vb, the drum cleaning bias Vc1*n*, and the belt cleaning bias Vbc (t237 in FIGS. 31 and 32), and ends the cleaning operation. The second time T22 is set equal to or longer than a length of time required for a portion of the transfer belt 273 that faces the first photosensitive drum 251Y to move to a position facing the belt cleaning roller 2101 in accordance with the circular movement of the transfer belt 273.

By turning off the charging bias Vg, the controller 2200 ends the charging bias applying process. Further, by turning off the developing bias Vb, the controller 2200 ends the developing bias applying process. Further, by turning off the belt cleaning bias Vbc, the controller 2200 ends the second collecting process. While executing the cleaning operation (t231 to t237 in FIGS. 31 and 32), the controller 2200 turns off the exposure unit 240 so that the surfaces of the photosensitive drums 251 are not exposed to light.

Referring back to FIG. 28, after completing the cleaning operation, in S241 the controller 2200 turns off the first motor M21 (*t*241 in FIGS. 31 and 32). This operation can stop the rotation of the four photosensitive drums 251, the four drum cleaning rollers 253, the transfer belt 273, the four transfer rollers 274, the belt cleaning roller 2101, and the collecting roller 2102 that has been used in the cleaning operation.

According to the present embodiment, in the color printer 1B that employs a two-component developing system and includes the magnetic rollers 261 configured to supply toner to the photosensitive drums 251, toner on the photosensitive drums 251 can be collected using the drum cleaning rollers 253 when the printing operation is executed. Further, when executing the cleaning operation in the color printer 1B employing the two-component developing system, toner collected by the drum cleaning rollers 253 can be collected by the belt cleaning roller 2101 through the photosensitive drums 251 and the transfer belt 273, and accommodated in the waste toner accommodating unit 2104.

In the present embodiment, when executing the cleaning operation, the first motor M21 is driven but the second motor M22 is not driven. Accordingly, when executing the cleaning operation, the color printer 1B can drive the photosensitive drums 251, the transfer belt 273, the drum cleaning rollers 253, and the belt cleaning roller 2101 required for executing the cleaning operation, while stopping the sheet feeding roller 223, the heating roller 281, the sheet discharging rollers 291, and the agitators AG2 that are not required for executing the cleaning operation.

Further, the color printer 1B according to the present embodiment includes the first motor M21 for driving the first magnetic roller 261Y, the third magnetic roller 261M, and the fourth magnetic roller 261C using the first clutch C21, and the second motor M22 for driving the second magnetic roller 261K. Accordingly, when executing the cleaning operation, the color printer 1B can set the first clutch C21 to the first cutoff state to prevent the first magnetic roller 261Y, the third magnetic roller 261M, and the fourth magnetic roller 261C from being driven. Further, when executing the cleaning operation, the color printer 1B can prevent the second magnetic roller 261K from being driven by not driving the second motor M22.

Further, since the color printer 1B also includes the second clutch C22, the color printer 1B can stop the drive of the second magnetic roller 261K by setting the second clutch C22 to the second cutoff state, even while driving the second motor M22.

Further, by setting the first clutch C21 to the first transmission state and the second clutch C22 to the second transmission state when executing the color printing operation, the color printer 1B can drive the four magnetic rollers 261 (261Y, 261M, 261C, and 261K) when executing the color printing operation. In addition, by setting the first clutch C21 to the first cutoff state and the second clutch C22 to the second transmission state when executing the monochromatic printing operation, the color printer 1B can stop driving of the first magnetic roller 261Y, the third magnetic roller 261M, and the fourth magnetic roller 261C while driving the second magnetic roller 261K when executing the monochromatic printing operation.

By executing the developing bias applying process during the cleaning operation, the color printer 1B can set the absolute value of the surface potential on the sleeves 261B of the magnetic rollers 261 to a value greater than the absolute value of the surface potential on the photosensitive drums 251, thereby suppressing toner on the photosensitive drums 251 from moving to the magnetic rollers 261 while the cleaning operation is executed.

Further, by stopping the rotation of the sleeves 261B of the magnetic rollers 261 when executing the cleaning operation, the color printer 1B can suppress toner on the magnetic rollers 261 from moving to the photosensitive drums 251 when the cleaning operation is executed.

Further, since the drum cleaning rollers 253 are provided corresponding to the respective four photosensitive drums 251, even if toner of different colors becomes adhered to the surface of the photosensitive drum 251 through the transfer belt 273 during the printing operation, the corresponding drum cleaning roller 253 can collect the adhered toner. This operation can suppress toner of different colors adhered to the photosensitive drum 251 from moving to the corresponding magnetic roller 261 or being transferred to the sheet S2.

Further, since the scorotron chargers 252 are employed as the chargers, the scorotron chargers 252 need not be in contact with the photosensitive drums 251. Accordingly, the scorotron chargers 252 need not separate from the photosensitive drums 251 when executing the cleaning operation.

Modifications to Third Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above embodiment, the first motor M21 is configured to drive the first magnetic roller 261Y, the third magnetic roller 261M, and the fourth magnetic roller 261C, while the second motor M22 is configured to drive the second magnetic roller 261K. However, the present disclosure need not be limited to the above configuration. For example, the first motor M21 may be configured to drive all four magnetic rollers 261 (261Y, 261M, 261C, and 261K), as illustrated in FIG. 33.

Figure 33:
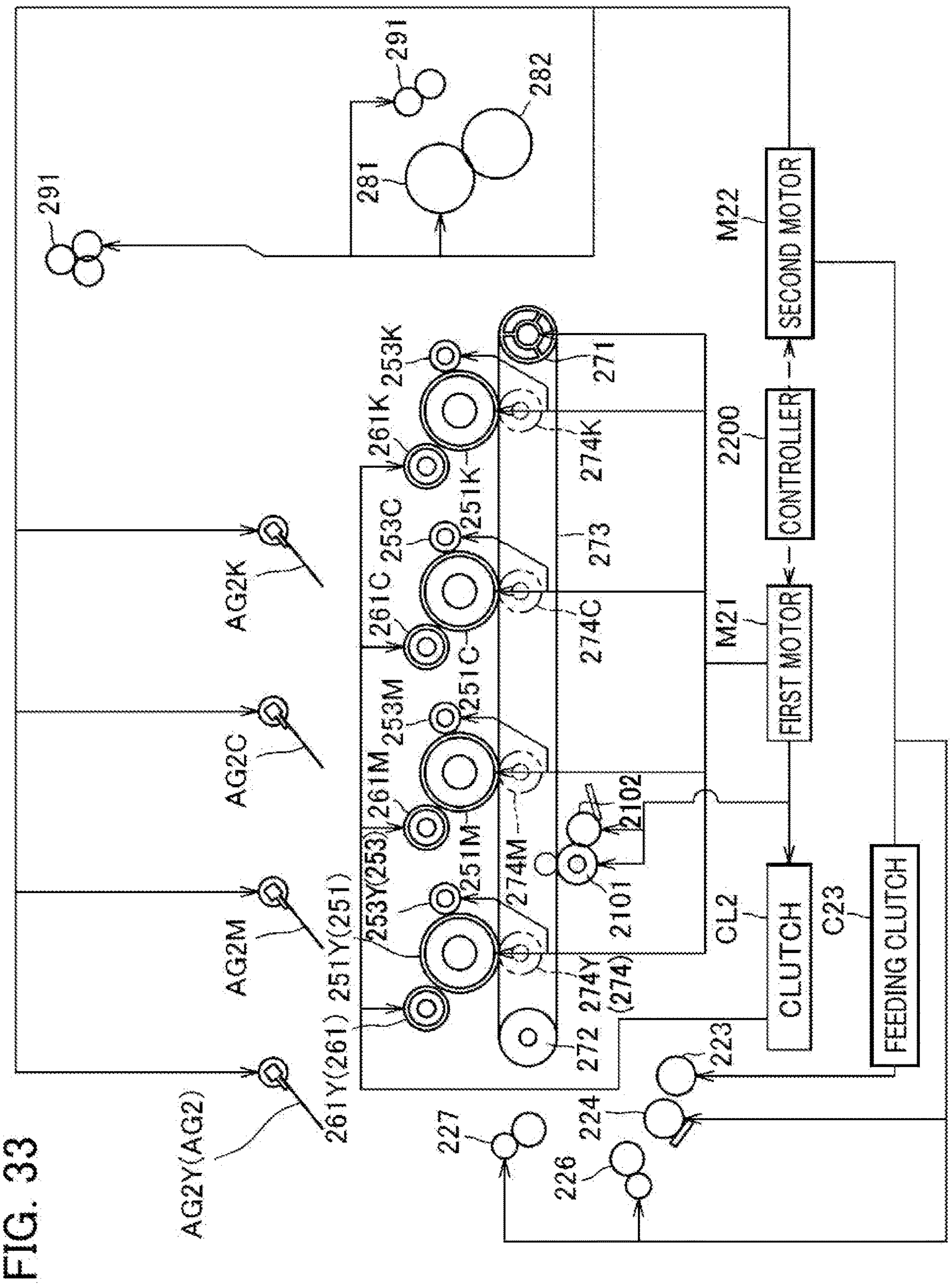
FIG. 33 is a diagram illustrating a transmission configuration of a driving force of a motor in a simplified manner.

In the modification illustrated in FIG. 33, a gear train for transmitting the driving force of the first motor M21 to the four magnetic rollers 261 includes a clutch CL2 which is controlled by the controller 2200. The clutch CL2 is an electromagnetic clutch, for example. The clutch CL2 is switchable between a transmission state in which the clutch CL2 transmits the driving force from the first motor M21 to the four magnetic rollers 261, and a cutoff state in which the clutch CL2 does not transmit the driving force from the first motor M21 to the four magnetic rollers 261.

When executing the printing operation, the controller 2200 sets the clutch CL2 to the transmission state. In this way, when executing the printing operation, the controller 2200 can drive the magnetic rollers 261 which are necessary for executing the printing operation.

When executing the cleaning operation, the controller 2200 sets the clutch CL2 to the cutoff state. In this way, when executing the cleaning operation, the controller 2200 can stop driving of the magnetic rollers 261 which are not required for executing the cleaning operation.

In the above modification, the magnetic rollers 261 are driven by the first motor M21, which also drives the photosensitive drums 251 and the like. However, other configurations may be employed. For example, the magnetic rollers 261 may be driven by the second motor M22. Alternatively, the magnetic rollers 261 may be driven by a third motor other than the first motor M21 and the second motor M22. The third motor may be a motor exclusively for driving the magnetic rollers 261. In a case where the color printer 1B includes a motor exclusively for driving the magnetic rollers 261, the controller 2200 may be configured to drive the magnetic rollers 261 by turning on the motor and to stop driving of the magnetic rollers 261 by turning off the motor.

Although the heating roller 281 serving as the fixing roller is driven by the second motor M22 in the above embodiment, the present disclosure is not limited to this configuration. For example, a motor other than the second motor M22 may drive the fixing roller. The motor other than the second motor M22 may be a motor exclusively for driving the fixing roller. The same applies to the agitators AG2 serving as the agitating member, and the sheet discharging rollers 291. Further, the second motor M22 may be a motor exclusively for driving the sheet feeding roller 223.

In the above embodiment, the developing bias Vb1 is applied to the magnetic rollers 261 when executing the printing operation, while the developing bias Vb2 is applied to the magnetic rollers 261 in the developing bias applying process when executing the cleaning operation. However, the present disclosure need not be limited to the above method. For example, the color printer 1B may apply the same developing bias Vb1 applied when executing the printing operation to the magnetic rollers 261 in the developing bias applying process when executing the cleaning operation.

In the above embodiment, when executing the cleaning operation, the color printer 1B sets the surface potential on the magnetic rollers 261 to an absolute value that is greater than an absolute value of the surface potential on the photosensitive drums 251 by applying the developing bias Vb2 to the magnetic rollers 261. However, the present disclosure need not be limited to the above method.

For example, the color printer 1B may set the surface potential on the photosensitive drums 251 to an absolute value that is smaller than the absolute value of the surface potential of the magnetic rollers 261 when executing the cleaning operation. Specifically, the color printer 1B may reduce the absolute value of the surface potential on the photosensitive drums 251 by applying, to the scorotron chargers 252, a charging bias Vg whose absolute value is smaller than an absolute value of the charging bias Vg used when executing the printing operation.

Alternatively, the color printer 1B may reduce the absolute value of the surface potential on the photosensitive drums 251 by exposing the surfaces of the photosensitive drums 251 to light using the exposure unit 240. Additionally, when executing the cleaning operation, the color printer 1B may set the surface potential on the magnetic rollers 261 to an absolute value approximately the same as the absolute value of the surface potential on the photosensitive drums 251.

The color printer 1B in the above embodiment stops the rotation of the sleeves 261B when executing the cleaning operation, but the present disclosure need not be limited to the above method. For example, the color printer 1B may rotate the sleeves 261B when executing the cleaning operation.

The color printer 1B in the above embodiment starts the discharging process, the transferring process, and the second collecting process simultaneously in the cleaning operation, but the present disclosure need not be limited to this method.

For example, the color printer 1B may start executing the discharging process, the transferring process, and the second collecting process in the cleaning operation in this sequence.

In the above embodiment, the color printer 1B simultaneously ends the discharging process and the transferring process in the cleaning operation. However, in the cleaning operation, the color printer 1B may end the transferring process after ending the discharging process.

In the above embodiment, each of the magnetic rollers 261 includes the magnetic shaft 261A and the sleeve 261B, and only the sleeve 261B is rotatable. However, the present disclosure need not be limited to this configuration. For example, the entire magnetic roller may be rotatable.

While the scorotron chargers 252 serve as examples of the chargers configured to charge the surfaces of the photosensitive drums 251 in the above embodiment, other types of chargers may be employed. For example, the chargers may be corotron chargers that do not include any grid electrode. Alternatively, the chargers may be charging rollers.

In the above embodiment, the exposure unit 240 configured to emit laser beams onto the photosensitive drums 251 serves as an example of an exposure unit for exposing the surfaces of the photosensitive drums 251 to light, but the present disclosure need not be limited to this configuration. For example, the exposure unit may include an exposure head having a plurality of LEDs arranged in the first direction, and may be configured to expose the surfaces of the photosensitive drums to light by emitting light onto the photosensitive drums from the LEDs.

The transfer belt 273 in the above embodiment is a belt configured to convey the sheet S2 in cooperation with the photosensitive drums 251. However, the present disclosure need not be limited to the above configuration. For example, the transfer belt may be a so-called intermediate transfer belt, and the transfer unit may further include a secondary transfer roller for transferring toner images on the intermediate transfer belt onto the sheet.

Although the heating roller 281 serves as an example of the fixing roller in the above embodiment, other configuration may be employed. For example, the pressure roller 282 may be the fixing roller. Alternatively, both the heating roller 281 and the pressure roller 282 may be the fixing rollers. Further, the fixing device may include a fixing belt configured of an endless belt. In a case where the fixing device includes a fixing belt, the fixing belt may be driven by the second motor M22.

In the above embodiment, the belt cleaner 2100 includes the belt cleaning roller 2101, the collecting roller 2102, and the scraping blade 2103, but the belt cleaner need not be limited to this configuration. For example, the belt cleaner may be configured without a collecting roller.

In the above embodiment, the belt cleaning roller 2101 serves as the belt cleaning member. However, the present disclosure need not be limited to this configuration. For example, the belt cleaning member may be a belt cleaning blade configured to collect toner by scraping the toner off the transfer belt.

In the above embodiment, the agitator AG2 included in the toner box TC2 is described as the agitating member, but the present disclosure need not be limited to this configuration. For example, the agitating member may be an auger or the like.

In the above embodiment, the toner boxes TC2 that accommodate therein toner are attachable to and detachable from the drum unit 250 that includes the photosensitive drums 251 and the developing units 260 (the magnetic rollers 261). However, the present disclosure need not be limited to this configuration. For example, a cartridge including a magnetic roller and a toner accommodating unit that accommodates therein toner may be attachable to and detachable from a drum unit that includes the photosensitive drum.

Alternatively, the toner accommodating unit may be configured not to be detachable from the drum unit that includes the photosensitive drum and the magnetic roller. In other words, the drum unit may be integrally configured of the photosensitive drum, the magnetic roller, and the toner accommodating unit. The toner accommodating unit may include an agitating member for agitating toner, and the agitating member in the toner accommodating unit may be driven by the second motor.

In the above embodiment, the number of photosensitive drums 251, magnetic rollers 261, and drum cleaning rollers 253 is four, but the present disclosure need not be limited to this number. For example, the number of photosensitive drums 251, magnetic rollers 261, and drum cleaning rollers 253 may be two, three, or not less than five.

In the above embodiment, the color printer 1B including pluralities of photosensitive drums 251, magnetic rollers 261, and drum cleaning rollers 253 is used as an example of the image forming apparatus, but the present disclosure need not be limited to this configuration. For example, the image forming apparatus may be a monochromatic printer including only one photosensitive drum, one magnetic roller, and one drum cleaning roller. Further, the image forming apparatus need not be limited to a printer but may be a copying machine or a multifunction peripheral, for example.

Although the first polarity in the above embodiment is positive, the present disclosure need not be limited to this configuration. For example, the first polarity may be negative. In other words, the image forming apparatus need not be limited to a device that uses positively charged toner but may be a device that uses negatively charged toner.

Note that, in a case where the image forming apparatus uses negatively charged toner, the positive and negative biases are opposite those used in the above embodiment. Specifically, the charging bias Vg, the developing bias Vb, and the drum cleaning bias Vc1*n* for discharging toner are all negative. Further, the transferring bias Vt, the drum cleaning bias Vc1*n* for collecting toner, and the belt cleaning bias Vbc are all positive.

The elements described in the above embodiment and modifications may be suitably combined to be implemented.

What is claimed is:

1. An image forming apparatus comprising:

a photosensitive drum;

a magnetic roller positioned to be spaced apart from the photosensitive drum, the magnetic roller being configured to supply toner to the photosensitive drum to form a toner image thereon;

a transfer belt configured to transfer the toner image on the photosensitive drum onto a sheet;

a drum cleaning roller configured to collect toner on the photosensitive drum and to discharge the collected toner to the photosensitive drum;

a belt cleaner configured to collect toner on the transfer belt;

a waste toner accommodating unit configured to accommodate therein the toner collected by the belt cleaner; and a controller configured to perform a printing operation for forming an image on the sheet in a state where the magnetic roller is spaced apart from the photosensitive drum and a cleaning operation for cleaning the drum cleaning roller in a state where the magnetic roller is spaced apart from the photosensitive drum, wherein the controller is configured to perform:

when performing the printing operation, collecting the toner on the photosensitive drum using the drum cleaning roller; and when performing the cleaning operation, discharging the toner on the drum cleaning roller collected in the collecting to the photosensitive drum;

transferring the toner on the photosensitive drum onto the transfer belt; and collecting the toner on the transfer belt using the belt cleaner so that the collected toner is accommodated in the waste toner accommodating unit.

2. The image forming apparatus according to claim 1, wherein the controller is configured to further perform:

when performing the cleaning operation, applying a developing bias to the magnetic roller so that a surface potential on the magnetic roller has an absolute value that is greater than an absolute value of a surface potential on the photosensitive drum.

3. The image forming apparatus according to claim 2, wherein the toner supplied to the photosensitive drum by the magnetic roller is charged to have a first polarity, and wherein the developing bias applied to the magnetic roller in the applying is of the first polarity.

4. The image forming apparatus according to claim 3, wherein the controller is configured to further perform:

when performing the printing operation, applying a developing bias of a first value to the magnetic roller, and wherein, when performing the cleaning operation, the developing bias applied to the magnetic roller in the applying is of a second value having an absolute value that is greater than an absolute value of the first value.

5. The image forming apparatus according to claim 2, wherein the magnetic roller includes:

a magnetic shaft extending in a first direction; and a sleeve rotatable about the magnetic shaft and configured to hold thereon carrier and toner, and wherein, when performing the cleaning operation, the developing bias is applied to the sleeve in the applying.

6. The image forming apparatus according to claim 1, further comprising a charger configured to charge a surface of the photosensitive drum, wherein the controller is configured to further perform:

when performing the cleaning operation, applying a charging bias to the charger to thereby charge the surface of the photosensitive drum using the charger.

7. The image forming apparatus according to claim 6, wherein the charger is a scorotron charger.

8. The image forming apparatus according to claim 1, further comprising an exposure unit configured to expose a surface of the photosensitive drum to light after the surface of the photosensitive drum is charged, wherein, when performing the cleaning operation, the controller does not expose the surface of the photosensitive drum to light using the exposure unit.

9. The image forming apparatus according to claim 1, wherein the controller is configured to further perform:

when performing the cleaning operation, stopping rotation of the magnetic roller.

10. The image forming apparatus according to claim 9, wherein the magnetic roller includes:

a magnetic shaft extending in a first direction; and a sleeve rotatable about the magnetic shaft and configured to hold thereon carrier and toner, and wherein, in the stopping, rotation of the sleeve is stopped.

11. The image forming apparatus according to claim 1, further comprising:

another photosensitive drum;

another magnetic roller configured to supply toner to the another photosensitive drum; and another drum cleaning roller configured to collect toner on the another photosensitive drum and to discharge the collected toner to the another photosensitive drum.

12. The image forming apparatus according to claim 1, wherein the photosensitive drum is rotatable about a drum axis extending in a first direction, wherein the magnetic roller is rotatable about a roller axis extending in the first direction, and wherein the drum cleaning roller is rotatable about a cleaning axis extending in the first direction.

13. The image forming apparatus according to claim 1, wherein the belt cleaner includes a belt cleaning roller configured to collect the toner on the transfer belt.

14. The image forming apparatus according to claim 1, further comprising:

a charger configured to charge a surface of the photosensitive drum; and an exposure unit configured to expose the surface of the photosensitive drum to light after the surface of the photosensitive drum is charged by the charger.

* * * * *